(12) United States Patent
Takahashi

(10) Patent No.: US 7,619,838 B2
(45) Date of Patent: Nov. 17, 2009

(54) IMAGE STABILIZER, LENS DEVICE AND IMAGING APPARATUS

(75) Inventor: Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 11/704,020

(22) Filed: Feb. 8, 2007

(65) Prior Publication Data

US 2007/0188620 A1 Aug. 16, 2007

(30) Foreign Application Priority Data

Feb. 10, 2006 (JP) .............................. 2006-034173

(51) Int. Cl.
G02B 7/02 (2006.01)
(52) U.S. Cl. .................. 359/819; 359/811; 359/813
(58) Field of Classification Search ................. 359/819, 359/822, 823, 824; 369/244, 247, 248, 263
See application file for complete search history.

(56) References Cited

U.S. PATENT DOCUMENTS 4,322,840 A * 3/1982 Kusaka ....................... 369/220
4,592,037 A * 5/1986 Ohnuki ...................... 369/44.15
5,506,732 A * 4/1996 Mori ........................... 359/824
6,031,812 A * 2/2000 Liou ............................ 720/683
7,201,809 B2 * 4/2007 Sato et al. ................... 148/103
2006/0146400 A1* 7/2006 Seo ............................. 359/368

FOREIGN PATENT DOCUMENTS

JP 3 186823 8/1991
JP 2000 258813 9/2000

* cited by examiner

Primary Examiner—Timothy J Thompson
(74) Attorney, Agent, or Firm—Frommer Lawrence & Haug LLP; William S. Frommer

(57) ABSTRACT

An image stabilizer includes a driver having a coil and magnet, where a correcting lens on a moving frame is moved by the driver in a first direction perpendicular to an optical axis of a lens system and in a second direction perpendicular to the first direction and optical axis, and an optical axis of the correcting lens corresponds with the optical axis of the lens system. The coil and magnet are fixed to the moving frame and a supporting frame; the driver includes first and second coils for moving the correcting lens in the first and second directions, and a magnet applying magnetic force to those coils; and thrust generated from the first and second coils are directed in the first and second directions; a magnetic member attracted to or repelled by the magnet is provided in the vicinity of the first and second coils.

8 Claims, 32 Drawing Sheets

IMAGE STABILIZER, LENS DEVICE AND IMAGING APPARATUS

CROSS REFERENCES TO RELATED APPLICATIONS

The present invention contains subject manner related to Japanese Patent Application JP 2006-034173 filed in the Japanese Patent Office on Feb. 10, 2006, the entire contents of which being incorporated herein by reference.

BACKGROUND OF THE INVENTION

1. Field of the Invention

The present invention relates to an image stabilizer which stabilizes image blurred by vibration or the like at the time of shooting; a lens device which has the image stabilizer; and an imaging apparatus such as a digital still camera or video camera, incorporating the lens device.

2. Description of the Related Art

In recent years, performance of an imaging apparatus such as a digital still camera and a video camera has been improved remarkably, and it became possible for anyone to easily shoot still pictures and moving pictures with high image quality and with high efficiency. Improved efficiency of such an imaging apparatus owes to high performance of an imaging apparatus such as a lens, a CCD (solid-state imaging device), and an image processing circuit.

However, even though the lens, the CCD and the like can be made higher in performance, if camera shake or vibration is caused by photographer's hands holding a camera (imaging apparatus), blurring occurs in images with high resolution and shot images are blurred. Therefore, some relatively expensive cameras are provided with an image stabilizer capable of stabilizing images blurred by camera shake and the like upon image pickup. However, cameras that require such image stabilizer are not professional-level cameras, and it is to be understood that image stabilizers are indispensable to consumer cameras for a large number of amateur photographers with less shooting experience.

Further, in general, a demand for smaller and lighter cameras (imaging apparatuses) is strong and most of photographers like cameras which are light in weight and easy to carry. However, since an image stabilizer in related art is comparatively large in size, when such large image stabilizer is mounted on a camera body, the whole of the camera becomes large in size, which is against a demand for making cameras smaller in size and lighter in weight. In addition, image stabilizers in related art require a large number of components, thereby causing a problem in which a cost of cameras increases as the number of components increases.

Japanese Patent Application Publication No. H3-186823 discloses a first example of an image stabilizer of this kind in related art, for example. In this Patent Literature, there is described one relating to a vibration-prevention device provided in a camera or the like, which detects camera shakes relatively low in frequency and uses the detected results as information for the prevention of image blurring, thereby preventing image blurring. The vibration-prevention device described in this Patent Literature (hereinafter referred to as "a first related-art example") is a vibration-prevention device for a camera, including: a correcting optical mechanism, a vibration detector and a vibration-prevention controller. The correcting optical mechanism is provided inside a lens barrel holding a lens group and deviates the optical axis of the lens group. The vibration detector detects vibration applied to the lens barrel. The vibration-prevention controller prevents vibration by driving the correcting optical mechanism based upon a signal from the above-described vibration detector. The correcting optical mechanism has: a correcting lens, a fixing frame, a first holding frame, a second holding frame, first and second coils, first and second drivers, and first and second position detectors. The fixing frame fixes the correcting lens. The first holding frame holds the fixing frame such that the fixing frame can be moved in the first direction different from the optical axis direction of the lens group. The second holding frame holds the first holding frame such that the first holding frame can be moved in the second direction different from the optical axis direction and the first direction, and is fixed to the lens barrel. The first and second coils move the first and second holding frames in the first and second directions, respectively. The first and second drivers are formed of first and second magnetic field generating members facing the first and second coils. The first and second position detectors detect the amount in which the fixing frame and the first holding frame are moved in the first and second directions. At least either the first and second magnetic field generating members or the first and second position detectors are provided in a fixed member including the second holding frame, fixed to the lens barrel.

According to the vibration-prevention device with the structure described in Japanese Patent Application Publication No. H3-186823, there can be expected such effectiveness that the vibration-prevention device responds up to high-frequency vibration without increasing the cost and requiring a large space (refer to "Effect of the Invention").

Japanese Patent Application Publication No. 2000-258813 discloses a second example of an image stabilizer in related art, for example. In this Patent Reference, there is described one relating to an image stabilizer used for optical equipment and a lens barrel using the image stabilizer. The image stabilizer described in this Patent Reference (hereinafter referred to as "a second related-art example") is an image stabilizer which stabilizes images by moving part of a imaging lens to the inside of a surface perpendicular to an optical axis, including: a lens holding frame, a first guide, a second guide, a first driver, a second driver, and a position detector. The lens holding frame holds a correcting lens. The first guide guides the lens holding frame to move in a first direction within a surface perpendicular to the optical axis. The second guide guides the lens holding frame to move in a second direction perpendicular to the first direction. The first driver and second driver drive the lens holding frame in the first and second directions, respectively. The position detector detects the position of the correcting lens. In this image stabilizer, the first guide and the second driver, or the second guide and the first driver are arranged to partially overlap, when seen from an optical axis direction.

According to the image stabilizer with the structure described in Japanese Patent Application Publication No. 2000-258813, the following effectiveness may be obtained, for example. Specifically, the width and height of the stabilizer can be reduced by arranging a guide shaft for moving a correcting lens, and a coil or magnet for driving the correcting lens such that a pitch moving mechanism and a yaw driver, or a yaw moving mechanism and a pitch driver are arranged to overlap when seen from an optical axis direction (see paragraph [0032]).

However, regarding the aforementioned first and second related-art examples, a holding frame having a correcting lens is guided and supported in a movable manner in a first direction and second direction perpendicular to each other; and the guiding and supporting mechanism includes a combination of a shaft and a bearing portion, two pairs of which make one set.

In this case, there may need some gap between the shaft and bearing portion of each combination in order for the holding frame to move, which causes a problem of looseness when moving, and the looseness not only makes smooth motion difficult but also makes the position of the correcting lens unstable.

Further, in the case of an image stabilizer apparatus being used with an optical axis of a correcting lens directed in a horizontal direction, in other words, in an imaging apparatus whose lens device, in which an optical axis of a lens system is directed in a horizontal direction, has the aforementioned image stabilizer apparatus, a holding frame holding the correcting lens is used with its moving direction set in the gravitational direction. Therefore, a moving frame may be required to be held at a predetermined height by supplying power to a coil all the time. As a result, there is an increase in the consumption of power, hence, causing the power consumption to increase in a battery and the temperature inside an apparatus to rise by the heat of an actuator and the like.

SUMMARY OF THE INVENTION

The present inventor has recognized the followings. Regarding an image stabilizer in related art, a holding frame holding a correcting lens is guided and supported by a supporting mechanism formed of a combination of a shaft and a bearing portion, two pairs of which make one set. Therefore, backlash between the shaft and bearing portion may prevent the holding frame from moving smoothly, and may prevent the position of the correcting lens from being stabilized. Further, if the moving direction of a moving frame corresponds with the gravitational direction, it is necessary to prevent the moving frame from going down by gravity and to hold the moving frame in a predetermined position by supplying power to a coil all the time. Accordingly, there is an increase in the consumption of power, hence, causing the power consumption to increase in a battery and the temperature inside an apparatus to rise by the heat of an actuator and the like.

According to an embodiment of the present invention, there is provided an image stabilizer including a driver having a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner. Further, the driver includes a first coil for moving the correcting lens in the first direction, a second coil for moving the correcting lens in the second direction, and a magnet for applying magnetic force to the first coil and the second coil. The first coil and the second coil are disposed such that thrust generated from a thrust-generating portion of the first coil and thrust generated from a thrust-generating portion of the second coil are directed in the first direction and the second direction by the magnetic force of the magnet. Further, a magnetic member attracted to or repelled by the magnet is provided in the vicinity of the first coil and the second coil on the moving frame or the supporting frame to which both the coils are fixed.

According to an embodiment of the present invention, there is provided a lens device including an image stabilizer which has a driver including a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner in the image stabilizer. Further, the driver includes a first coil for moving the correcting lens in the first direction, a second coil for moving the correcting lens in the second direction, and a magnet for applying magnetic force to the first coil and the second coil. The first coil and the second coil are disposed such that thrust generated from a thrust-generating portion of the first coil and thrust generated from a thrust-generating portion of the second coil are directed in the first direction and the second direction by the magnetic force of the magnet. Further, a magnetic member attracted to or repelled by the magnet is provided in the vicinity of the first coil and the second coil on the moving frame or the supporting frame to which both the coils are fixed.

Further, according to an embodiment of the present invention, there is provided an imaging apparatus including a lens device having an image stabilizer which includes a driver including a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner in the image stabilizer. Further, the driver includes a first coil for moving the correcting lens in the first direction, a second coil for moving the correcting lens in the second direction, and a magnet for applying magnetic force to the first coil and the second coil. The first coil and the second coil are disposed such that thrust generated from a thrust-generating portion of the first coil and thrust generated from a thrust-generating portion of the second coil are directed in the first direction and the second direction by the magnetic force of the magnet. Further, a magnetic member attracted to or repelled by the magnet is provided in the vicinity of the first coil and the second coil on the moving frame or the supporting frame to which both the coils are fixed.

In an image stabilizer, a lens device and an imaging apparatus according to the embodiments, a magnetic member attracted to or repelled by a magnet is provided in the vicinity of the first coil and the second coil on the supporting frame or the moving frame. Therefore, a correcting lens can be forced to move in a certain direction by the magnetic force of the magnet attracting or pressing the magnetic member. As a result, backlash caused by a gap between the shaft and bearing portion can be eliminated, thus, the moving frame holding the correcting lens can be moved smoothly and the correcting lens can be held stably at a certain posture, and therefore such deterioration as in optical performance caused by change in the posture of the correcting lens can be prevented.

BRIEF DESCRIPTION OF THE DRAWINGS

FIGS. 4A to 4C show the image stabilizer in FIG. 2, in which FIG. 4A is a front view, FIG. 4B is a rear view and FIG. 4C is a left side view;

FIGS. 5A to 5C are explanatory views showing a relevant part of FIG. 4A in an enlarged manner, in which FIG. 5A shows an example of a magnetic member formed of a magnetic material of iron, steel or the like, FIG. 5B shows an example in which a magnetic member is formed of a magnet, and a magnetic pole thereof and a magnetic pole of a driving magnet are faced each other with the reverse polarity arrangement, and FIG. 5C shows an example in which a magnetic member is formed of a magnet, and a magnetic pole thereof and a magnetic pole of a driving magnet are faced each other with the same polarity arrangement;

FIGS. 6A and 6B show the image stabilizer in FIG. 3 in cross section, in which FIG. 6A is a P-P line sectional view and FIG. 6B is a Q-Q line sectional view;

FIGS. 7A and 7B show a modified embodiment of the image stabilizer in FIG. 1, in which FIG. 7A is a sectional view of parts corresponding to FIG. 6A, and FIG. 7B is a sectional view of parts corresponding to FIG. 6B;

FIGS. 8A and 8B show a second embodiment of an image stabilizer having a driver of a moving magnet system according to the present invention, in which FIG. 8A is a plan view and FIG. 8B is a front view;

FIGS. 9A to 9C are explanatory views showing a relevant part of FIG. 8B in an enlarged manner, in which FIG. 9A shows an example of a magnetic member formed of a magnetic material of iron, steel or the like, FIG. 9B shows an example in which a magnetic member is formed of a magnet, and a magnetic pole thereof and a magnetic pole of a driving magnet are faced each other with the reverse polarity arrangement, and FIG. 9C shows an example in which a magnetic member is formed of a magnet, and a magnetic pole thereof and a magnetic pole of a driving magnet are faced each other with the same polarity arrangement;

FIGS. 10A and 10B show a third embodiment of an image stabilizer having a driver of a moving magnet system according to the present invention in which FIG. 10A is a plan view and FIG. 10B is a front view;

FIGS. 11A to 11C are explanatory views showing a relevant part of FIG. 10B in an enlarged manner, in which FIG. 11A shows an example of a magnetic member formed of a magnetic material of iron, steel or the like, FIG. 11B shows an example in which a magnetic member is formed of a magnet, and a magnetic pole thereof and a magnetic pole of a driving magnet are faced each other with the reverse polarity arrangement, and FIG. 11C shows an example in which a magnetic member is formed of a magnet, and a magnetic pole thereof and a magnetic pole of a driving magnet are faced each other with the same polarity arrangement;

FIGS. 12A and 12B show a fourth embodiment of an image stabilizer having a driver of a moving magnet system according to the present invention in which FIG. 12A is a plan view and FIG. 12B is a front view;

FIGS. 13A to 13C are explanatory views showing a relevant part of FIG. 12B in an enlarged manner, in which FIG. 13A shows an example of a magnetic member formed of a magnetic material of iron, steel or the like, FIG. 13B shows an example in which a magnetic member is formed of a magnet, and a magnetic pole thereof and a magnetic pole of a driving magnet are faced each other with the reverse polarity arrangement, and FIG. 13C shows an example in which a magnetic member is formed of a magnet, and a magnetic pole thereof and a magnetic pole of a driving magnet are faced each other with the same polarity arrangement;

FIGS. 14A to 14C show a fifth embodiment of an image stabilizer having a driver of a moving magnet system according to the present invention, in which FIG. 14A is a plan view, FIG. 14B is a front view, and FIG. 14C is an explanatory diagram showing a relevant part of FIG. 14B enlarged;

FIGS. 18A to 18C show the image stabilizer in FIG. 16, in which FIG. 18A is a front view, FIG. 18B is a rear view and FIG. 18C is a left side view respectively;

FIGS. 19A to 19C are explanatory views showing a relevant part of FIG. 18A in an enlarged manner, in which FIG. 19A shows an example of a magnetic member formed of a magnetic material of iron, steel or the like, FIG. 19B shows an example in which a magnetic member is formed of a magnet, and a magnetic pole thereof and a magnetic pole of a driving magnet are faced each other with the reverse polarity arrangement, and FIG. 19C shows an example in which a magnetic member is formed of a magnet, and a magnetic pole thereof and a magnetic pole of a driving magnet are faced each other with the same polarity arrangement;

FIGS. 20A and 20B show the image stabilizer in FIG. 17 in cross section, in which FIG. 20A is an R-R line sectional view and FIG. 20B is an S-S line sectional view;

FIGS. 21A and 21B show a modified embodiment of the image stabilizer in FIG. 15, in which FIG. 21A is a sectional view of a part corresponding to FIG. 20A, and FIG. 21B is a sectional view of a part corresponding FIG. 20B respectively;

FIGS. 22A and 22B show a seventh embodiment of an image stabilizer having a driver of a moving coil system according to the present invention, in which FIG. 22A is a plan view and FIG. 22B is a front view;

FIGS. 23A to 23C are explanatory views showing a relevant part of FIG. 22B in an enlarged manner, in which FIG. 23A shows an example of a magnetic member formed of a magnetic material of iron, steel or the like, FIG. 23B shows an example in which a magnetic member is formed of a magnet, and a magnetic pole thereof and a magnetic pole of a driving magnet are faced each other with the reverse polarity arrangement, and FIG. 23C shows an example in which a magnetic member is formed of a magnet, and a magnetic pole thereof and a magnetic pole of a driving magnet are faced each other with the same polarity arrangement;

FIGS. 24A and 24B show an eighth embodiment of an image stabilizer having a driver of a moving coil system according to the present invention, in which FIG. 24A is a plan view and FIG. 24B is a front view;

FIGS. 25A to 25C are explanatory views showing a relevant part of FIG. 24B in an enlarged manner, in which FIG. 25A shows an example of a magnetic member formed of a magnetic material of iron, steel or the like, FIG. 25B shows an example in which a magnetic member is formed of a magnet, and a magnetic pole thereof and a magnetic pole of a driving magnet are faced each other with the reverse polarity arrangement, and FIG. 25C shows an example in which a magnetic member is formed of a magnet, and a magnetic pole thereof and a magnetic pole of a driving magnet are faced each other with the same polarity arrangement;

FIGS. 26A and 26B show a ninth embodiment of an image stabilizer having a driver of a moving coil system according to the present invention, in which FIG. 26A is a plan view and FIG. 26B is a front view;

FIGS. 27A to 27C are explanatory views showing a relevant part of FIG. 26B in an enlarged manner, in which FIG. 27A shows an example of a magnetic member formed of a magnetic material of iron, steel or the like, FIG. 27B shows an example in which a magnetic member is formed of a magnet, and a magnetic pole thereof and a magnetic pole of a driving magnet are faced each other with the reverse polarity arrangement, and FIG. 27C shows an example in which a magnetic member is formed of a magnet, and a magnetic pole thereof and a magnetic pole of a driving magnet are faced each other with the same polarity arrangement;

FIGS. 28A to 28C show a tenth embodiment of an image stabilizer having a driver of a moving coil system according to the present invention, in which FIG. 28A is a plan view, FIG. 28B is a front view, and FIG. 28C is an explanatory diagram showing a relevant part of FIG. 28B enlarged;

FIGS. 30A and 30B show a lens device according to a first embodiment of the present invention, in which FIG. 30A is a side view and FIG. 30B is a front view;

DESCRIPTION OF THE PREFERRED EMBODIMENTS

An image stabilizer, a lens device having the image stabilizer, and an imaging apparatus incorporating the lens device are obtained with a simplified structure. The image stabilizer includes a magnetic member being disposed in the vicinity of a first coil and a second coil on a moving frame or a supporting frame to which both the coils are fixed and being attracted to or repelled by the magnetic force of a magnet. Accordingly, a correcting lens is forced to move in a certain direction by the magnetic force of the magnet attracting or pressing the magnetic member. By doing so, backlash caused by a gap between a shaft and a bearing portion is eliminated to prevent such deterioration as in optical performance caused by a change in the posture of the correcting lens, thereby the moving frame holding the correcting lens moving smoothly.

Figure 1:
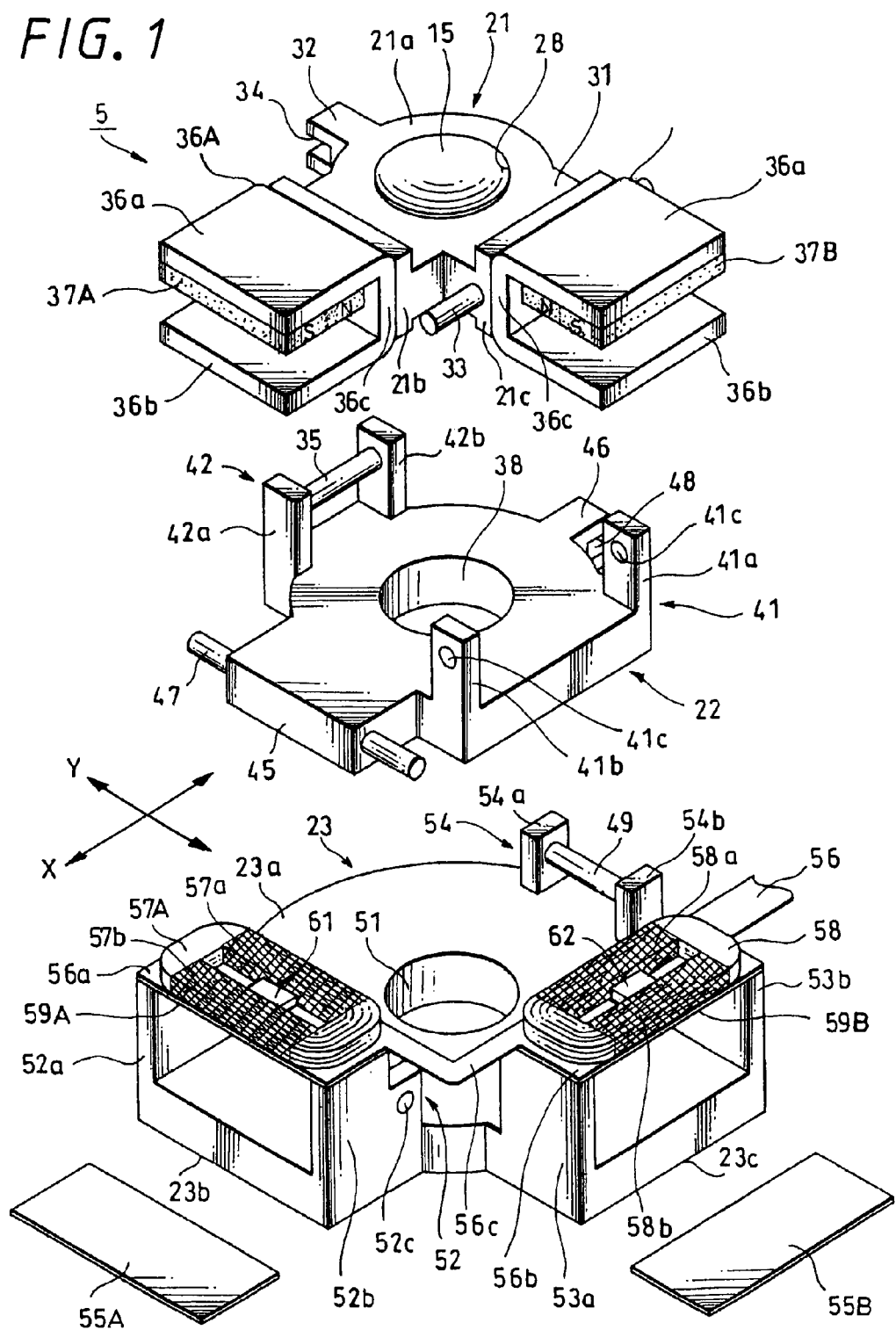
FIG. 1 is an exploded perspective view of an image stabilizer having a driver of a moving magnet system, which represents a first embodiment of an image stabilizer according to the present invention.
Figure 2:
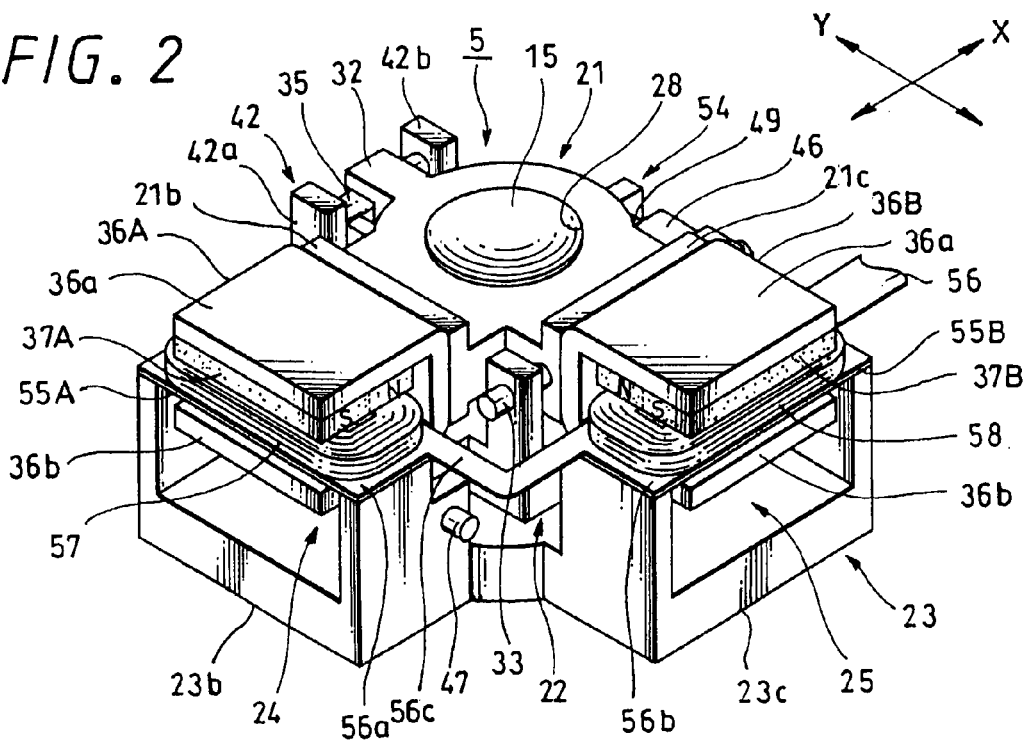
FIG. 2 is a perspective view of the image stabilizer in FIG. 1 in the assembled state.
Figure 3:
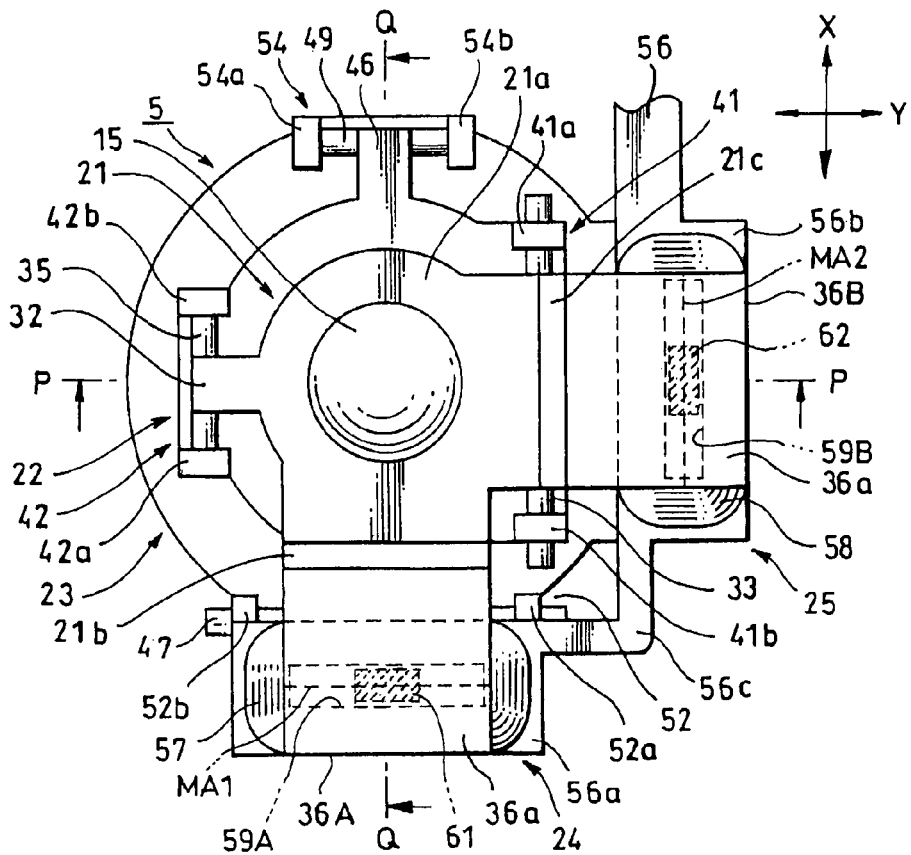
FIG. 3 is a plan view of the image stabilizer shown in FIG. 2.
Figure 4A:
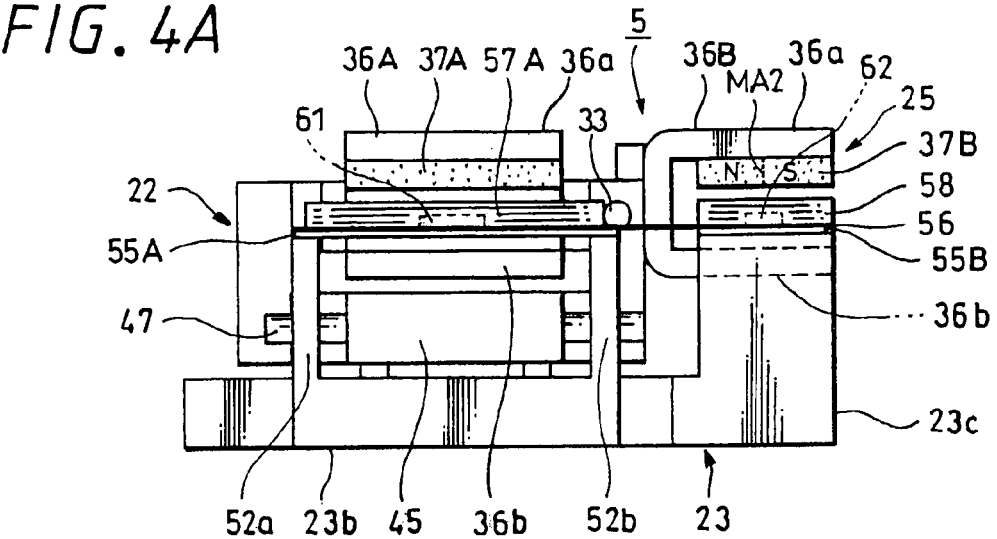
Figure 4B:
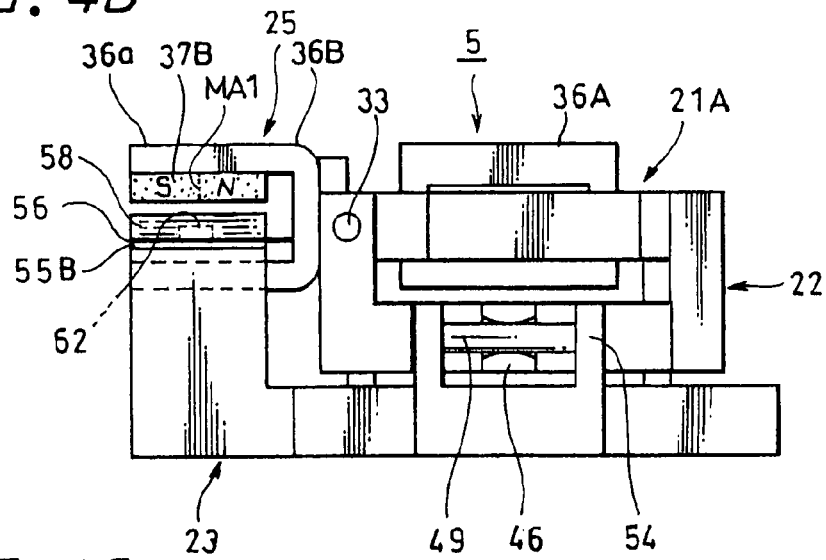
Figure 4C:
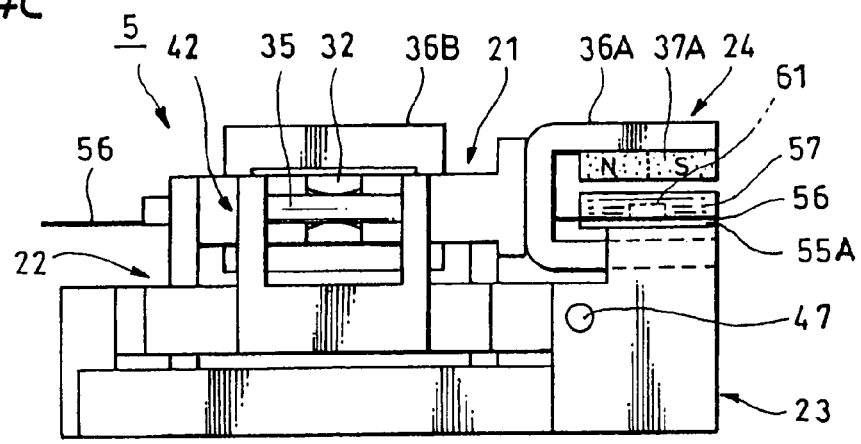
Figure 5A:
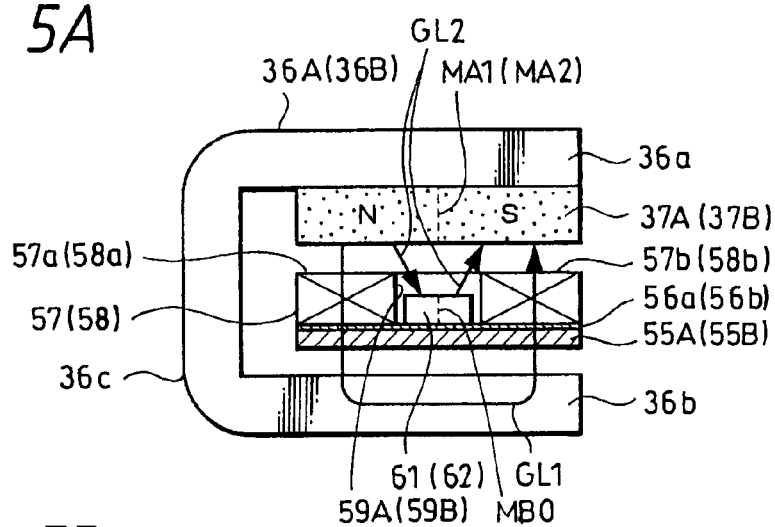
Figure 5B:
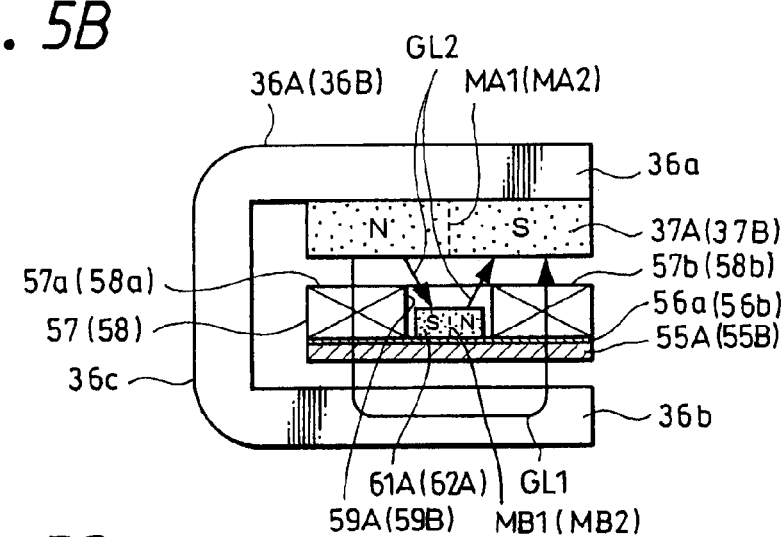
Figure 5C:
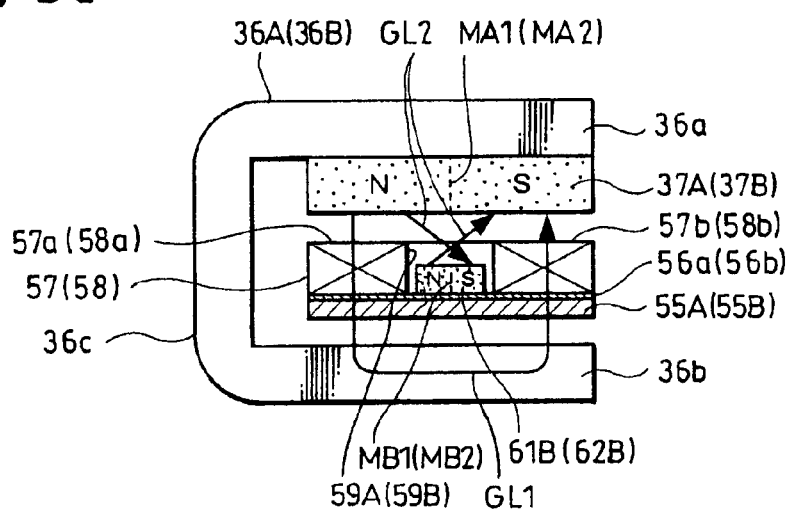
Figure 6A:
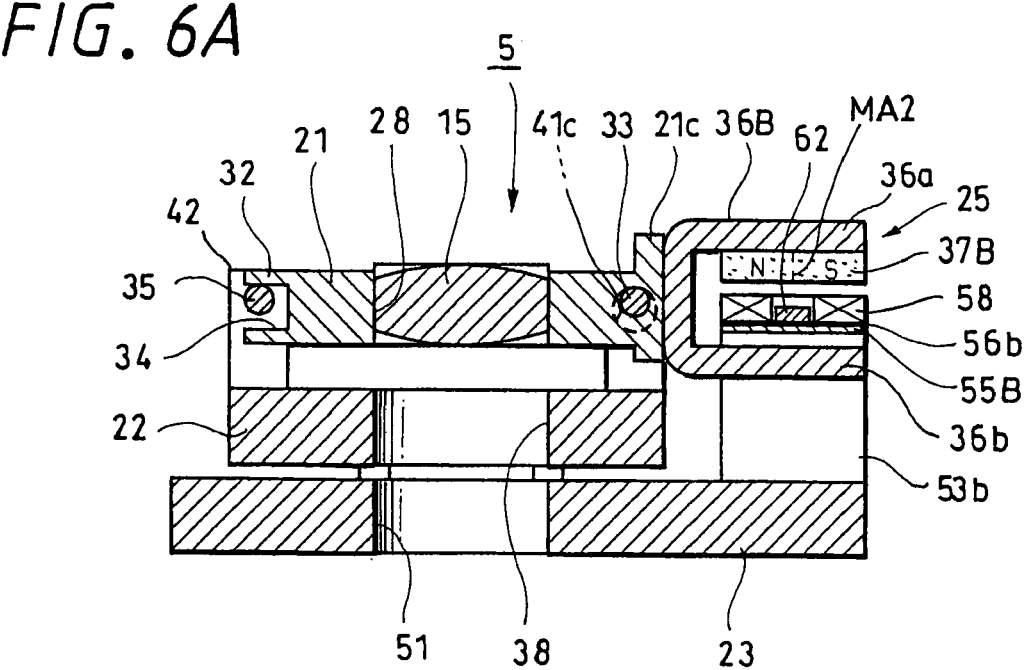
Figure 6B:
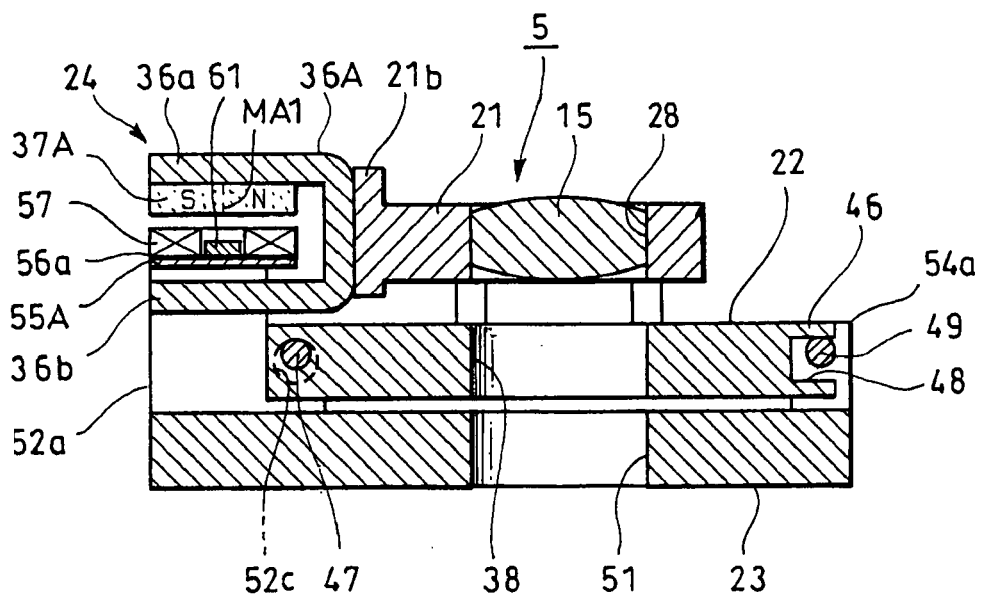
Figure 7A:
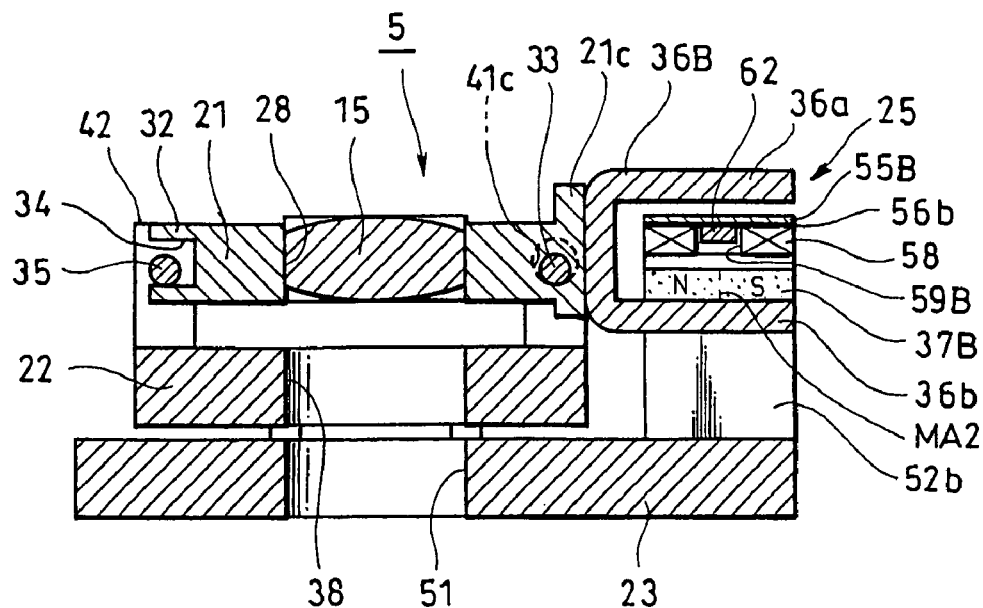
Figure 7B:
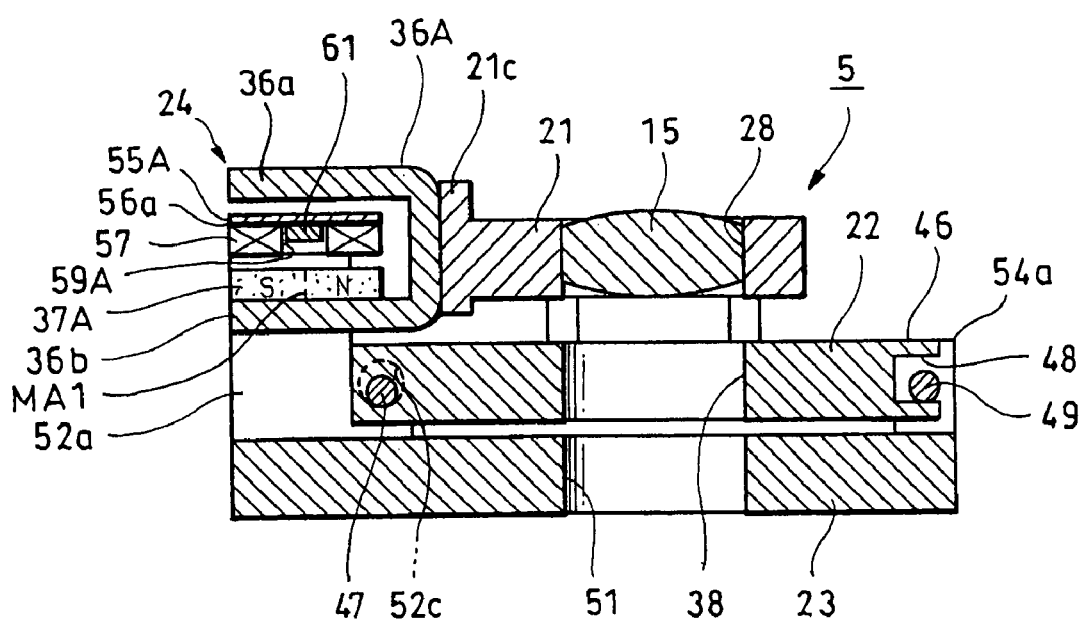
Figure 8A:
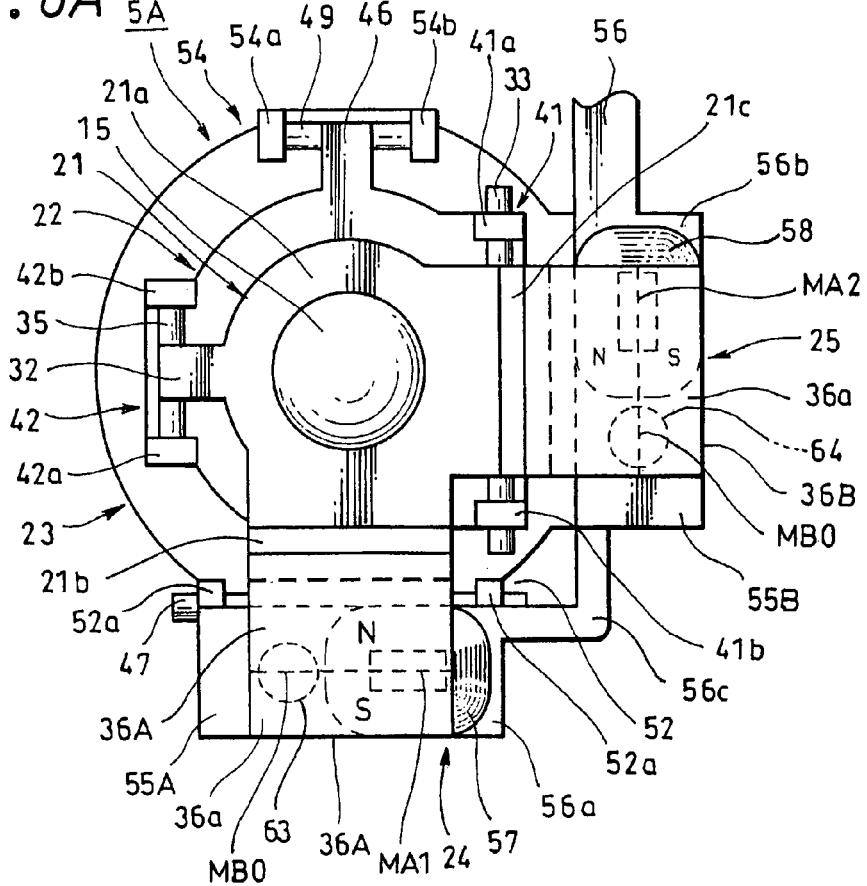
Figure 8B:
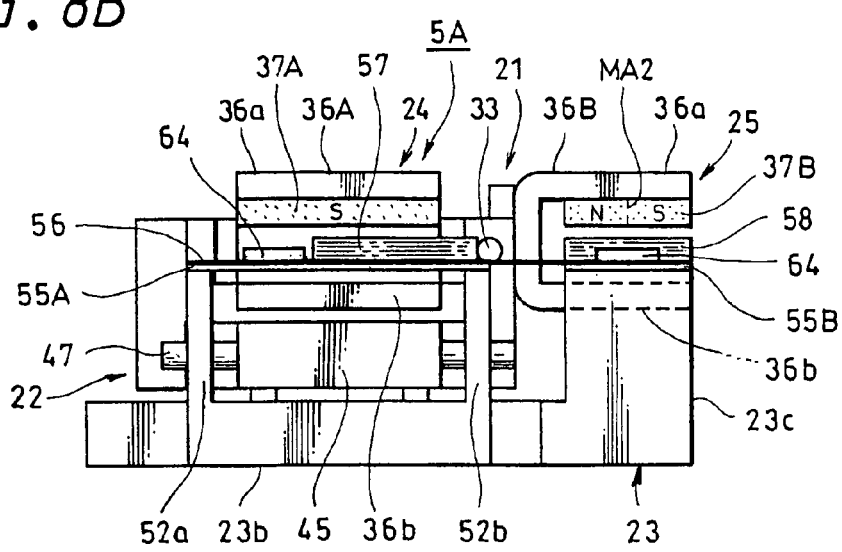
Figure 9A:
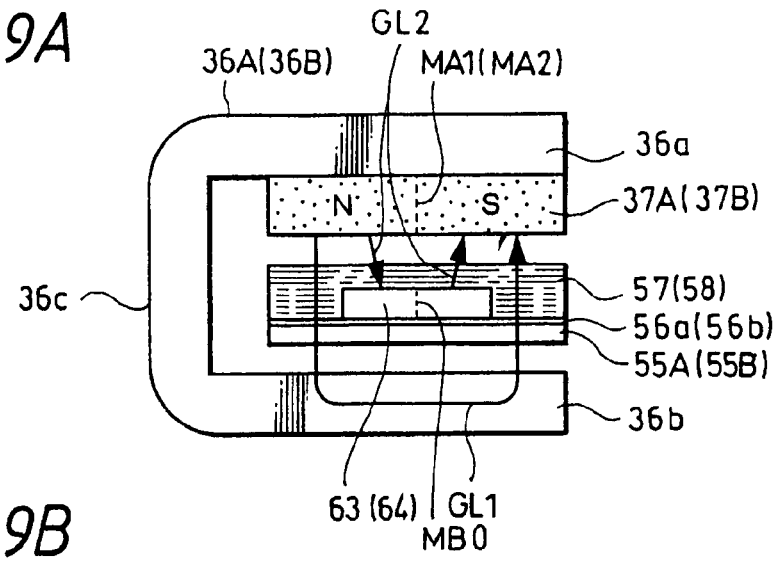
Figure 9B:
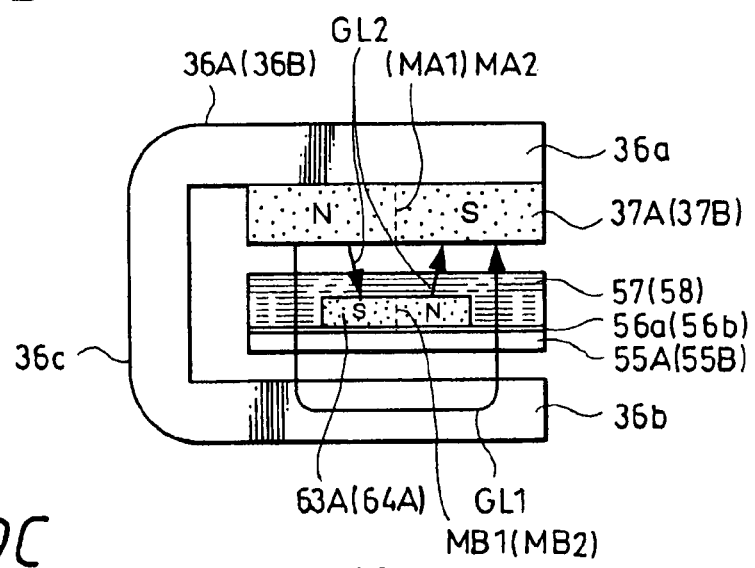
Figure 9C:
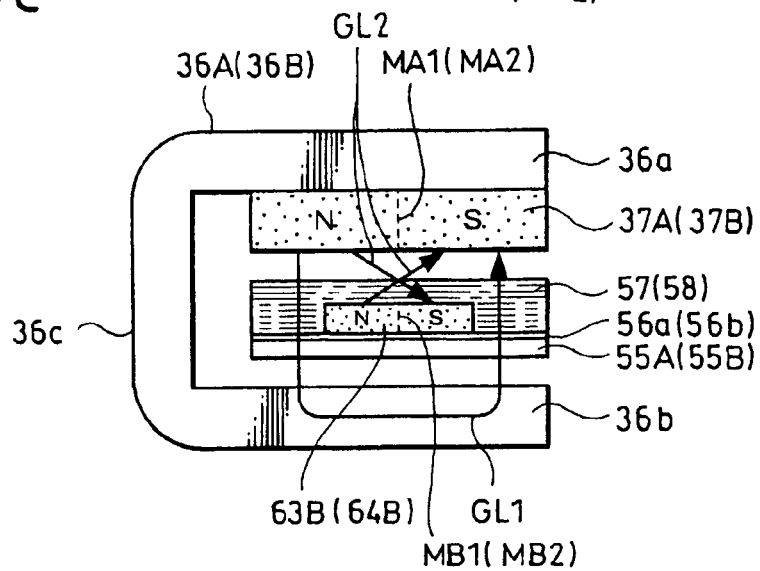

Embodiments of the present invention will be explained in the followings, referring to the drawings attached. FIGS. 1 to 35 explain embodiments of the present invention. Specifically, FIGS. 1 to 7 show an image stabilizer having a driver of a moving magnet system, according to a first embodiment of an image stabilizer of the present invention: FIG. 1 is an exploded perspective view; FIG. 2 is an assembled perspective view; and FIG. 3 is a plan view. FIGS. 4A, 4B and 4C are a front view, a rear view and a left side view respectively;

FIGS. 5A, 5B and 5C are enlarged explanatory diagrams showing a relevant part and modified examples of FIG. 4A; FIGS. 6A and 6B are a P-P line sectional view and a Q-Q line sectional view of FIG. 3 respectively; and FIGS. 7A and 7B are sectional views of a modified example, corresponding to FIGS. 6A and 6B. FIGS. 8 to 9 show a second embodiment of an image stabilizer according to the present invention, having a driver of a moving magnet system: FIGS. 8A and 8B are a plan view and a front view respectively; and FIGS. 9A, 9B and 9C are enlarged explanatory diagrams showing a relevant part and modified examples of FIG. 8A.

Figure 10A:
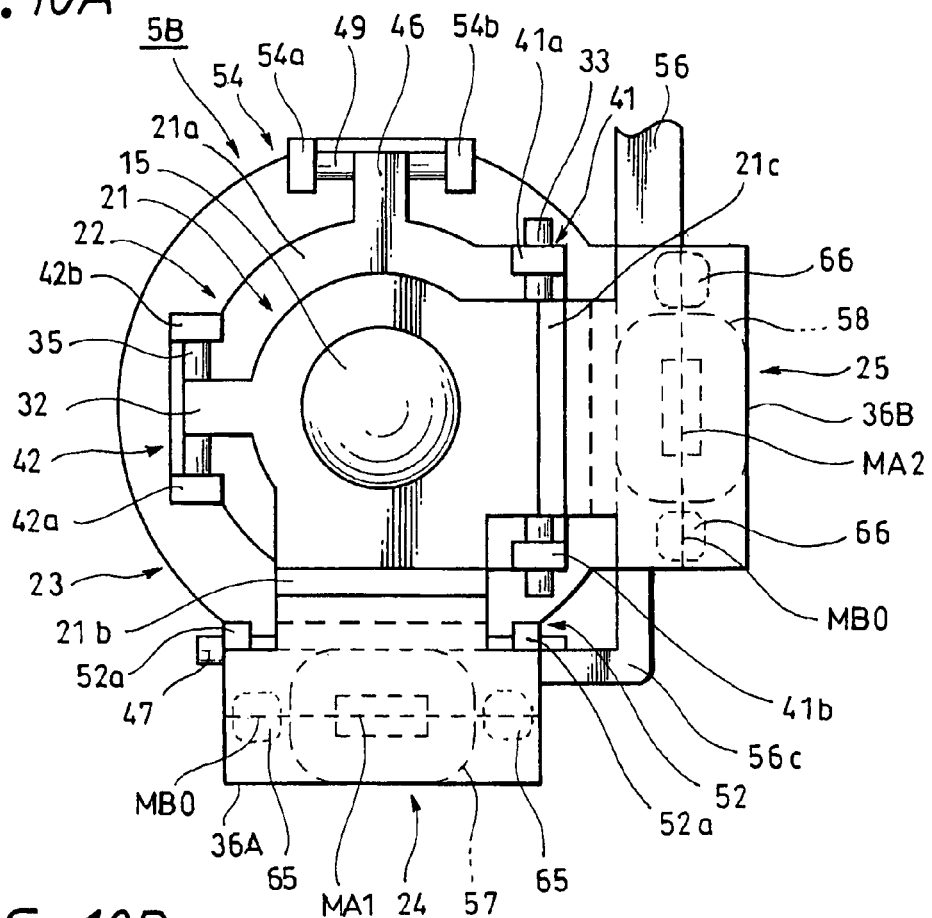
Figure 10B:
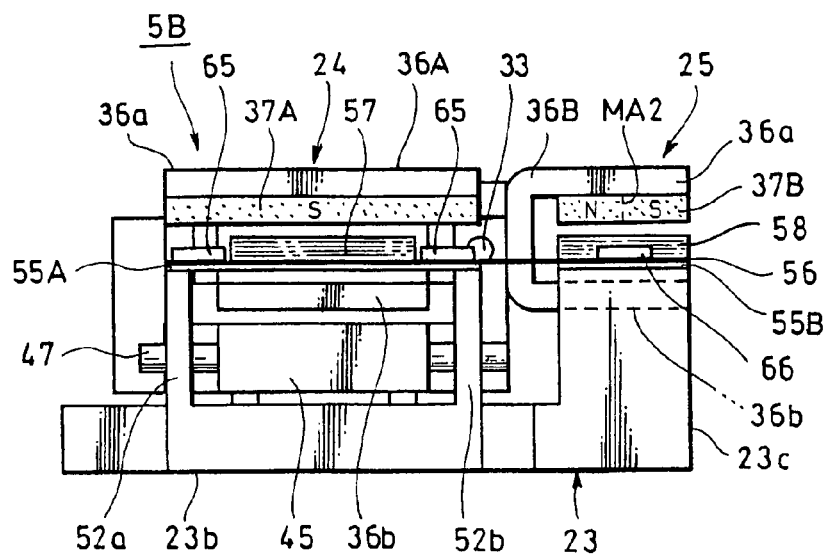
Figure 11A:
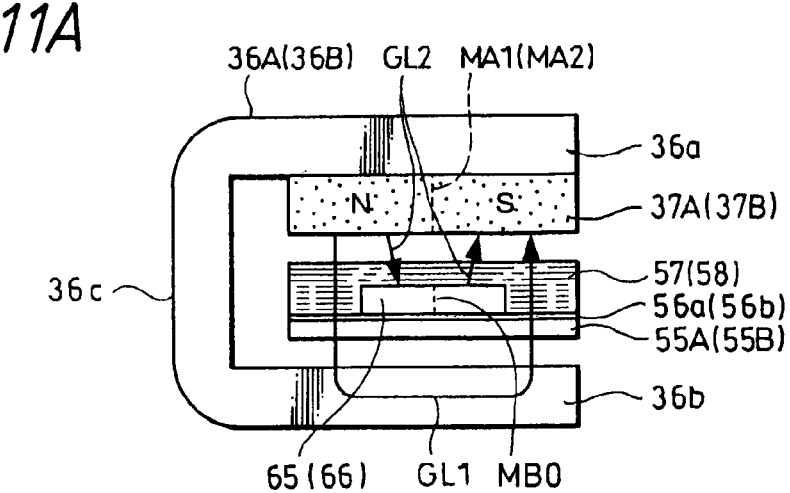
Figure 11B:
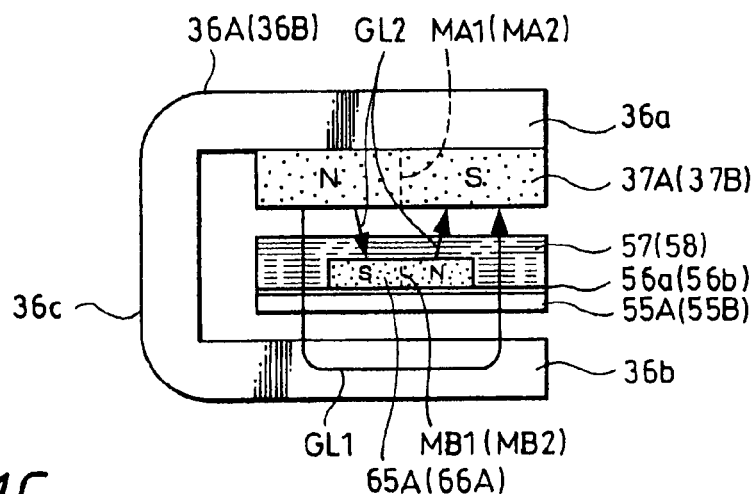
Figure 11C:
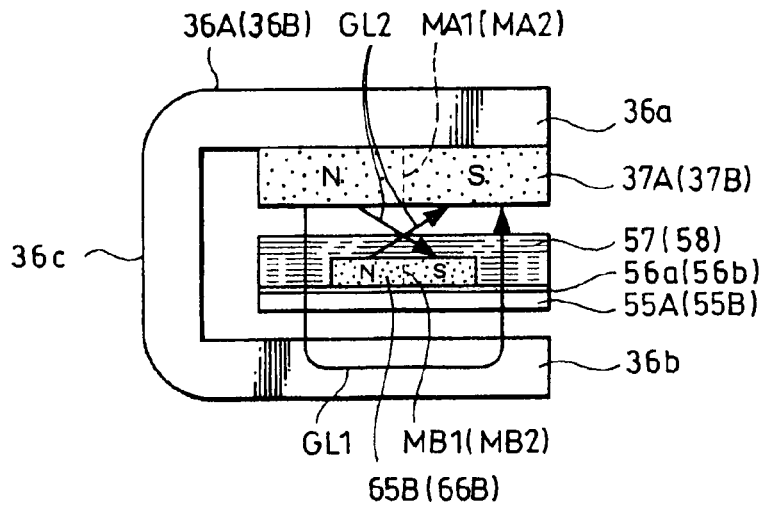
Figure 12A:
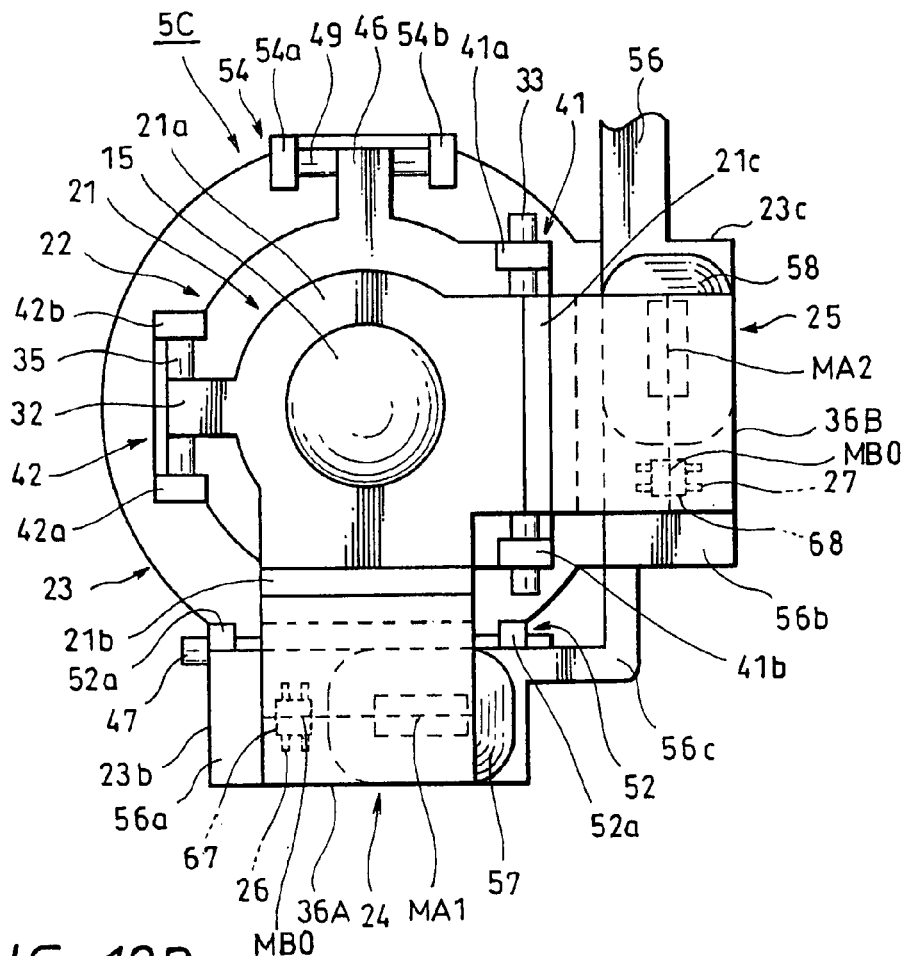
Figure 12B:
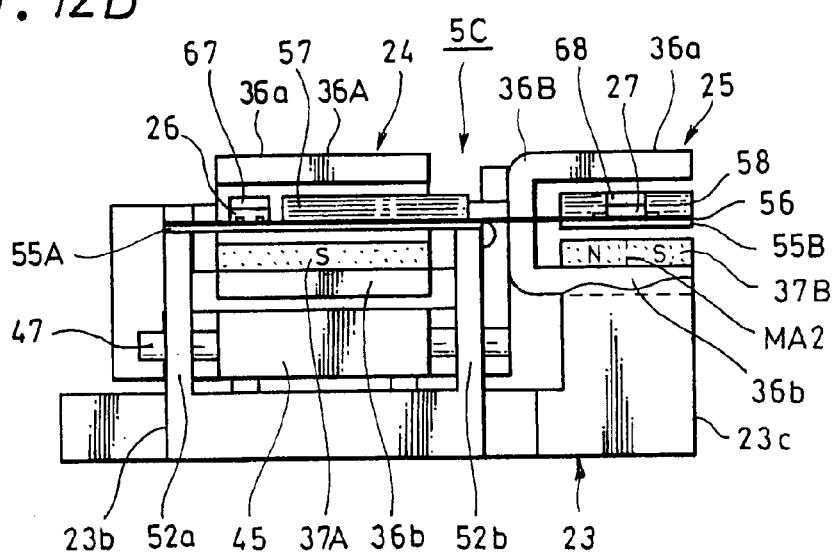
Figure 13A:
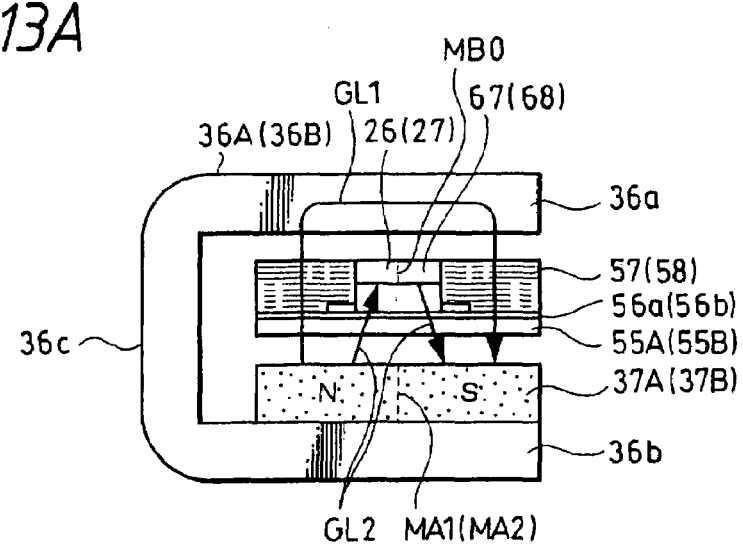
Figure 13B:
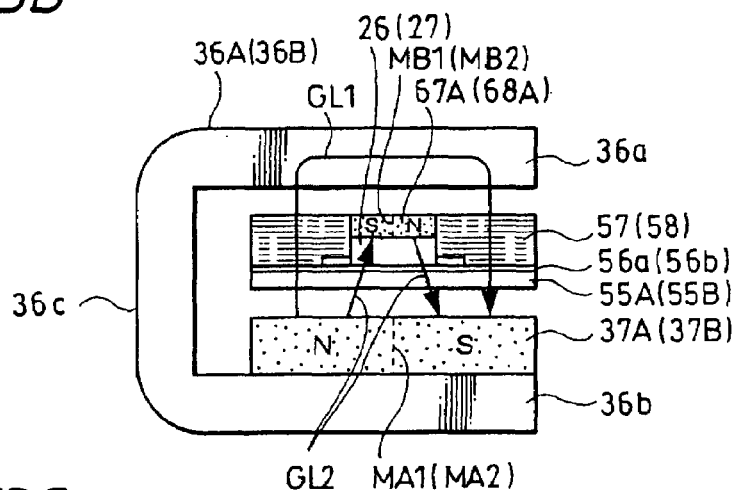
Figure 13C:
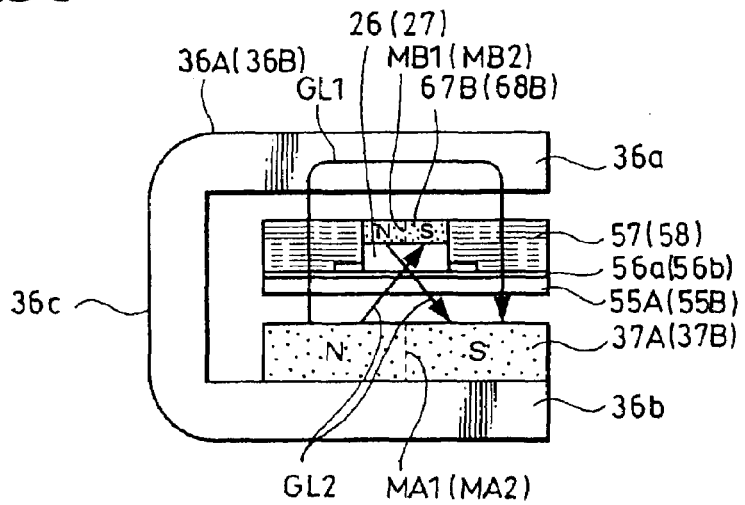
Figure 14A:
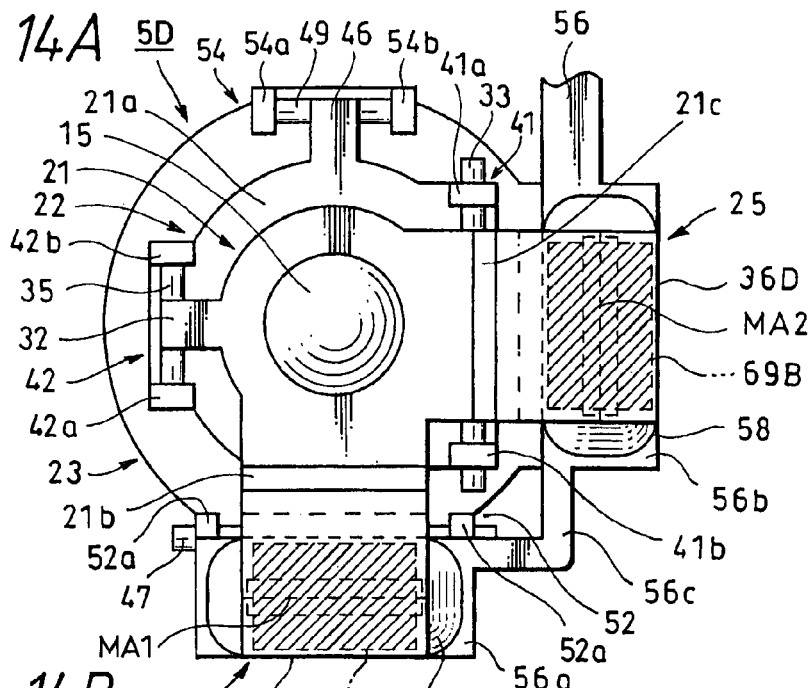
Figure 14B:
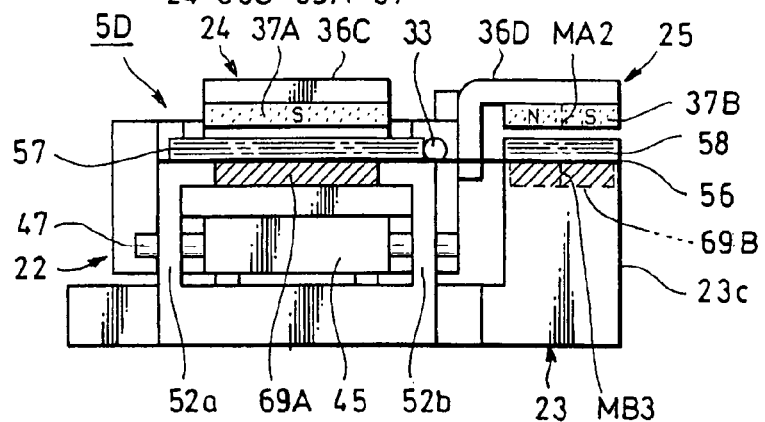
Figure 14C:
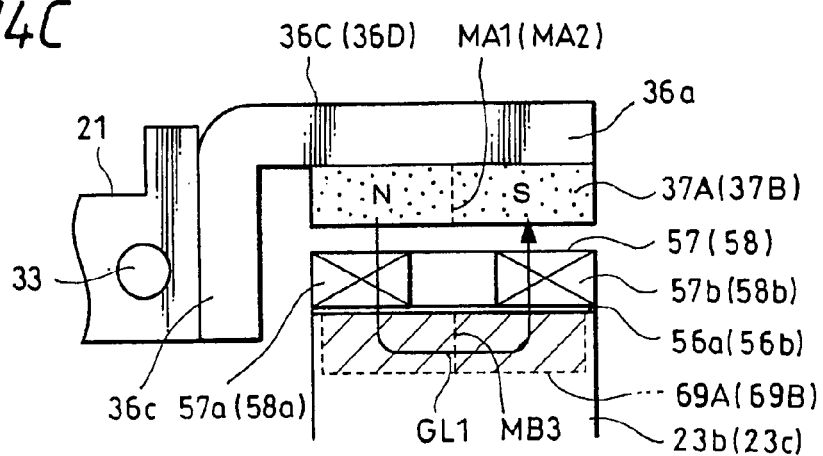

FIGS. 10 to 11 show a third embodiment of an image stabilizer according to the present invention, having a driver of a moving magnet system: FIGS. 10A and 10B are a plan view and a front view respectively; and FIGS. 11A, 11B and 11C are enlarged explanatory diagrams showing a relevant part and modified examples of FIG. 10A. FIGS. 12 to 13 show a fourth embodiment of an image stabilizer according to the present invention, having a driver of a moving magnet system: FIGS. 12A and 12B are a plan view and a front view respectively; and FIGS. 13A, 13B and 13C are enlarged explanatory diagrams showing a relevant part and modified examples of FIG. 12A. FIG. 14 shows a fifth embodiment of an image stabilizer according to the present invention, having a driver of a moving magnet system: FIGS. 14A, 14B and 14C are a plan view, a front view and an enlarged explanatory diagram showing a relevant part respectively.

Figure 15:
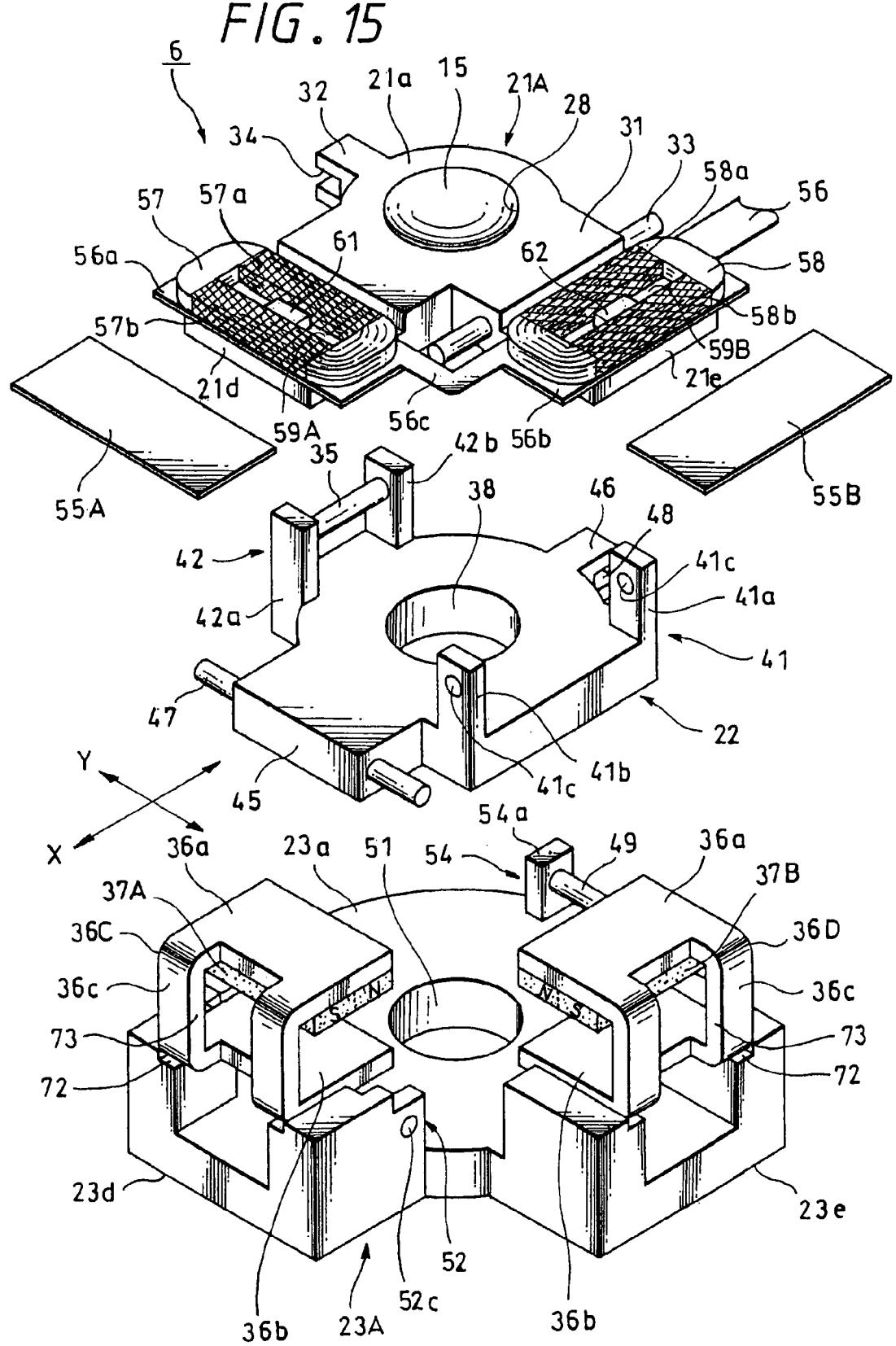
FIG. 15 is an exploded perspective view of an image stabilizer having a driver of a moving coil system, which represents a sixth embodiment of an image stabilizer according to the present invention.
Figure 16:
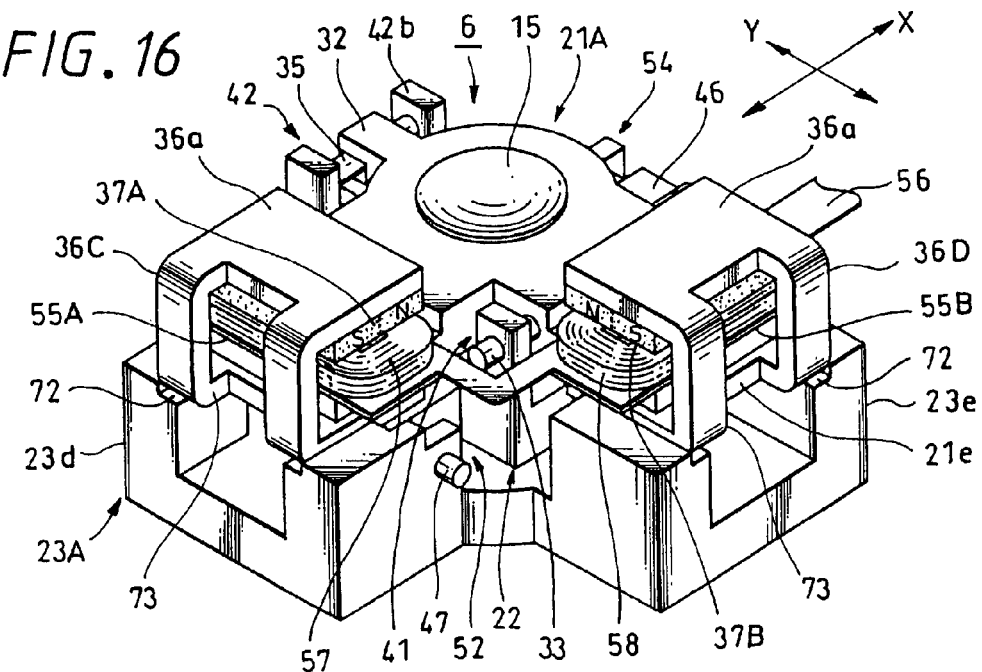
FIG. 16 is a perspective view of the image stabilizer in FIG. 15 in the assembled state.
Figure 17:
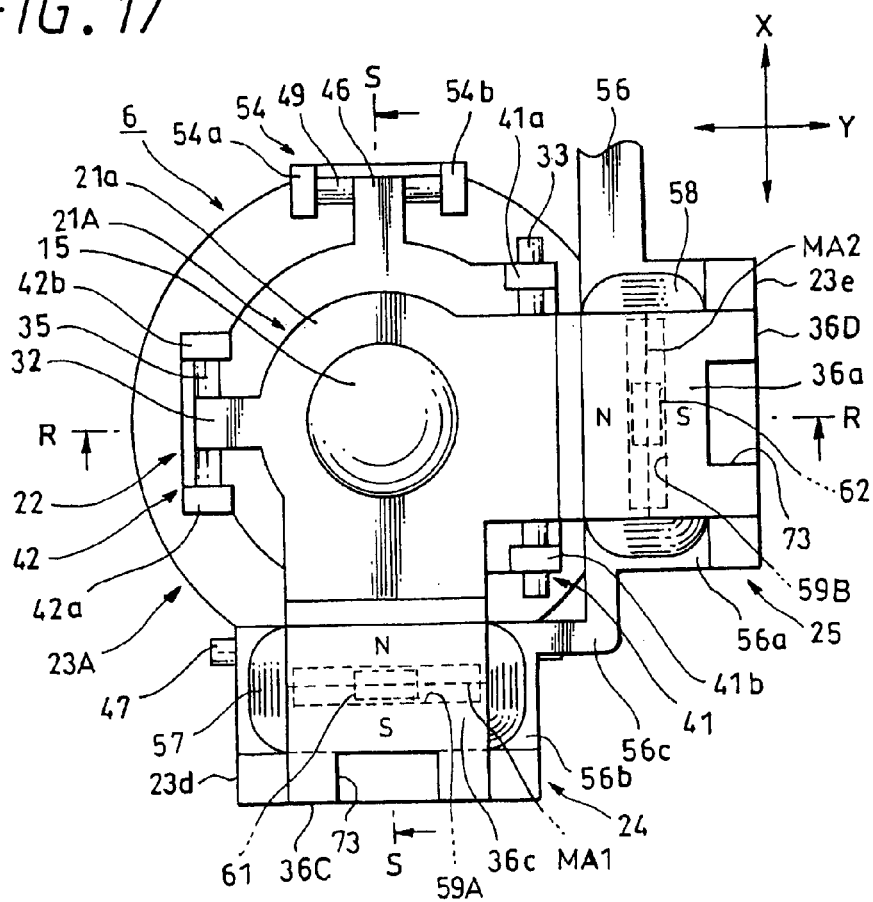
FIG. 17 is a plan view of the image stabilizer shown in FIG. 16.
Figure 18A:
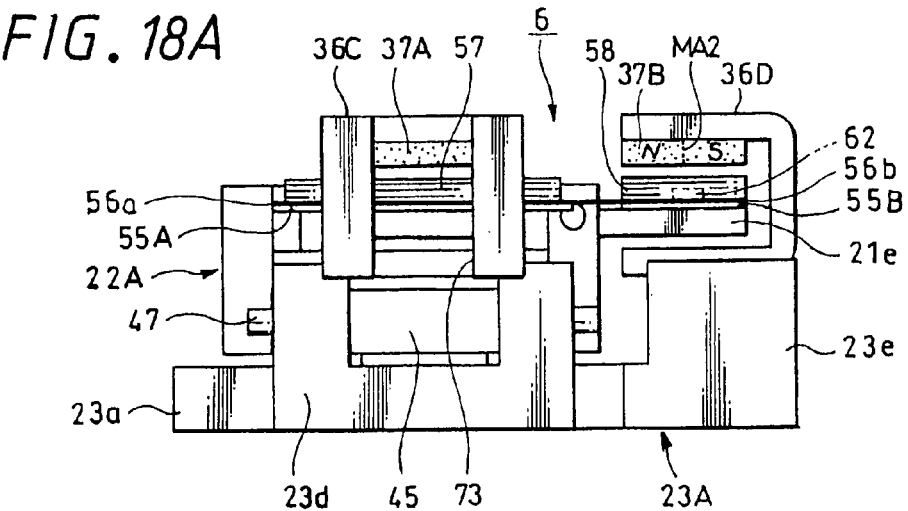
Figure 18B:
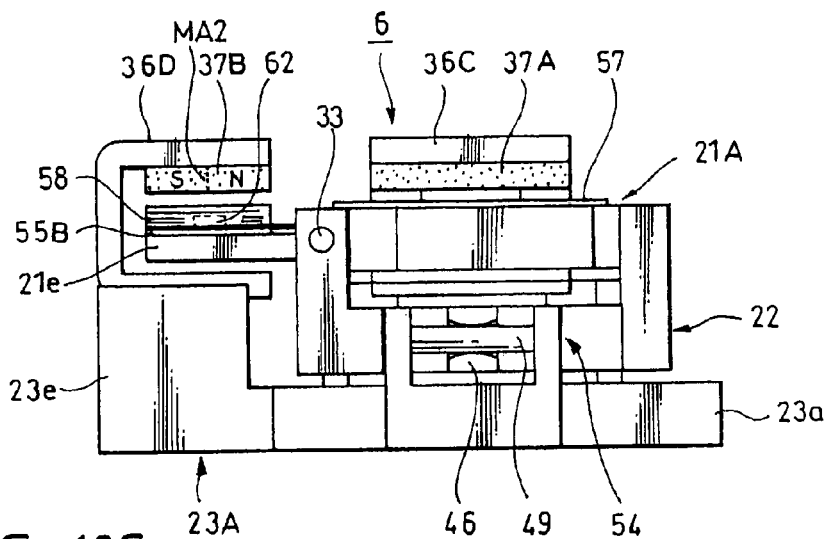
Figure 18C:
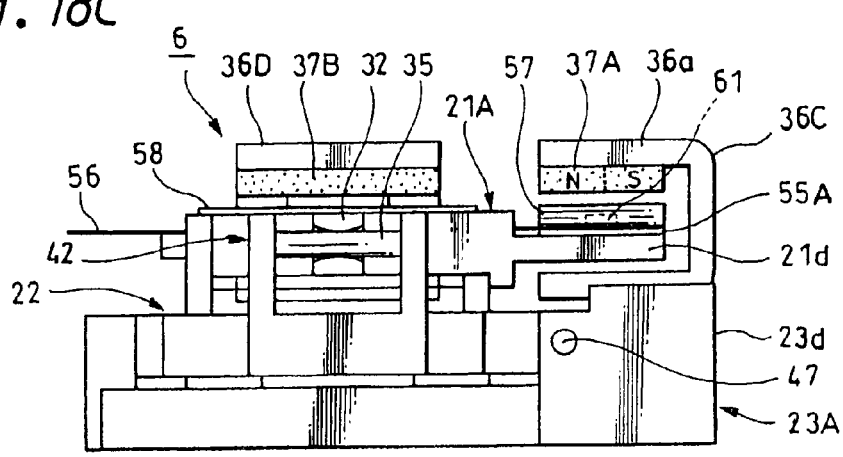
Figure 22A:
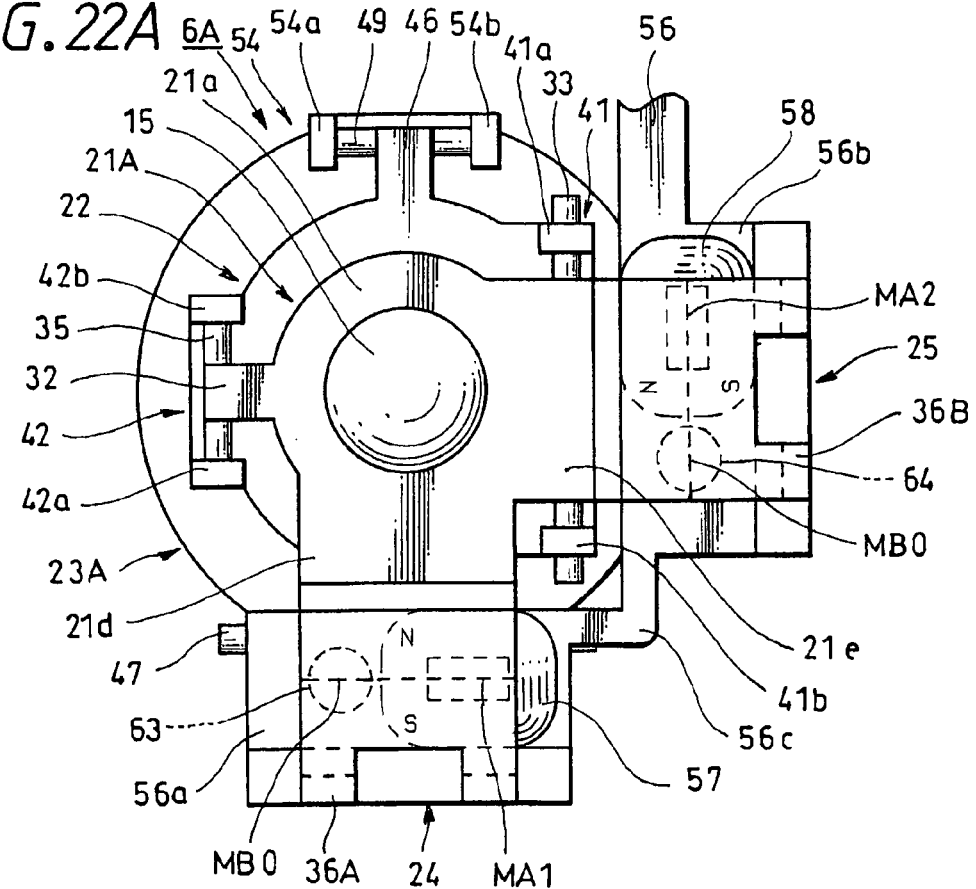
Figure 22B:
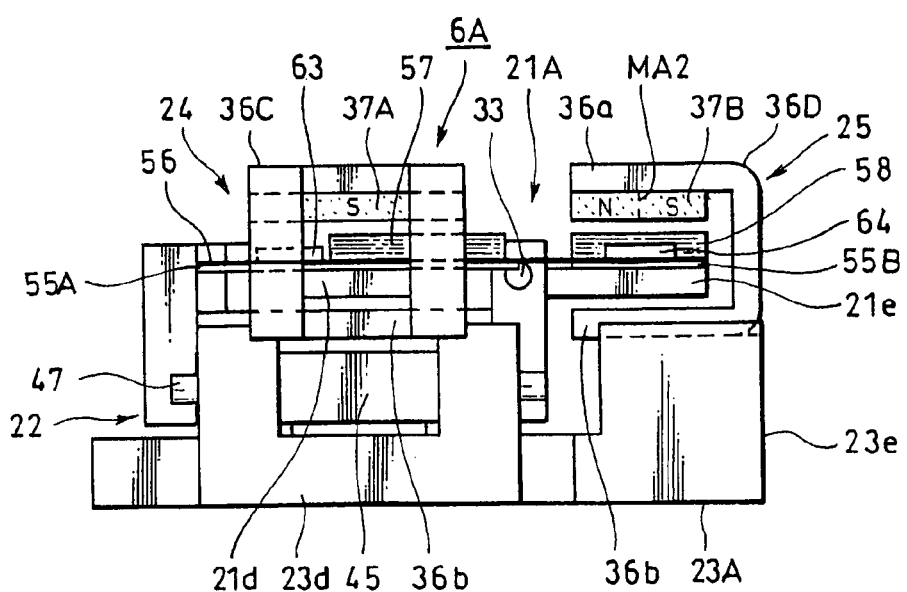
Figure 23A:
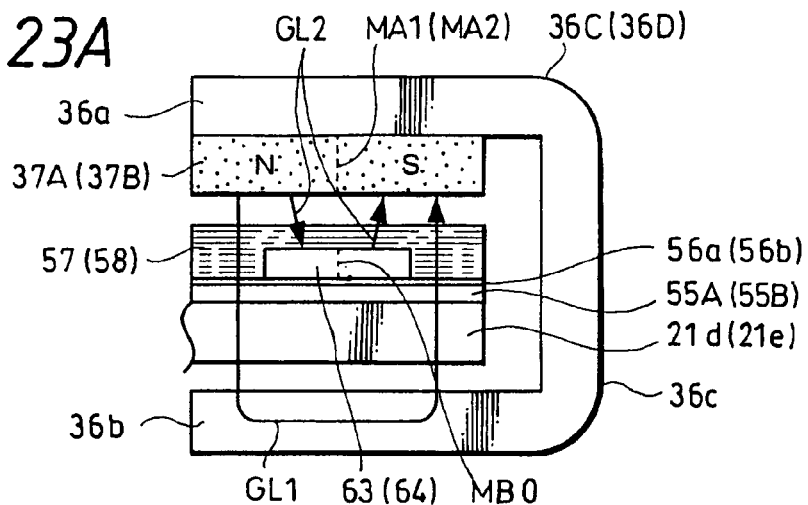
Figure 23B:
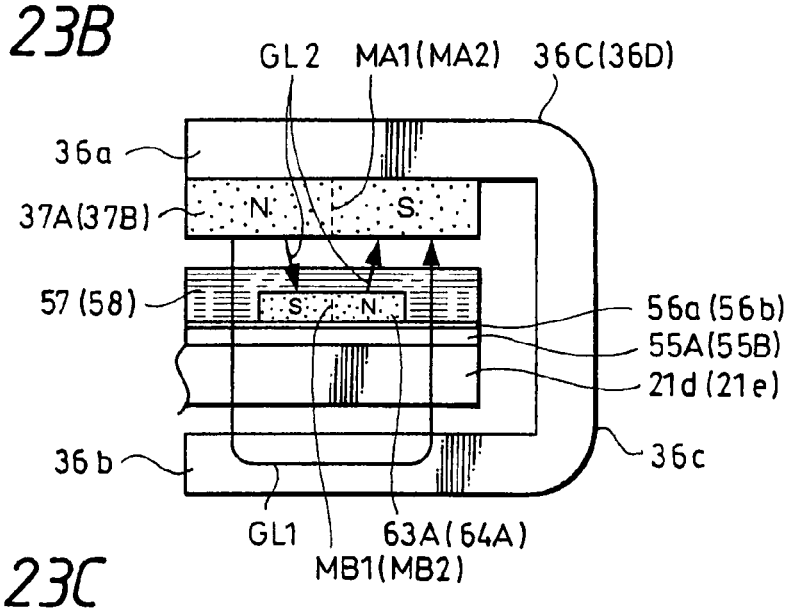
Figure 23C:
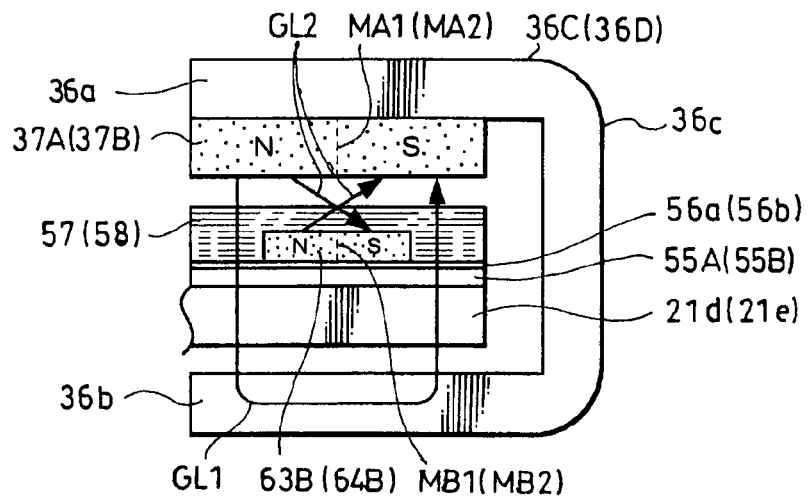

FIGS. 15 to 21 show an image stabilizer having a driver of a moving coil system, according to a sixth embodiment of an image stabilizer of the present invention: FIG. 15 is an exploded perspective view; FIG. 16 is an assembled perspective view; FIG. 17 is a plan view; and FIGS. 18A, 18B and 18C are a front view, a rear view and a left side view respectively. FIGS. 19A, 19B and 19C are enlarged explanatory diagrams showing a relevant part and modified examples of FIG. 18A; FIGS. 20A and 20B are an R-R line sectional view and an S-S line sectional view of FIG. 17 respectively; and FIGS. 21A and 21B are sectional views of a modified example, corresponding to FIGS. 20A and 20B. FIGS. 22 to 23 show a seventh embodiment of an image stabilizer according to the present invention, having a driver of a moving coil system: FIGS. 22A and 22B are a plan view and a front view respectively; and FIGS. 23A, 23B and 23C are enlarged explanatory diagrams showing a relevant part and modified examples of FIG. 22A.

Figure 24A:
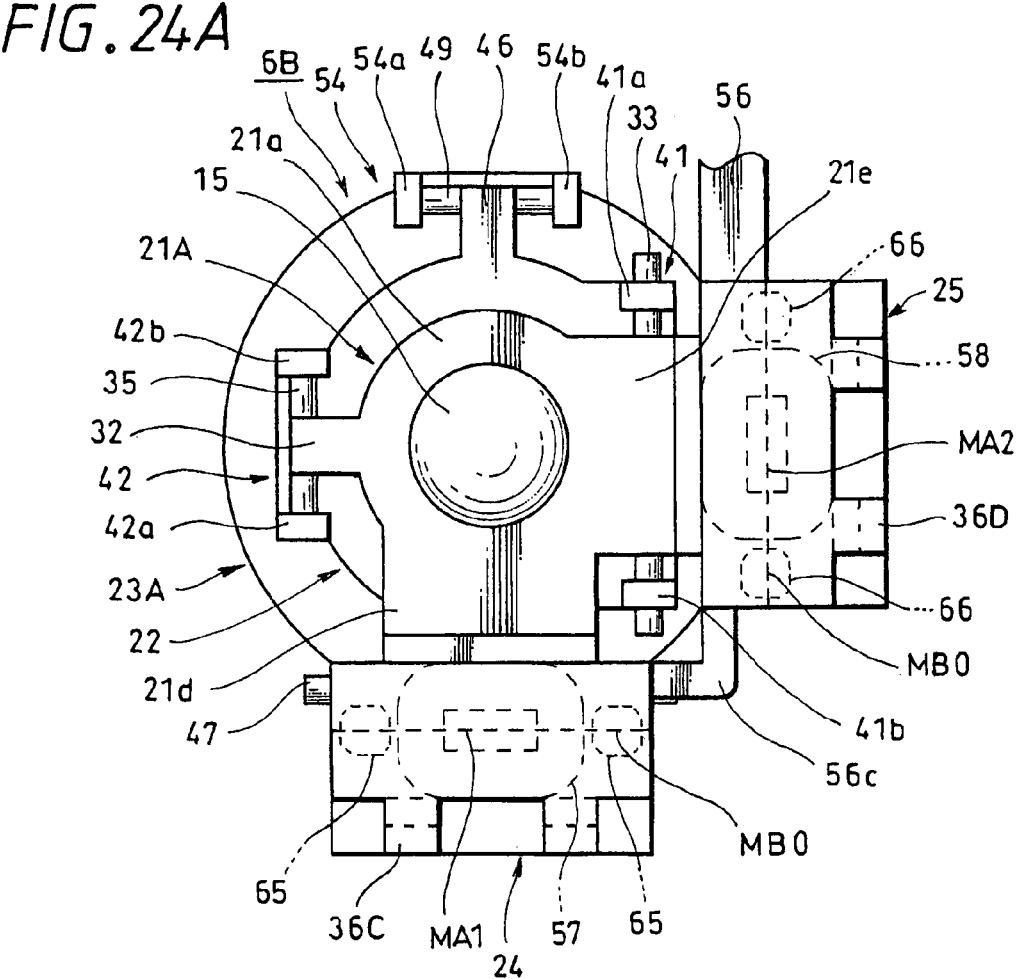
Figure 24B:
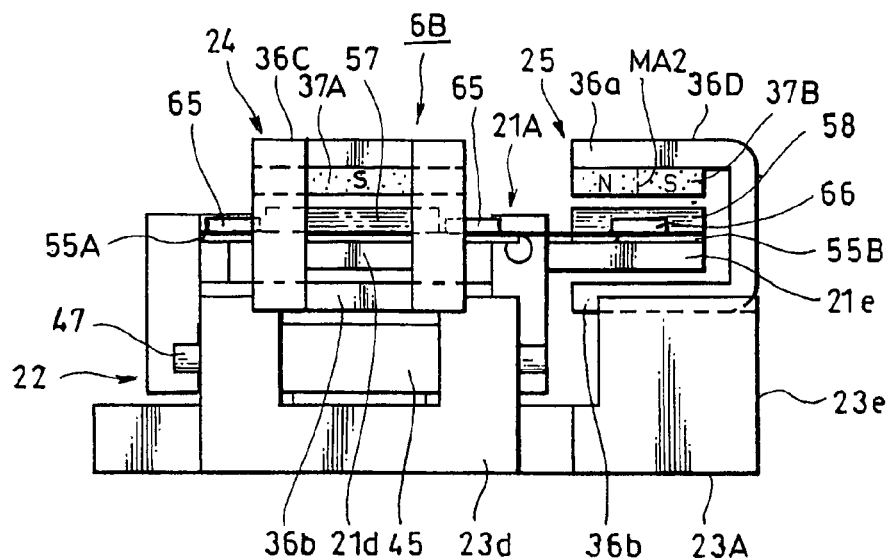
Figure 25A:
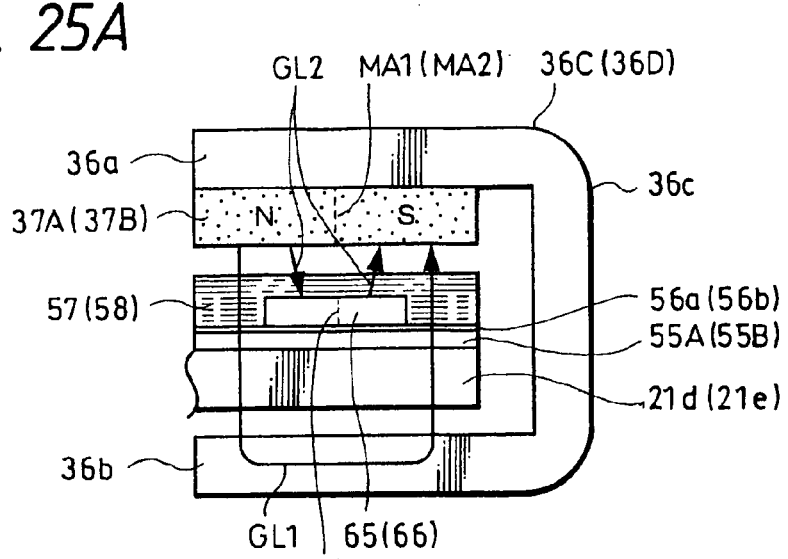
Figure 25B:
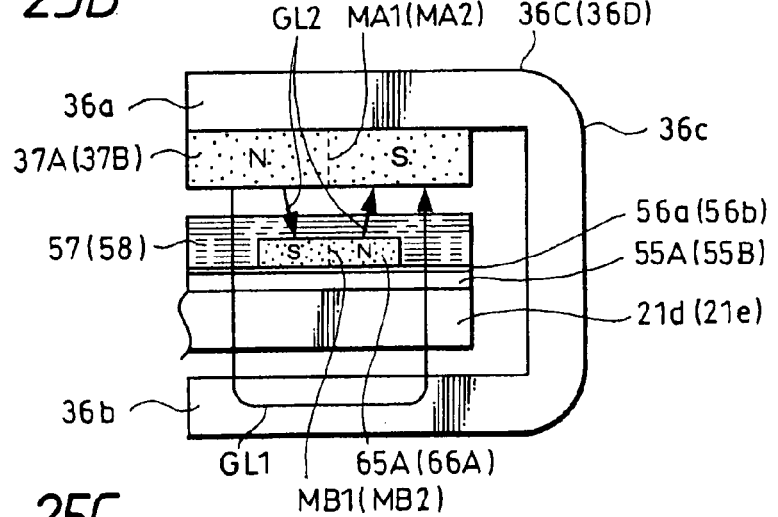
Figure 25C:
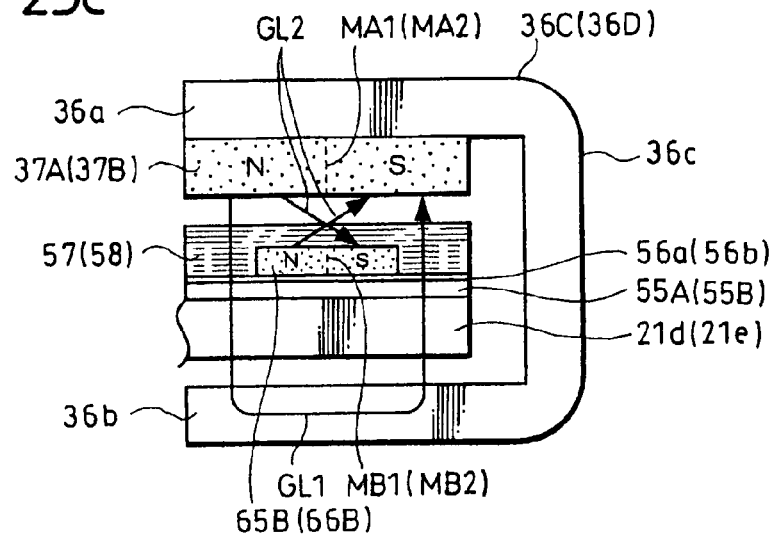
Figure 26A:
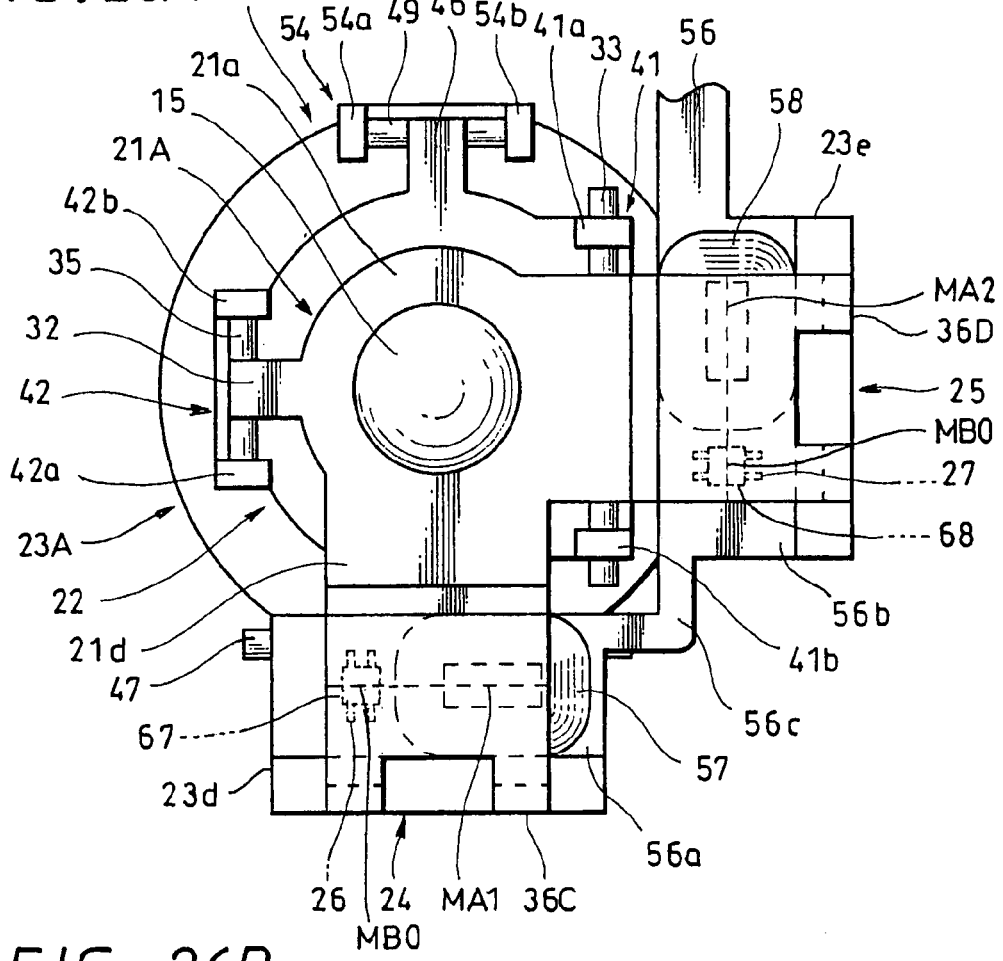
Figure 26B:
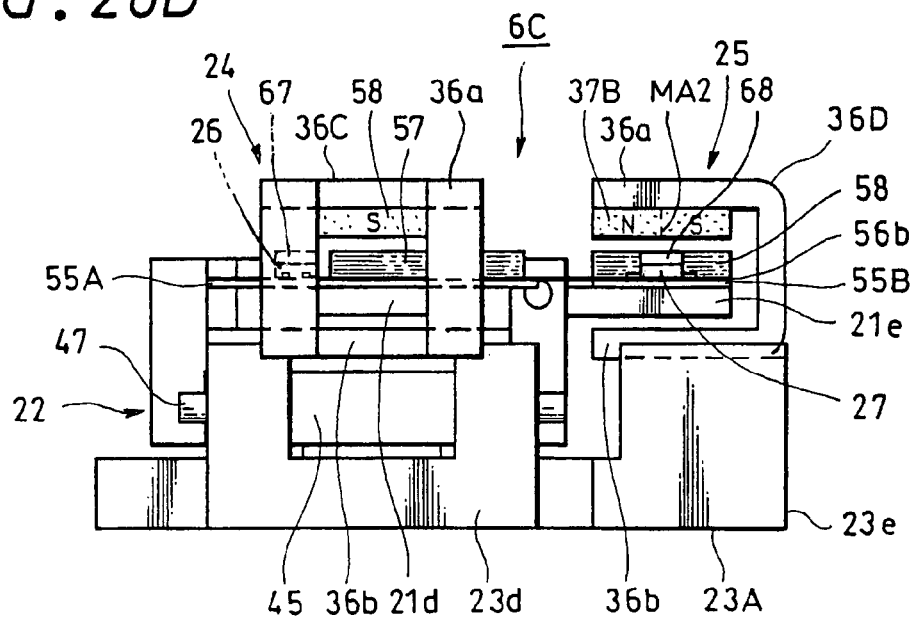
Figure 27A:
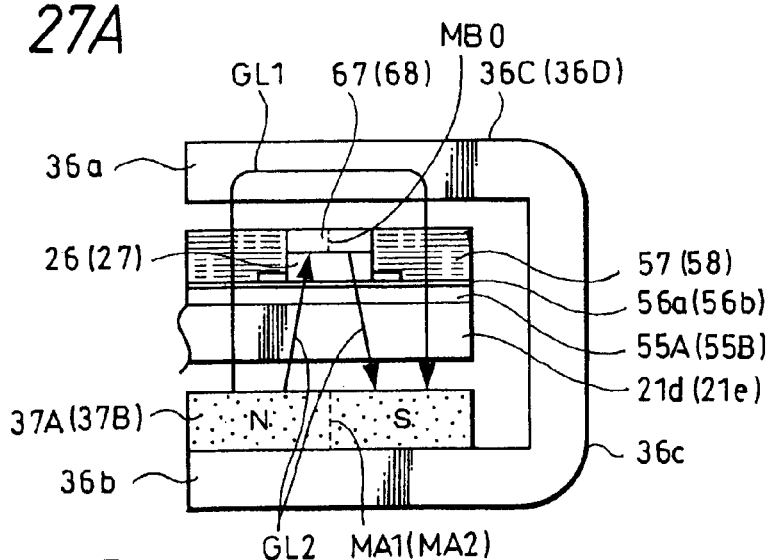
Figure 27B:
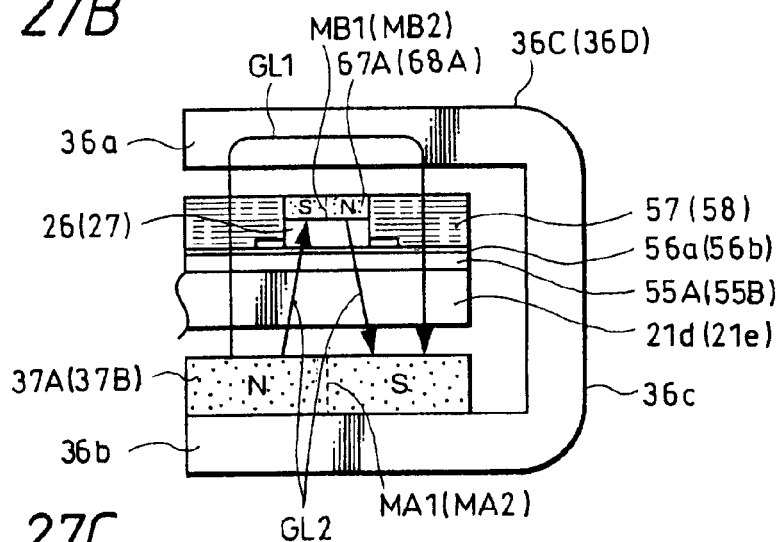
Figure 27C:
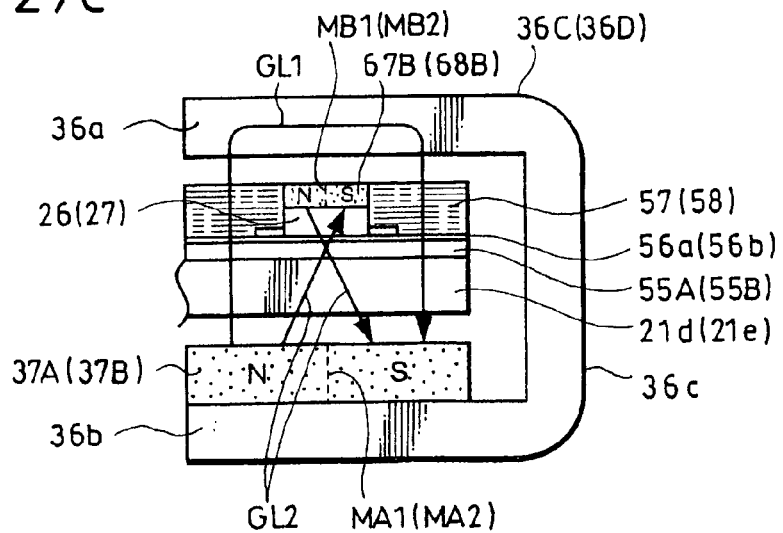
Figure 28A:
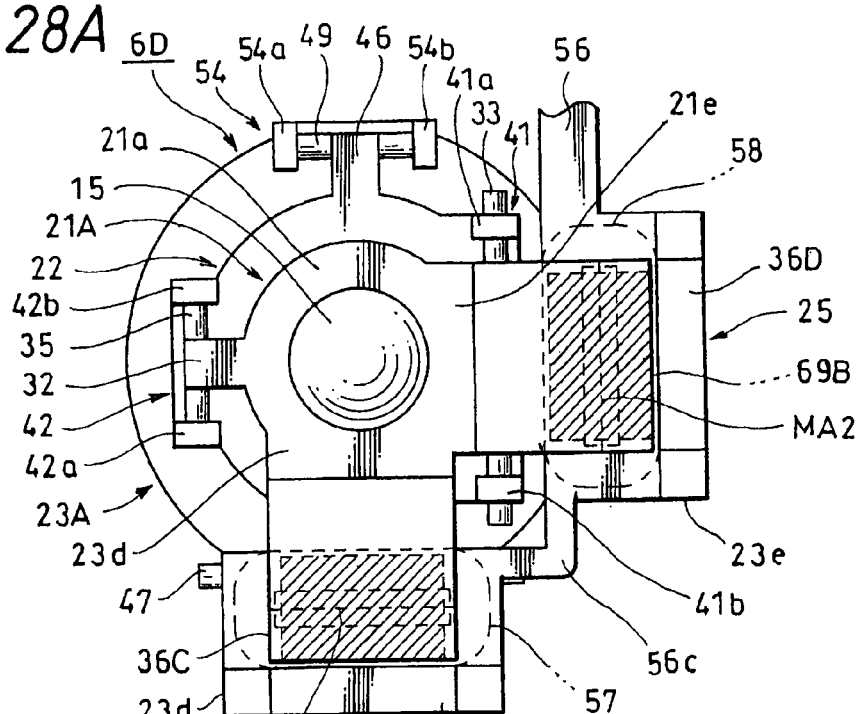
Figure 28B:
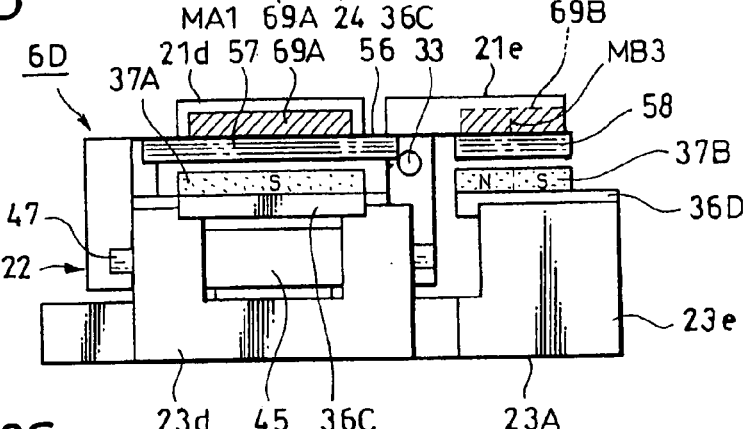
Figure 28C:
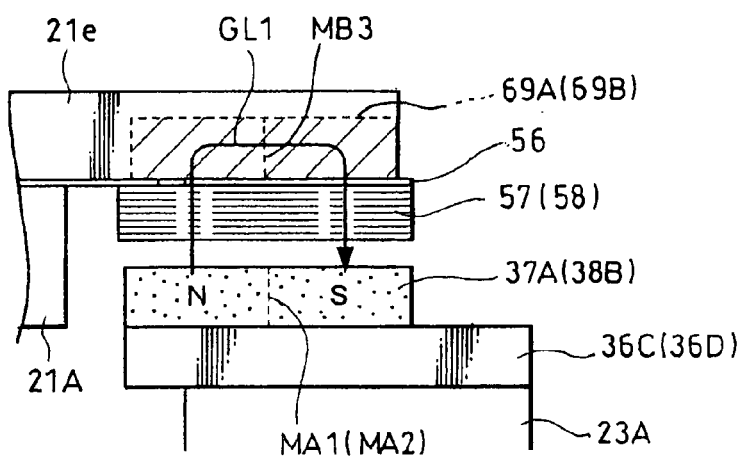

FIGS. 24 to 25 show an eighth embodiment of an image stabilizer according to the present invention, having a driver of a moving coil system: FIGS. 24A and 24B are a plan view and a front view respectively; and FIGS. 25A, 25B and 25C are enlarged explanatory diagrams showing a relevant part and modified examples of FIG. 24A. FIGS. 26 to 27 show a ninth embodiment of an image stabilizer according to the present invention, having a driver of a moving coil system: FIGS. 26A and 26B are a plan view and a front view respectively; and FIGS. 27A, 27B and 27C are enlarged explanatory diagrams showing a relevant part and modified examples of FIG. 26A. FIG. 28 shows a tenth embodiment of an image stabilizer according to the present invention, having a driver of a moving coil system: FIGS. 28A, 28B and 28C are a plan view, a front view and an enlarged explanatory diagram showing a relevant part respectively.

Figure 29:
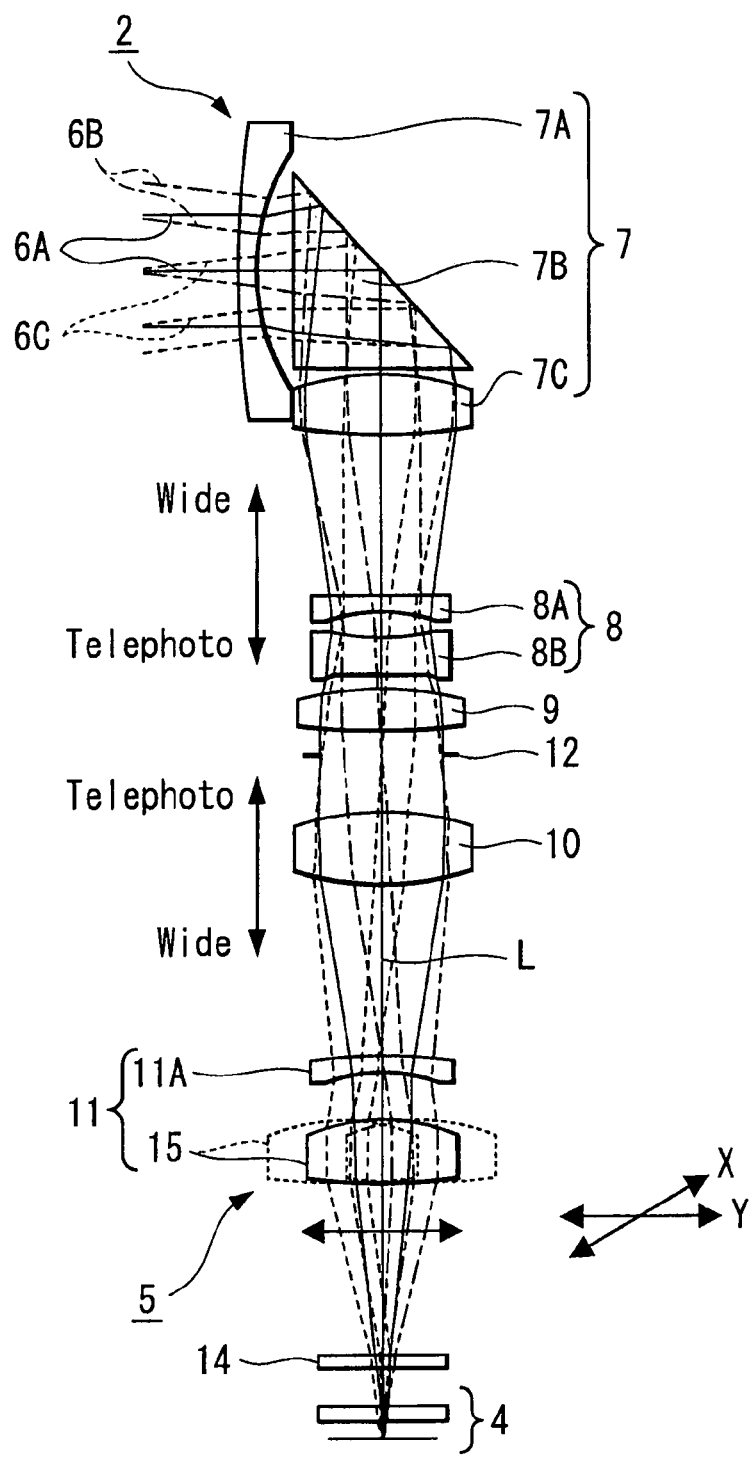
FIG. 29 is an explanatory diagram for explaining a lens system of a lens device shown in FIG. 1.
Figure 30:
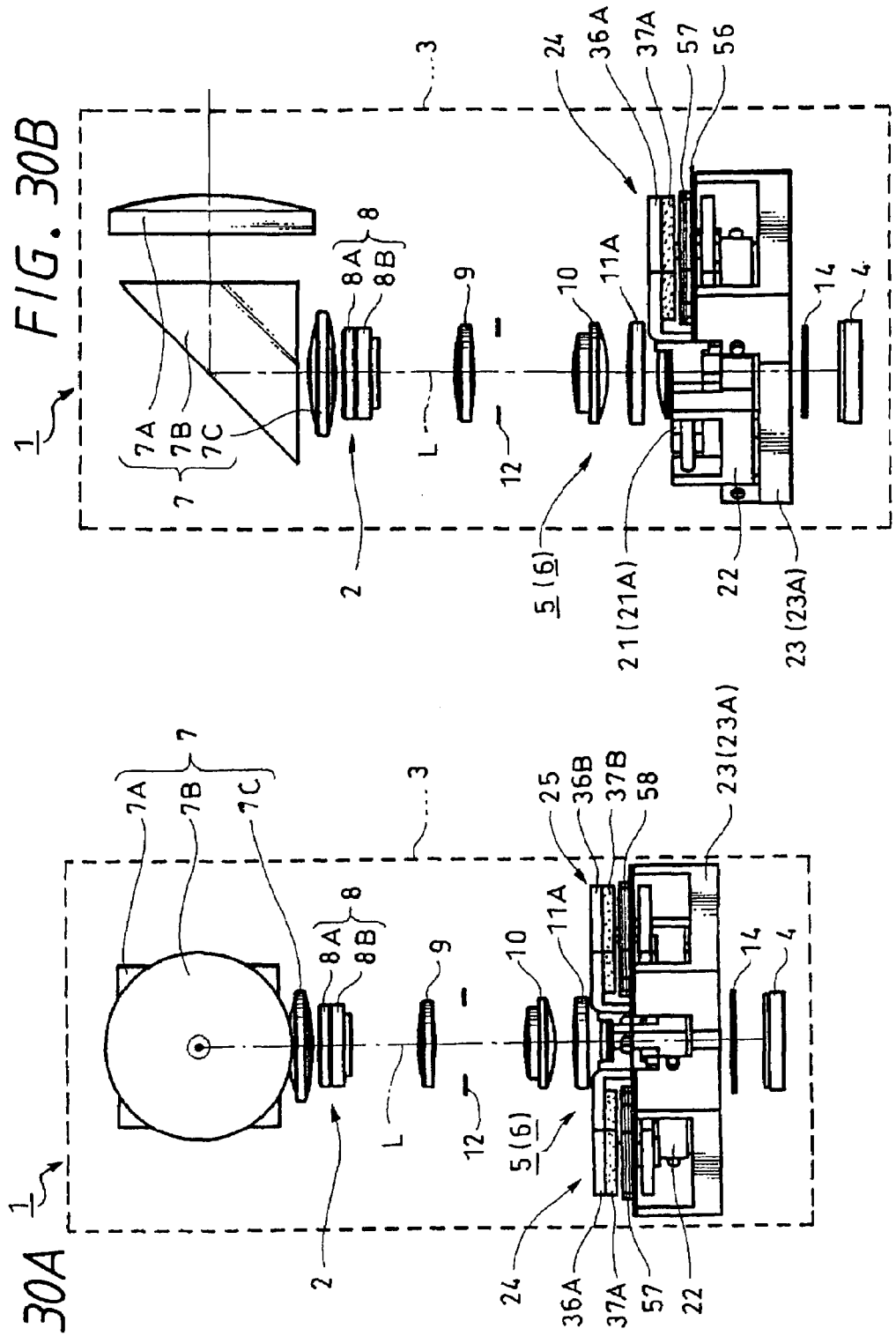
Figure 31:
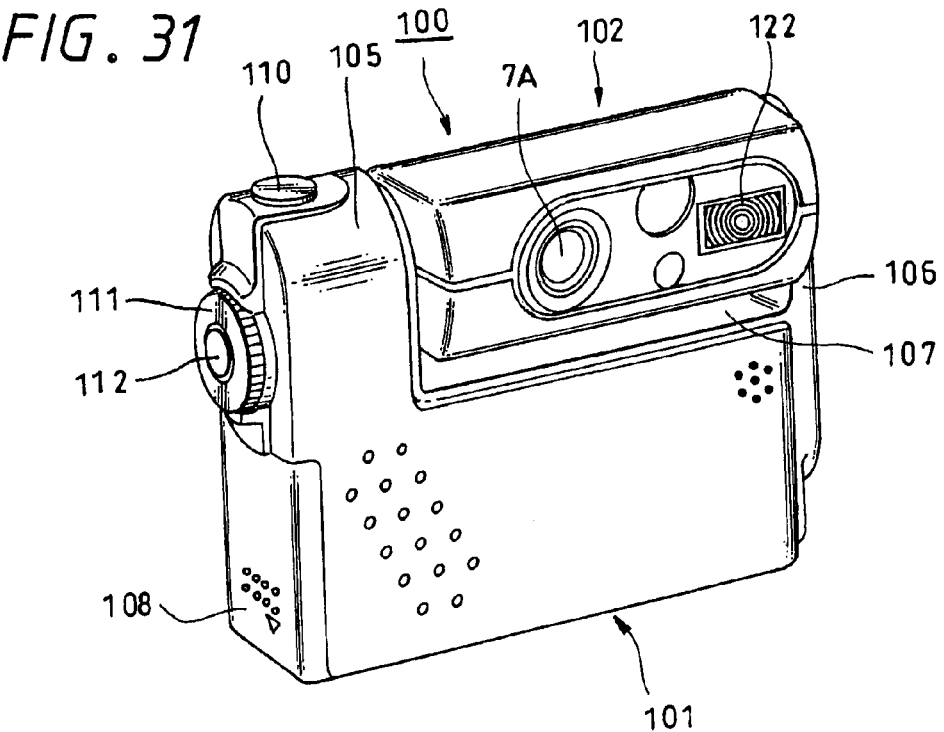
FIG. 31 is a perspective view of a digital still camera, as seen from the front side, showing a first embodiment of an imaging apparatus according to the present invention.
Figure 32:
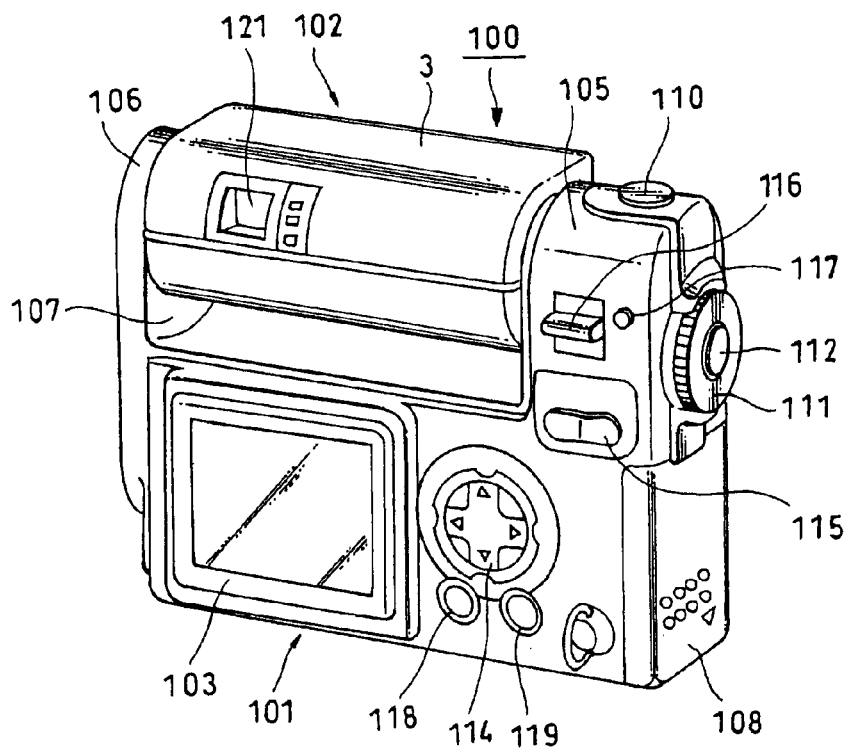
FIG. 32 is a perspective view of a digital still camera, as seen from the rear side, showing a first embodiment of an imaging apparatus according to the present invention.
Figure 33:
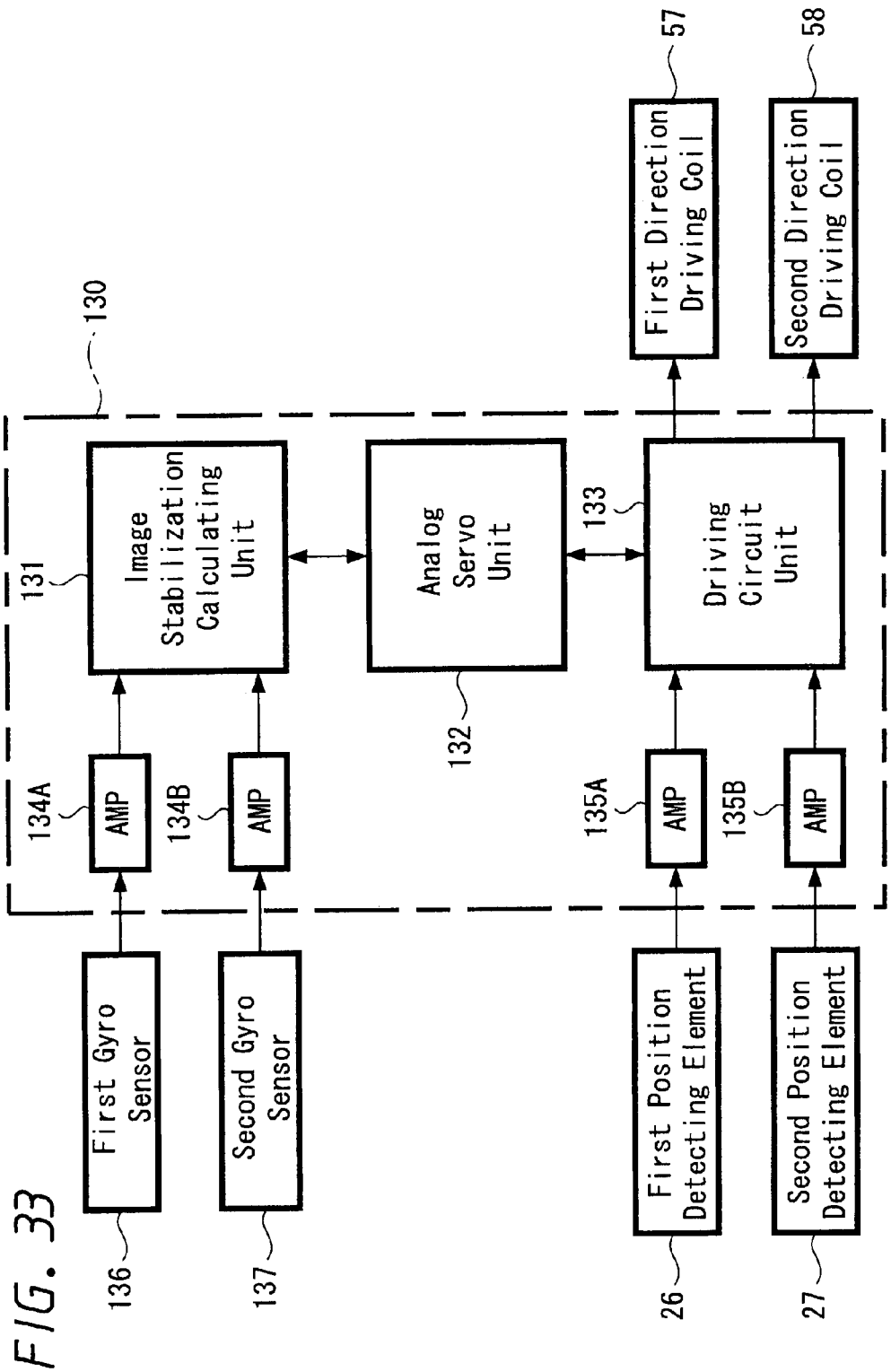
FIG. 33 is a block diagram for explaining the control concept of an image stabilizer according to an embodiment of the present invention.
Figure 34:
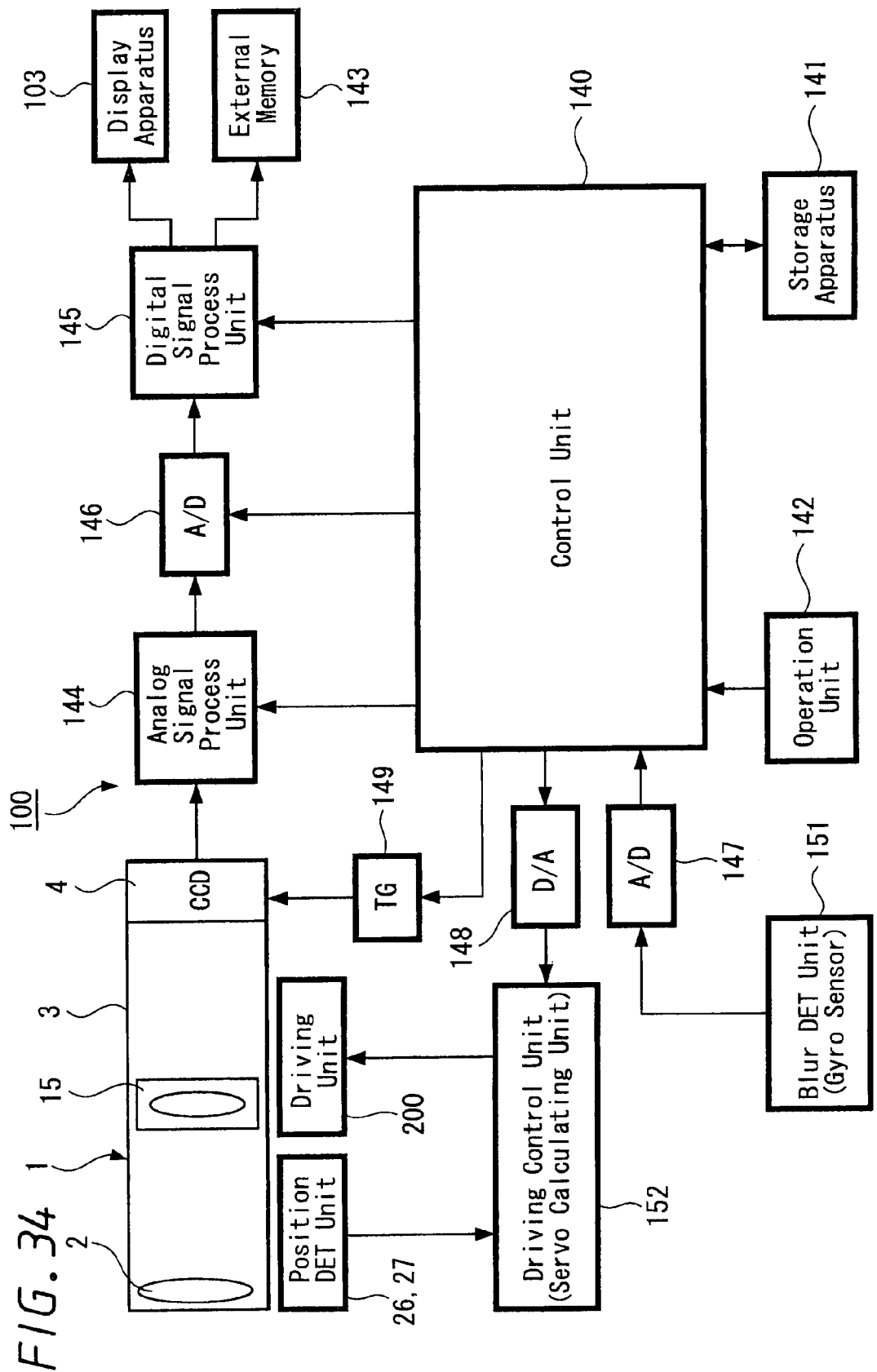
FIG. 34 is a block diagram showing a first embodiment of a schematic configuration of an imaging apparatus according to the present invention.
Figure 35:
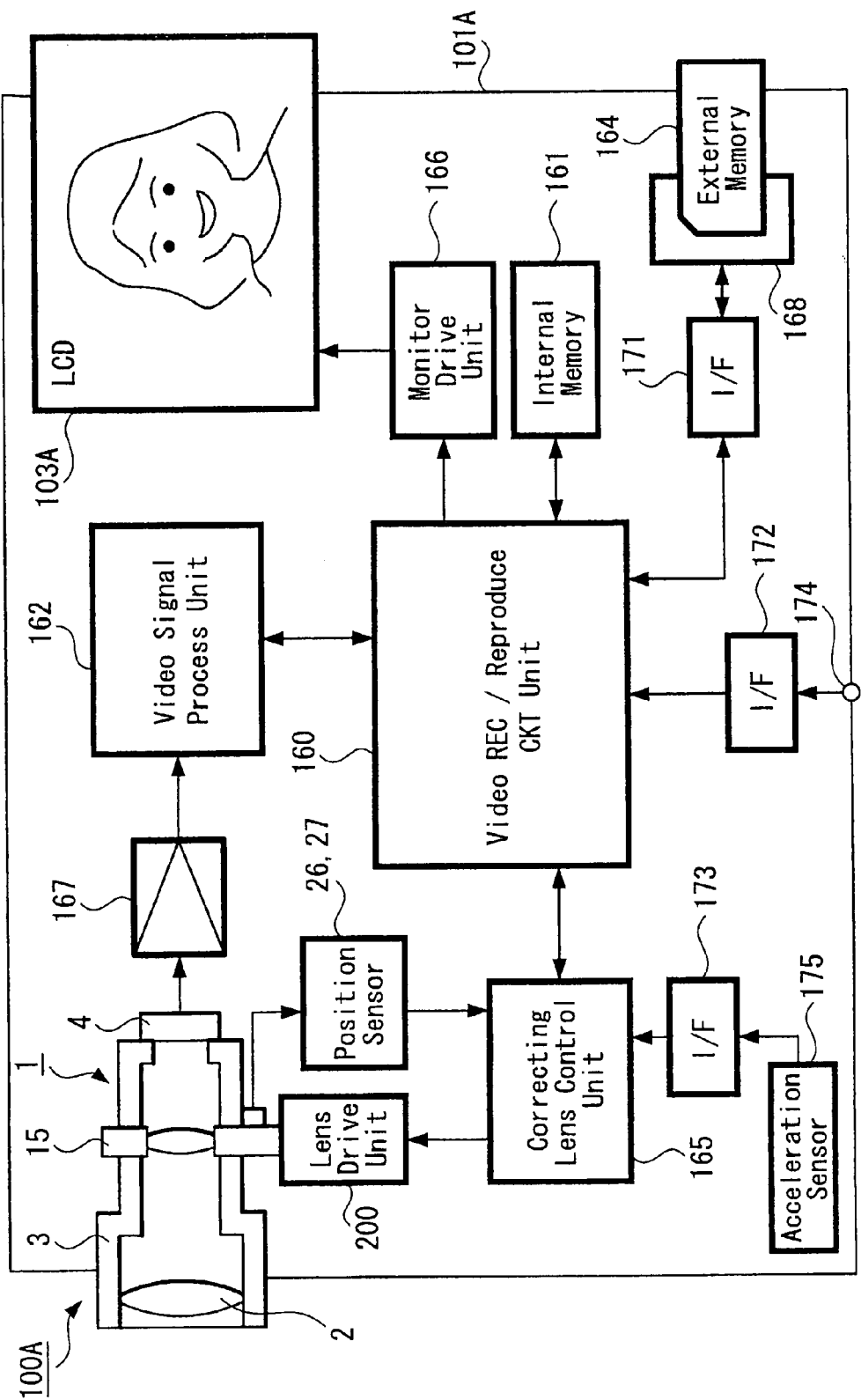
FIG. 35 is a block diagram showing a second embodiment of a schematic configuration of an imaging apparatus according to the present invention.

FIG. 29 is an explanatory diagram of a lens system of a first embodiment of a lens device according to the present invention; and FIGS. 30A and 30B are explanatory diagrams of a lens device, as seen from a lateral side and the front side respectively. FIG. 31 is a perspective view of a digital still camera according to a first embodiment of an imaging apparatus of the present invention, as seen from the front side; and FIG. 32 is a perspective view of a digital still camera, as seen from the rear side. FIG. 33 is a block diagram for explaining the control concept of an image stabilizer according to an embodiment of the present invention; FIG. 34 is a block diagram showing a first embodiment of the schematic configuration of an imaging apparatus according to the present invention; and FIG. 35 is a block diagram showing a second embodiment of a schematic configuration of an imaging apparatus.

First, a lens device according to an embodiment of the present invention is explained. As shown in FIGS. 29 to 30, a lens device 1 representing a first embodiment of a lens device of the present invention includes a lens system 2, a lens barrel 3, a CCD (solid-state imaging device) 4, an image stabilizer 5 and the like. The lens system 2 has five group lenses in which a plurality of lenses are disposed on the same optical axis L. The lens barrel 3 supports the lenses of this lens system 2 in a fixed or movable manner. The CCD 4, representing a specific example of an imager, is arranged on the optical axis L of the lens system 2 and is fixed to the lens barrel 3. The image stabilizer 5 is attached to the lens barrel 3 and stabilizes images of the lens system 2.

As shown in FIG. 29 and other figures, the lens system 2 in the lens device 1 includes a collapsible lens having a collapsible lens system formed of five group lenses 7 to 11 in which five lens groups are disposed on the same optical axis L. Of the five group lenses 7 to 11, the first-group lens 7 positioned at the front end includes: a first lens 7A which is an objective lens facing a subject; a prism 7B arranged on the side opposite to the subject regarding this objective lens 7A; and a second lens 7C which faces this prism 7B. The prism 7B is formed of a triangular prism whose cross section is shaped to be an isosceles right triangle; one of the two sides which are adjacent to each other and rotationally displaced by 90° is faced by the objective lens 7A, and the other side is faced by the second lens 7C.

As regards the first-group lens 7, light passing through the objective lens 7A enters the prism 7B from one surface. The light is then reflected on a reflecting surface inclined 45° regarding the optical axis L, and then is made to advance in a direction that is bent by 90°. Subsequently, the light passes through the second lens 7C after being emitted from the other side; and eventually advances toward a second-group lens 8 along the optical axis L. The second-group lens 8 is a combination of a third lens 8A and fourth lens 8B, and is constructed in such a manner as to be movable on the optical axis L. Light passing through the second-group lens 8 enters a third-group lens 9.

The third-group lens 9 is formed of a fifth lens fixed to the lens barrel 3. Behind the third-group lens 9 is provided a fourth-group lens 10 formed of a sixth lens. Between the fourth-group lens 10 and the third-group lens 9 is provided an iris mechanism 12 capable of adjusting the amount of light which passes through the lens system 2. The fourth-group lens 10 is constructed in such a manner as to be movable on the optical axis L. Behind the fourth group lens 10 is provided a fifth-group lens 11 formed of a seventh lens 11A and of a correcting lens 15 described later on. Of the components of the fifth-group lens 11, the seventh lens 11A is fixed to the lens barrel 3, the correcting lens 15 is provided behind this seventh lens 11A in a movable manner, and further, a CCD 4 is provided behind the correcting lens 15.

The second-group lens 8 and the fourth-group lens 10 are movable in the direction of the optical axis independently and separately along the optical axis L. By moving the second-group lens 8 and the fourth-group lens 10 in predetermined directions, zoom adjustment and focus adjustment can be performed. Specifically, at the time of zooming, by moving the second-group lens 8 and the fourth-group lens 10 from wide to telephoto, zoom adjustment is carried out. Also, at the time of focusing, by moving the fourth-group lens 10 from wide to telephoto, focus adjustment can be carried out.

The CCD 4 is fixed to a CCD adaptor and is attached to the lens barrel 3 by means of this CCD adaptor. In front of the CCD 4 is provided an optical filter 14, and between this optical filter 14 and the seventh lens 11A is provided the image stabilizer 5 having the correcting lens 15. The image stabilizer 5 that is later described in detail is for stabilizing picked-up images blurred by vibration of the lens system 2 or the like by the correcting lens 15. In its normal state, the correcting lens 15 is installed such that the optical axis thereof coincides with the optical axis L of the lens system 2. Then, when an image is blurred on the focusing plane of the CCD 4 owing to vibration of a camera or the like, the image blurring on the focusing plane is stabilized by the image stabilizer 5 which moves the correcting lens 15 in two directions (a first direction X and second direction Y) perpendicular to the optical axis L.

FIGS. 1 to 7 show an image stabilizer according to a first embodiment of the present invention. This first embodiment is an image stabilizer 5 including a driver of a moving magnet system. Further, FIGS. 8 to 14 show image stabilizers according to second to fifth embodiments of the present invention, each of the stabilizers including a driver of a moving magnet system.

The image stabilizer 5 explained as a first embodiment has a structure shown in FIGS. 1 to 6. This image stabilizer 5 includes: the above-mentioned correcting lens 15, a first moving frame 21, a second moving frame 22, a fixed base board 23, a first electric actuator 24, a second electric actuator 25, hall elements 26 and 27, and the like. The first moving frame 21 supports the correcting lens 15. The second moving frame 22 supports the first moving frame 21 in a movable manner in a first direction X perpendicular to the optical axis L of the lens system 2. The fixed base board 23 supports the second moving frame 22 in a movable manner in a second direction Y perpendicular to the optical axis L and perpendicular to the first direction X. The first electric actuator 24 moves the first moving frame 21 in the first direction X and the second electric actuator moves the second moving frame 22 in the second direction Y. The hall elements 26 and 27 detect the position of the correcting lens 15.

When the camera which will be described later on is shaken or vibrated by camera shake or the like, the correcting lens 15 stabilizes blurred image by its position being moved in the first direction X and/or in the second direction Y corresponding to the amount of image blurring at that time. The first moving frame 21 holding the correcting lens 15 has a ring-shaped lens fixed portion 21a and two yoke fixed portions 21b and 21c integrally installed therewith. At the center of the lens fixed portion 21a is provided a fitting hole 28 in which the correcting lens 15 is fitted and fixed by a fastening mechanism such as adhesive. Further, the two yoke fixed portions 21b and 21c are positioned on the outside of the lens fixed portion 21a rotationally shifted from each other approximately by 90° in the radial direction.

The second yoke fixed portion 21c in the first moving frame 21 constitutes a first main bearing portion 31. Further, on the first moving frame 21 is provided a first sub bearing portion 32 on the opposite side of the first main bearing portion 31 with the correcting lens 15 in between. A first main guide shaft 33 penetrates the first main bearing portion 31 in a horizontal direction, and the first main guide shaft 33 is pressed and fixed to the first main bearing portion 31 in the middle portion in the axis direction. Further, the first sub bearing portion 32 is provided with a bearing groove 34 opened on the side thereof, and a first sub guide shaft 35 is engaged with the bearing groove 34 in a freely slidable manner.

A first yoke 36A and second yoke 36B, constituting a magnetic circuit, are integrally fixed to the first yoke fixed portion 21*b* and second yoke fixed portion 21*c*, respectively. The first yoke 36A and the second yoke 36B are U-shaped in a similar manner. Each of the yokes 36A and 36B includes two pieces 36*a* and 36*b* opposed to each other and a joint piece 36*c*, which joins the both pieces 36*a* and 36*b*. Each joint piece 36*c* of the yokes 36A and 36B is fixed to the yoke fixed portion 21*b* and 21*c* by a fastening mechanism such as adhesive, thereby the two pieces being attached to the first moving frame 21 as the upper piece 36*a* and lower piece 36*b* opposing in the vertical direction.

The upper and lower pieces 36*a* and 36*b* in each of the first and second yokes 36A and 36B are both rectangular in shape, and a first magnet 37A and a second magnet 37B formed of rectangular boards are integrally fixed to the inner surfaces of the upper pieces 36*a* by a fastening mechanism such as adhesive. The two magnets 37A and 37B are constructed such that polarity differs in the widthwise direction and are divided into the north and south poles by a polar boundary MA1/MA2 approximately at the center in the widthwise direction. In this embodiment, regarding the first magnet 37A and second magnet 37B, the north pole is set on the inside near the correcting lens 15 and the south pole is set on the outside that is away from the correcting lens 15. However, polarities of the first and second magnets 37A and 37B may be arranged in the opposite manner to this embodiment with the inside being the south pole. In addition, it should be appreciated that the first magnet 37A may have different arrangement of north and south poles from the second magnet 37B.

It should be noted that the first and second magnets 37A and 37B are arranged corresponding to the upper and lower pieces 36*a* and 36*b* of the first and second yokes 36A and 36B respectively, and are fixed to the inner surfaces of the respective pieces 36*a* and 36*b*. However, a structure including magnets fixed only to the upper pieces 36*a* (or to the lower pieces 36*b* as an alternative) as shown in this embodiment enables the whole of the image stabilizer 5 to be thin.

The second moving frame 22 is formed to be a perforated member whose plane is ring-shaped, and the fitting hole 28 of the first moving frame 21 is opposed to a through-hole 38 at the center thereof. On one side of the second moving frame 22 with respect to one diameter direction is provided a second main bearing portion 41 including two bearing pieces 41*a* and 41*b* protruding upward. In the end portions of the two bearing pieces 41*a* and 41*b* are provided bearing holes 41*c* which penetrate laterally. In the bearing holes 41*c*, protruding parts at both ends of the first main guide shaft 33 fixed to the first moving frame 21 are inserted in a freely slidable manner and are supported in a freely turnable manner.

Further, on the opposite side to the second main bearing portion 41 of the second moving frame 22 is provided a second sub bearing portion 42 including two bearing pieces 42*a* and 42*b* protruding upward. Both ends of the first sub guide shaft 35 are supported by the two bearing pieces 42*a* and 42*b*. A direction in which the first sub guide shaft 35 supported by the second sub bearing portion 42 extends is designated as a first direction X in this embodiment. A third main bearing portion 45 is provided on one side of the second moving frame 22 in the first direction X, and a third sub bearing portion 46 is provided on the opposite side thereto with the through-hole 38 in between. A second main guide shaft 47 penetrates the third main bearing portion 45, and the second main guide shaft 47 is pressed and fixed to the third main bearing portion 45 in the middle portion thereof. Further, the third sub bearing portion 46 is provided with a bearing groove 48 opened on the side thereof, and a second sub guide shaft 49 engages with the bearing groove 48 in a freely slidable manner.

The fixed base board 23 has a ring-shaped base portion 23*a* and two coil supporting portions 23*b* and 23*c* integrally installed therewith, and is shaped corresponding to the first moving frame 21. The two coil supporting portions 23*b* and 23*c* are positioned on the outside of the base portion 23*a* rotationally shifted from each other approximately by 90° in the radial direction. A through-hole 51 is provided at the center of the base portion 23*a*. The through-hole 51 is arranged to be approximately concentric with the fitting hole 28 of the first moving frame 21 and the through-hole 38 of the second moving frame 22.

The two coil supporting portions 23*b* and 23*c* in the fixed base board 23 have two supporting pieces 52*a* and 52*b*, and 53*a* and 53*b* respectively, provided at a predetermined interval in the tangential direction to the base portion 23*a* and protruding upward. The supporting pieces 52*a* and 52*b* constitute a fourth main bearing portion 52, and the supporting pieces 52*a* and 52*b* are each provided with a bearing hole 52*c*. In the bearing holes 52*c* of the first supporting pieces 52*a* and 52*b*, the protruding portions at both ends of the second main guide shaft 47 fixed to the second moving frame 22 are inserted in a freely slidable manner, and thus the second main guide shaft 47 is supported by the fixed base board 23 in a turnable manner.

Further, a fourth sub bearing portion 54 including two bearing pieces 54*a* and 54*b* is provided at a peripheral portion of the base portion 23*a* in the fixed base board 23 on the opposite side to the first coil supporting portion 23*b* with the through-hole 51 in between. Further, both ends of the second sub guide shaft 49 are fixed to the two bearing pieces 54*a* and 54*b* in the fourth sub bearing portion 54 and are thus supported. In this embodiment, the axial direction of the first main guide shaft 33 and first sub guide shaft 35 is designated as a first direction X, and the axial direction of the second main guide shaft 47 and second sub guide shaft 49 extending perpendicularly thereto is designated as a second direction Y.

Between the lower piece 36*b* of the first yoke 36A fixed to the first yoke fixed portion 21*b* of the first moving frame 21 and the first magnet 37A are provided a first reinforcing plate 55A, a first coil mounting portion 56*a* of a flexible printed circuit board 56 and a first coil 57, in a noncontact state. Further, between the lower piece 36*b* of the second yoke 36B fixed to the second yoke fixed portion 21*c* and the second magnet 37B are provided a second reinforcing plate 55B, a second coil mounting portion 56*b* of the flexible printed circuit board 56 and a second coil 58 in a noncontact state. The first reinforcing plate 55A and second reinforcing plate 55B have the function of reinforcing the strength of the flexible printed circuit board 56, and are formed as thin plates. As the material for the reinforcing plates 55A and 55B, engineering plastics such as ABC (acrylonitrile butadiene styrene resin), POM (polyacetal) or the like is suitable; however, a metal plate can also be used.

The first reinforcing plate 55A is provided between the two supporting pieces 52*a* and 52*b* of the first coil supporting portion 23*b* of the fixed base board 23 like a bridge, and is fixed by a fastening mechanism such as adhesive. Further, the second reinforcing plate 55B is provided between the two supporting pieces 53*a* and 53*b* of the second coil supporting portion 23c of the fixed base board 23 like a bridge, and is fixed by a fastening mechanism such as adhesive. The first coil mounting portion 56a of the flexible printed circuit board 56 is mounted on the first reinforcing plate 55A, and the first coil 57 is mounted on the first coil mounting portion 56a. Further, the second coil mounting portion 56b of the flexible printed circuit board 56 is mounted on the second reinforcing plate 55B, and the second coil 58 is mounted on the second coil mounting portion 56b.

The flexible printed circuit board 56 has the first coil mounting portion 56a and second coil mounting portion 56b having an approximately similar size to the reinforcing plates 55A and 55B; and both the coil mounting portions 56a and 56b are joined by a joint portion 56c, forming a single unit. The first coil mounting portion 56a and second coil mounting portion 56b are disposed to overlap with the two reinforcing plates 55A and 55B fixed to the two coil supporting portions 23b and 23c in the fixed base board 23. The first coil 57 is mounted on the first coil mounting portion 56a and the second coil 58 is mounted on the second coil mounting portion 56b, both of which are fixed by a fastening mechanism such as adhesive.

The first coil 57 and second coil 58 are formed of levelly-wound flat coils having an approximately elliptical (rectangular) shape. Both the coils are electrically connected to predetermined wiring patterns provided on the upper surfaces of the coil mounting portions 56a and 56b of the flexible printed circuit board 56. Further, the first coil 57 and second coil 58 are each formed by winding one coil wire. Regarding each of the coils 57 and 58, the two linear portions on the lengthwise side facing each other in the widthwise direction are thrust-generating portions 57a and 57b and thrust-generating portions 58a and 58b generating thrust as electric actuators.

The first coil 57 is arranged with the thrust-generating portions 57a and 57b extending in a direction perpendicular to the first direction X, whereas the second coil 58 is arranged with the thrust-generating portions 58a and 58b extending in a direction perpendicular to the second direction Y. After being assembled, the thrust-generating portion 57a on the inside of the first coil 57 is opposed to a magnetic pole portion (the north pole in this embodiment) on the inside of the first magnet 37A divided by the polar boundary MA1. Further, the thrust-generating portion 57b on the outside of the first coil 57 is opposed to a magnetic pole portion (the south pole in this embodiment) on the outside of the first magnet 37A divided by the polar boundary MA1. Also, the thrust-generating portion 58a on the inside of the second coil 58 is opposed to a magnetic pole portion (the north pole in this embodiment) on the inside of the second magnet 37B divided by the polar boundary MA2, and the thrust-generating portion 58b on the outside is opposed to a magnetic pole portion (the south pole in this embodiment) on the outside of the second magnet 37B divided by the polar boundary MA2.

Specifically, a center line extending in the major axis (side) direction of the first coil 57 (a dividing line which divides the first coil 57 in two in a minor axis direction) is made parallel with the polar boundary MA1 extending in the lengthwise direction to divide the first magnet 37A in two in the widthwise direction; and the center line (dividing line) approximately corresponds with the polar boundary MA1 on the plane. Similarly, a center line extending in a major axis (side) direction of the second coil 58 (a dividing line which divides the second coil 58 in two in a minor axis direction) is made parallel with the polar boundary MA2 extending in the lengthwise direction to divide the second magnet 37B in two in the widthwise direction; and the center line (dividing line) approximately corresponds with the polar boundary MA2 on the plane.

Further, as shown in FIGS. 1, 3 and 5A to 5C, magnetic members are individually provided in space portions 59A and 59B formed inside coil-winding regions of the first and second coils 57 and 58. A magnetic member 61 (62) shown in FIG. 5A, which represent a first embodiment, is a magnetic material formed of a magnetic metal such as iron or steel. Further, magnetic members 61A (62A) and 61B (62B) shown in FIGS. 5B and 5C, which represent a second embodiment, are magnetic materials formed of magnets. Having a similar structure to the magnets (driving magnets) 37A and 37B fixed to the yokes 36A and 36B, the magnet-based magnetic materials (magnets for posture control) 61A (62A) and 61B (62B) are magnetized to have different polarities in the widthwise direction, that is, are divided in two to have the north and south poles by a polar boundary MB1 (MB2) approximately at the center in the widthwise direction.

The magnetic materials 61 (62), 61A (62A), and 61B (62B) are rectangular parallelepipeds capable of being inserted into the space portions 59A and 59B of the first and second coils 57 and 58. Further, the magnetic materials 61 (62), 61A (62A), and 61B (62B) are provided roughly symmetrically with a center line (imaginary line) MB0 and the polar boundary MB1 (MB2) dividing the magnetic material in two in the widthwise direction approximately corresponding with the polar boundary MA1 (MA2) of the driving magnets 37A (37B) and the center line (imaginary line) of each of the first and second coils 57 and 58. The difference between FIG. 5B and FIG. 5C is that the polarities of the magnet-based magnetic materials 61A (62A) and 61B (62B) are reversed, and the other structure is the same.

Specifically, in FIG. 5B, the posture control magnet 61A (62A) facing the driving magnet 37A (37B) has polarities reversely provided to those of the magnetic poles (north pole and south pole) of the magnet 37A (37B). In this case, the two magnets 37A (37B) and 61A (62A) are attracted to each other, and the movable magnet is forced toward the fixed magnet. In FIG. 5C, on the contrary, the posture control magnet 61B (62B) facing the driving magnet has polarities similarly provided to those of the magnetic poles (north pole and south pole) of the driving magnet. In this case, the two magnets 37A (37B) and 61B (62B) repel each other, and the movable magnet is forced away from the fixed magnet.

In such cases, it is necessary for the magnetic material 61 (62) of steel or the like in FIG. 5A to be provided symmetrically so that the center line MB0 dividing the magnetic material 61 (62) roughly in two in the plane direction roughly corresponds with the polar boundary MA1 (MA2) of the magnet 37A (37B) when seen in the plane direction. Hence, the strength of magnetic lines of the north and south poles of the magnets 37A and 37B is evenly applied to the magnetic materials 61 and 62, and thus the whole surfaces of the magnetic materials 61 and 62 are attracted with approximately equal force. Also, it is necessary for the magnet-based magnetic materials 61A (62A) and 61B (62B) in FIGS. 5B and 5C to be provided so that the polar boundary MB1 (MB2) of the posture control magnets 61A (62A) and 61B (62B) roughly correspond with the polar boundary MA1 (MA2) of the driving magnet 37A (37B) when seen in the a plane direction. Hence, the polarities of the magnets 37A, 37B and 61A, 62A (61B, 62B) is roughly evenly applied in a symmetrical direction, and thus attracting force and repelling force act on each other approximately equally as a whole.

Between the magnetic materials 61 (62), 61A (62A) and 61B (62B), and the driving magnet 37A (37B), two kinds of magnetic circuit are formed, as shown in FIGS. 5A to 5C. Specifically, they are a first magnetic circuit represented by a magnetic line GL1, and a second magnetic circuit represented by a magnetic line GL2.

As shown in FIGS. 5A to 5C, the magnetic line GL1 of the first magnetic circuit generates thrust for moving the correcting lens 15 in a certain direction by means of the action of the coil 57 (58). Emitted from the north pole of the magnet 37A (37B), the first magnetic line GL1 penetrates through the first thrust-generating portion 57a (58a) of the coil 57 (58), the flexible printed circuit board 56a (56b) and the reinforcing plate 55A (55B) in this order and then reaches the lower piece 36b of the yoke 36A (36B). Emitted from the lower piece 36b in a return direction, the first magnetic line GL1 penetrates through the reinforcing plate 55A (55B), the flexible printed circuit board 56a (56b) and the second thrust-generating portion 57b (58b) of the coil 57 (58), and eventually returns to the south pole of the magnet 37A (37B), thereby forming a magnetic circuit.

Meanwhile, the magnetic line GL2 of the second magnetic circuit generates power for forcing the first moving frame 21 holding the correcting lens 15 to move in a certain direction, by attracting or repelling the magnetic materials 61 (62), 61A (62A), and 61B (62B). In the case of the magnetic material 61 (62) of steel or the like in FIG. 5A, the second magnetic line GL2 is emitted from the north pole of the magnet 37A (37B) toward the magnetic material 61 (62), is emitted from the opposite side in a return direction after penetrating through the magnetic material, and eventually returns to the south pole of the magnet 37A (37B), thereby forming a magnetic circuit. Also, in the case of the magnet-based magnetic materials 61A (62A) and 61B (62B) in FIGS. 5B and 5C, the second magnetic line GL2 is emitted from the north pole of the magnet 37A (37B) toward the south pole of the magnet 61A (62A) and 61B (62B), is then emitted from the adjacent north pole in a return direction, and eventually returns to the south pole of the magnet 37A (37B), thereby forming a magnetic circuit.

Regarding this second magnetic circuit, in the case of the circuit structure shown in FIG. 5A, since the magnetic material 61 (62) is symmetrically opposed to the north and south poles of the magnet 37A (37B), the magnetic force of the magnet 37A (37B) acts to attract the magnetic material 61 (62). As a result, with the attracting force acting between the magnet 37A (37B) and the magnetic material 61 (62), the first moving frame 21 to which the magnet 37A (37B) is fixed is attracted to the fixed base board 23 having the reinforcing plate 55A (55B) to which the magnetic material 61 (62) is fixed.

In the case of the circuit structure shown in FIG. 5B, since the south pole of the magnet-based magnetic material 61A (62A) is opposed to the north pole of the driving magnet 37A (37B), the magnetic force of the magnet 37A (37B) and that of the magnetic material 61A (62A) act to attract each other. As a result, the magnet 37A (37B) is attracted toward the magnetic material 61A (62A) fixed to the reinforcing plate 55A (55B). In the case of the circuit structure shown in FIG. 5C, on the contrary, since the north pole of the magnet-based magnetic material 61B (62B) is opposed to the north pole of the driving magnet 37A (37B), the magnetic force of the magnet 37A (37B) and that of the magnetic material 61B (62B) act to repel each other. As a result, the magnet 37A (37B) is repelled in a direction away from the magnetic material 61B (62B) fixed to the reinforcing plate 55A (55B).

With the action of the magnet 37A (37B) and the magnetic materials 61 (62), 61A (62A) and 61B (62B), there can be removed backlash caused by gaps between guide shafts and bearing portions joining the first moving frame 21 and the second moving frame 22 and between guide shafts and bearing portions joining the second moving frame 22 and the fixed base board 23. As a result, the first moving frame 21 holding the correcting lens 15, and the second moving frame 22 supporting the first moving frame 21 can be moved smoothly in the first direction X or in the second direction Y. Furthermore, since the correcting lens 15 can be maintained in a certain posture, deterioration in optical performance caused by change in the posture of the correcting lens 15 can be prevented.

The first coil 57, the first magnet 37A and the first yoke 36A, which have been mentioned above, constitute a first electric actuator 24 that is a first driver for moving the correcting lens 15 in the first direction X by means of the first moving frame 21. The first main and sub bearing portions 31 and 32 of the first moving frame 21, the first main and sub guide shafts 33 and 35, and the second main and sub bearing portions 41 and 42 constitute a first guide which guides the correcting lens 15 in the first direction X perpendicular to the optical axis L of the lens system 2 by means of the first moving frame 21.

Further, the second coil 58, the second magnet 37B and the second yoke 36B constitute a second electric actuator 25 that is a second driver for moving the correcting lens 15 in the second direction Y by means of the second moving frame 22. The third main and sub bearing portions 45 and 46 of the second moving frame 22, the second main and sub guide shafts 47 and 49, and the fourth main and sub bearing portions 52 and 54 constitute a second guide which guides the correcting lens 15 in the second direction Y perpendicular to the optical axis L of the lens system 2 and perpendicular to the first direction X by means of the second moving frame 22.

Thus, when an electric current is applied to the first coil 57 or second coil 58, magnetic force generated by the first magnet 37A or second magnet 37B acts in a direction vertical to the thrust-generating portion 57a and 57b, or to the thrust-generating portion 58a and 58b. Therefore, thrust which advances in the first direction X is generated in the first electric actuator 24 or thrust which advances in the second direction Y is generated in the second electric actuator 25 according to Fleming's left-hand rule.

In this regard, in the first coil 57 (second coil 58), there are two thrust-generating portions 57a and 57b (58a and 58b) formed of linear portions generating thrust, and electric currents flow in opposite directions in the two portions. However, magnetic force of the first magnet 37A in opposite directions acts on the thrust-generating portions 57a and 57b (58a and 58b). Therefore, thrust generated in the two thrust-generating portions 57a and 57b (58a and 58b) is directed in the same direction if viewed as a whole coil, and the combined force of the thrust becomes the thrust by the first electric actuator 24 (second electric actuator 25), thereby acting as the force which moves the correcting lens 15 in the first direction X (the second direction Y) that is the predetermined direction.

It should be noted that the two bearing pieces 41a and 41b of the second main bearing portion 41 are formed apart from each other by the distance obtained by adding the length necessary for the first moving frame 21 to move in the first direction X to the length of the first main bearing portion 31 in the first direction X. Hence, the first moving frame 21 is capable of moving in the first direction X by the distance obtained by subtracting the length of the first main bearing portion 31 from the distance between the two bearing pieces 41a and 41b. Also, the two supporting pieces 52a and 52b of the fourth main bearing portion 52 are formed apart from each other by the distance obtained by adding the length necessary for the second moving frame 22 to move in the second direction Y to the length of the third main bearing portion 45 in the second direction Y. Hence, the second moving frame 22 is capable of moving in the second direction Y by the distance obtained by subtracting the length of the third main bearing portion 45 from the distance between the two supporting pieces 52a and 52b.

Further, in this embodiment, the reinforcing plate 55A (55B) is fixed to the supporting pieces 52a and 52b (53a and 53b) of the fixed base board 23, the magnetic materials 61 (62), 61A (62A), and 61B (62B) are fixed to the reinforcing plate 55A (55B). The magnetic materials 61 (62), 61A (62A), and 61B (62B) are attracted or pressed by means of the magnetic force of the driving magnet 37A (37B), thereby forcing the correcting lens 15 to move in an optical axis direction. Therefore, there can be removed backlash caused by gaps between guide shafts and bearing portions in the first guide and second guide, namely, backlash caused between the first moving frame 21 and the second moving frame 22 as well as backlash caused between the second moving frame 22 and the fixed base board 23. Thus, since the first moving frame 21 and second moving frame 22 holding the correcting lens 15 can be moved smoothly and also the correcting lens 15 can be maintained in a certain posture, deterioration in optical performance caused by a change in the posture of the correcting lens 15 can be prevented. Moreover, the movement of the correcting lens 15 can be controlled accurately and smoothly. FIGS. 6 and 7 show the state in which backlash between guide shafts and bearing portions have been removed as described above.

Further, with an optical axis of the correcting lens 15 being as the center, the polar boundaries MA1 and MA2 of the driving magnets 37A and 37B, the center line MB0 of the magnetic material 61 (62) and the polar boundaries MB1 and MB2 of the posture control magnets 61A and 62A (61B and 62B), which are magnetic materials, are made to extend in directions perpendicular to the first direction X and second direction Y. Furthermore, the polar boundaries MA1 and MA2 roughly correspond with the center line MB0 or the polar boundaries MB1 and MB2. Therefore, the first moving frame 21 is forced to make the optical axis of the correcting lens 15 correspond with the optical axis L of the lens system 2 of the correcting lens 15 by attracting force or repelling force acting between the magnet 37A (37B) and the magnetic materials 61 (62), 61A (62A) and 61B, (62B).

Thus, also in a state of the first direction X (or second direction Y) being set in the gravitational direction so as to use the image stabilizer 5 in a lens device with the optical axis L of the lens system 2 being set in a horizontal direction, the first moving frame 21 can be held in a predetermined position only by means of magnetic force acting between the magnet 37A (37B) and the magnetic materials 61 (62), 61A (62A), and 61B (62B), without applying electric current to the coils. Therefore, the power consumption of a battery can be reduced, and also a rise in the temperature inside an apparatus can be prevented by controlling generation of heat caused by power consumption.

In order to control and drive the correcting lens 15, it is preferable that position detectors which detect the position of the correcting lens 15 are provided. As such position detectors, two hall elements each detecting the magnetic force of the first and second magnets 37A and 37B can be used, for example. An embodiment including hall elements serving as the position detectors will be later explained in detail as another embodiment.

The image stabilizer 5 with the above-mentioned structure can be assembled as follows, for example. First, as shown in FIGS. 1 and 2, the first and second reinforcing plates 55A and 55B are fixed to the upper surfaces of the first and second coil supporting portions 23b and 23c of the fixed base board 23, respectively. Next, the first and second coil mounting portions 56a and 56b of the flexible printed circuit board 56 with the first and second coils 57 and 58 mounted on their upper surfaces are provided on the first and second reinforcing plates 55A and 55B and fixed with a fastening mechanism such as adhesive.

Next, the second moving frame 22 is placed facing the base portion 23a of the fixed base board 23 from above, and the second bearing groove 48 provided in the third sub bearing portion 46 of the second moving frame 22 is engaged in a freely slidable manner with the second sub guide shaft 49 fixed and supported between the two bearing pieces 54a and 54b of the fourth sub bearing portion 54. Further, the third main bearing portion 45 of the second moving frame 22 is positioned between the two supporting pieces 52a and 52b of the fourth main bearing portion 52. Then, the second main guide shaft 47 is penetrated through the bearing holes 52c provided in the two supporting pieces 52a and 52b and through the through-hole in the third main bearing portion 45, and the protruding portions at both ends thereof are supported by the two supporting pieces 52a and 52b in a freely turnable manner and in a movable manner in the axial direction. Thus, the second moving frame 22 is supported with respect to the fixed base board 23 in a movable manner in a second direction Y that is one direction specified by a predetermined distance, namely by the amount obtained by subtracting the length of the third main bearing portion 45 from the distance between the inner surfaces of the two supporting pieces 52a and 52b of the fourth main bearing portion 52.

Next, the first and second yokes 36A and 36B to which the magnets 37A and 37B are fixed are fixed to the first moving frame 21. The magnets 37A and 37B may be fixed to these yokes 36A and 36B after fixing the yokes 36A and 36B to the first moving frame 21.

Subsequently, the first moving frame 21 is placed facing the second moving frame 22 from above, and the first bearing groove 34 provided in the first sub bearing portion 32 of the first moving frame 21 is engaged in a freely slidable manner with the first sub guide shaft 35 fixed and supported between the two bearing pieces 42a and 42b of the second sub bearing portion 42. Next, the first main bearing portion 31 of the first moving frame 21 is positioned between the two bearing pieces 41a and 41b of the second main bearing portion 41. Then, the first main guide shaft 33 is penetrated through the bearing holes 41c provided in the two bearing pieces 41a and 41b and through the through-hole of the first main bearing portion 31. The protruding portions at both ends of the first main guide shaft 33 are supported by the two bearing pieces 41a and 41b in a freely turnable manner and in a movable manner in the axial direction. Thus, the first moving frame 21 is supported with respect to the second moving frame 22 in a movable manner in a first direction X perpendicular to the second direction Y by a predetermined distance, namely, by an amount obtained by subtracting the length of the first main bearing portion 31 from the distance between the inner surfaces of the two bearing pieces 41a and 41b of the second main bearing portion 41.

In this regard, the first main guide shaft 33 protrudes from both ends of the first main bearing portion 31 with approximately the same length. Then, approximately the center of the first main guide shaft 33 is fixed and supported with the first main bearing portion 31 by means of press fitting or the like. Similarly, the second main guide shaft 47 protrudes from both ends of the third main bearing portion 45 with approximately the same length. Then, approximately the center of the second main guide shaft 47 is fixed and supported with the third main bearing portion 45 by means of press fitting or the like. Thus, assembly of the image stabilizer 5 is completed, and such image stabilizer 5 with a structure shown in FIGS. 2 to 4 is obtained.

Positions of the first moving frame 21, the second moving frame 22 and the fixed base board 23 are determined by providing each member with a predetermined positioning hole to which a reference pin is inserted to determine the positions, for example. Accordingly, the first moving frame 21 and the second moving frame 22 are relatively fixed temporarily, and the second moving frame 22 and the fixed base board 23 are relatively fixed temporarily, resulting in the positions being adjusted easily and reliably.

The function of the image stabilizer 5 with the above-described structure is as follows, for example. The correcting lens 15 of this image stabilizer 5 is moved by selectively or simultaneously supplying a driving current of an appropriate value to the first coil 57 of the first actuator 24 and to the second coil 58 of the second actuator 25 through the flexible printed circuit board 56.

Specifically, the first coil 57 and second coil 58 of the image stabilizer 5 are fixed to the coil supporting portions 23b and 23c of the fixed base board 23 with the reinforcing plates 55A and 55B and the first and second coil mounting portions 56a and 56b of the flexible printed circuit board 56 placed in between. Hereupon, the thrust-generating portions 57a and 57b of the first coil 57 are extended in the second direction Y, and the thrust-generating portions 58a and 58b of the second coil 58 are extended in the first direction X. Further, the two magnets 37A and 37B fixed to the upper pieces 36a of the two yokes 36A and 36B fixed to the first moving frame 21 are arranged to face the first and second coils 57 and 58.

As a result, the magnetic flux of a first magnetic circuit formed by the first yoke 36A and the first magnet 37A acts in such a manner as to penetrate through the thrust-generating portions 57a and 57b of the first coil 57 in the vertical direction. Similarly, the magnetic flux of a second magnetic circuit formed by the second yoke 36B and the second magnet 37B acts in such a manner as to penetrate through the thrust-generating portions 58a and 58b of the second coil 58 in the vertical direction. In this regard, the first and second coils 57 and 58 are fixed to the fixed base board 23, whereas the first and second yokes 36A and 36B and the first and second magnets 37A and 37B are fixed to the first moving frame 21 holding the correcting lens 15. The first moving frame 21 is supported in a movable manner in the first direction X and in the second direction Y within a predetermined range through the second moving frame 22.

Thus, with the action of the first guide and second guide, the correcting lens 15 is capable of freely moving both in the first direction X and in the second direction Y within a predetermined range. Further, the two driving magnets 37A and 37B are attracted to (or repelled by) the two magnetic materials 61 and 62, 61A and 62A, or 61B and 62B due to the magnetic force thereof. As a result, backlash (space) between the first moving frame 21 and the second moving frame 22 and backlash (space) between the second moving frame 22 and the fixed base board 23 can be absorbed, enabling a state without backlash to be obtained at each joint portion. Accordingly, the movement of the correcting lens 15 can be controlled accurately and smoothly.

Upon applying an electric current to the first coil 57 (a similar function is obtained in the case of the second coil 58 as well) in the image stabilizer 5 having such structure, the electric current flows in the second direction Y in the thrust-generating portions 57a and 57b (58a and 58b), since the thrust-generating portions 57a and 57b (58a and 58b) are extended in the second direction Y (in the first direction X in the case of the second coil 58). In this regard, since the magnetic flux of the first magnetic circuit acts in a vertical direction perpendicular to the thrust-generating portions 57a and 57b (58a and 58b), force directed in the first direction X (second direction Y in the case of the second coil 58) acts on the first magnet 37A (second magnet 37B in the case of the second coil 58) and the first yoke 36A (second yoke 36B in the case of the second coil 58) according to the Fleming's rule.

Thus, the first moving frame 21 to which the first yoke 36A is fixed moves in the first direction X. As a result, the correcting lens 15 held by the first moving frame 21 moves in the first direction X, being guided by the first guide, corresponding to the intensity of the electric current applied to the first coil 57.

Further, if electric currents are simultaneously applied to the first coil 57 and the second coil 58, the movement by the first coil 57 and the movement by the second coil 58, both of which have been mentioned above, are conducted in a combined manner. Specifically, the correcting lens 15 moves in the first direction X with the electric current which flows through the first coil 57 and at the same time the correcting lens 15 moves in the second direction Y with the electric current which flows through the second coil 58. As a result, the correcting lens 15 moves in a diagonal direction, thereby stabilizing images of the lens system 2.

FIGS. 7A and 7B show a modified example of the embodiment shown in FIGS. 1 to 6, where the positions of the magnets 37A and 37B and the positions of the coils 57 and 58 in the aforementioned embodiment are vertically replaced by each other. Specifically, two magnets 37A and 37B are fixed to the upper surfaces of lower pieces 36b of yokes 36A and 36B fixed to a first moving frame 21 respectively. Correspondingly, coils 57 and 58 are placed above the magnets 37A and 37B. Mounted on two mounting portions 56a and 56b of a flexible printed circuit board 56 respectively, the coils 57 and 58 are electrically connected to predetermined wiring patterns. The two mounting portions 56a and 56b are fixed to the lower surfaces of reinforcing plates 55A and 55B respectively, and the reinforcing plates 55A and 55B are fixed to the upper surfaces of first and second coil supporting portions 23b and 23c of a fixed base board 23, respectively.

Further, magnetic materials 61 and 62 are provided inside space portions 59A and 59B of the coils 57 and 58, respectively. The magnetic materials 61 and 62 are respectively mounted on the two mounting portions 56a and 56b of the flexible printed circuit board 56 by a fastening mechanism such as adhesive. The other structure is similar to that in the aforementioned embodiment.

Effectiveness similar to the aforementioned embodiment can also be obtained with the above-described structure. In this embodiment, if magnetic force between the magnet 37A (37B) and the magnetic material 61 (62) vertically opposed to each other acts in the direction in which the magnets 37A (37B) attracts the magnetic materials 61 (62), the first moving frame 21 holding a correcting lens 15 and a second moving frame 22 supporting the first moving frame 21 are forced in a direction away from the fixed base board 23 (upward direction in FIGS. 7A and 7B), as shown in FIGS. 7A and 7B. Thus, between a first main guide shaft 33 and a second main bearing portion 41 and between a first sub guide shaft 35 and a first sub bearing portion 32, joining the first moving frame 21 and the second moving frame 22, the lower surface sides are in contact, and so gaps at the joint portions move toward the upper surface sides. As a result, it is possible to remove backlash at those joint portions, and the posture of the first moving frame 21 and second moving frame 22 can be maintained constantly in a high position with respect to the fixed base board 23.

Similar effectiveness can also be obtained in the case of the magnetic force of the magnet 37A (37B) acting in a direction to repel the magnetic material 61 (62). Specifically, if the magnetic force of the magnet 37A (37B) acts in a direction to repel the magnetic material 61 (62), the first moving frame 21 holding the correcting lens 15 and the second moving frame 22 supporting the first moving frame 21 are forced in a direction toward the fixed base board 23. Thus, between the first main guide shaft 33 and the second main bearing portion 41 and between the first sub guide shaft 35 and the first sub bearing portion 32, joining the first moving frame 21 and the second moving frame 22, the upper surface sides are in contact, and so gaps at the joint portions move toward the lower surface sides. As a result, it is possible to remove backlash at those joint portions, and the posture of the first moving frame 21 and second moving frame 22 can be maintained constantly in a low position with respect to the fixed base board 23.

FIGS. 8 to 14 show other embodiments of image stabilizers including electric actuators of a moving magnet system according to the present invention. Regarding those embodiments, differences from the aforementioned embodiment are mainly: the arrangement of magnetic materials controlling the posture of the correcting lens 15; the shape of the magnetic materials and the like, and so the same reference numerals are given to the same portions as in the aforementioned embodiment and only different portions will be explained.

FIGS. 8 to 9 show an image stabilizer 5A according to a second embodiment of the present invention, in which magnetic materials 63 (64), 63A (64A), and 63B (64B) controlling the posture of a correcting lens 15 are provided outside a first coil 57 and a second coil 58. The magnetic material 63 (64) of steel or the like, or magnet-based magnetic materials 63A (64A) 63B (64B) are shaped like circular coins. Further, each of the magnet-based magnetic materials 63A (64A) and 63B (64B) is divided into the north and south poles by a polar boundary MB1 (MB2) extending in a diameter direction to divide the volume roughly in two.

As shown in FIG. 9A, each of the two magnetic materials 63 and 64 is placed in such a position that a center line MB0, which extends in a diameter direction to divide its volume roughly in two, is on a polar boundary MA1 (MA2) dividing the polarity of a magnet 37A (37B), when seen from a plane direction. Also the magnet-based magnetic materials 63A (64A) and 63B (64B) are disposed such that the reverse polarities are opposed as shown in FIG. 9B, or the same polarities are opposed as shown in FIG. 9C, to the magnet 37A (37B) vertically provided above. On this occasion, the polar boundary MB1 (MB2) of the magnetic materials 63A (64A) and 63B (64B) is provided to roughly lie on the polar boundary MA1 (MA2) of the magnet 37A (37B), when seen from a plane.

Thus, also in the case of the magnetic materials 63 (64), 63A (64A), and 63B (64B) being provided outside the coil 57 (58) on one side, magnetic lines GL1 and GL 2 generated from the magnet 37A (37B) form two kinds of magnetic circuits, as shown in FIGS. 9A to 9C. The two kinds of magnetic circuits formed by the magnetic lines GL1 and GL2 are similar to the case of the embodiment shown in FIGS. 5A to 5C.

Specifically, emitted from the north pole of the magnet 37A (37B), the magnetic line GL1 of a first magnetic circuit, which generates thrust for moving the correcting lens 15 in a certain direction by means of the coil 57 (58), penetrates through a first thrust-generating portion 57a (58a) of the coil 57 (58), a flexible printed circuit board 56a (56b) and a reinforcing plate 55A (55B) in this order. The magnetic line GL1 is emitted from a lower piece 36b of a yoke 36A (36B) in a return direction, then penetrates through the reinforcing plate 55A (55B), the flexible printed circuit board 56a (56b) and a second thrust-generating portion 57b (58b) of the coil 57 (58), and eventually returns to the south pole of the magnet 37A (37B), thereby forming a magnetic circuit.

Meanwhile, the magnetic line GL2 of a second magnetic circuit generates power for forcing a first moving frame 21 holding the correcting lens 15 to move in a certain direction, by attracting or pressing the magnetic materials 63 (64), 63A (64A), and 63B (64B). In the case of the magnetic material 63 (64) shown in FIG. 9A, a magnetic line emitted from the north pole of the magnet 37A (37B) penetrates through the magnetic materials 63 (64) and then returns to the south pole of the magnet 37A (37B), thereby forming a magnetic circuit. In the case of the magnetic material 63A (64A) shown in FIG. 9B, a magnetic line emitted from the north pole of the magnet 37A (37B) goes toward the south pole of the magnetic material 63A (64A), is then emitted from the adjacent north pole in a return direction, and eventually returns to the south pole of the magnet 37A (37B), thereby forming a magnetic circuit. Also, in the case of the magnetic material 63B (64B) shown in FIG. 9C, a magnetic line emitted from the north pole of the magnet 37A (37B) comes toward the south pole positioned on the opposite side of the magnetic material 63B (64B), is subsequently emitted from the adjacent north pole in a return direction, then goes in the direction crossing the coming direction, and eventually returns to the south pole of the magnet 37A (37B), thereby forming a magnetic circuit.

Regarding the second magnetic circuit, in the case of the circuit structure shown in FIG. 9A, since the magnetic material 63 (64) is symmetrically opposed to the north and south poles of the magnet 37A (37B), the magnetic force of the magnet 37A (37B) acts so as to attract the magnetic material 63 (64). As a result, due to the attracting force between the magnet 37A (37B) and the magnetic material 63 (64), the first moving frame 21 to which the magnet 37A (37B) is fixed is forced in the direction toward a fixed base board 23 having the reinforcing plate 55A (55B) to which the magnetic material 63 (64) is fixed.

In the case of the circuit structure shown in FIG. 9B, since the north pole of the posture control magnet 37A (37B) is opposed to the south pole of the magnetic-based material 63A (64A), the magnetic force of the two magnets 37A (37B) and 63A (64A) act to pull each other. As a result, the magnet 37A (37B) is forced in a direction toward the magnetic material 63A (64A). In the case of the circuit structure shown in FIG. 9C, on the contrary, since the north pole of the magnet 37A (37B) is opposed to the north pole of the magnetic material 63B (64B), the magnetic force of the two magnets 37A (37B) and 63B (64B) act so as to repel each other. As a result, the magnet 37A (37B) is forced in a direction away from the magnetic material 63B (64B).

With the action of the magnet 37A (37B) and the magnetic materials 63 (64), 63A (64A), and 63B (64B), there can be removed backlash caused by gaps between guide shafts and bearing portions joining the first moving frame 21 and the second moving frame 22 and between guide shafts and bearing portions joining the second moving frame 22 and the fixed base board 23. As a result, the first moving frame 21 holding the correcting lens 15, and the second moving frame 22 supporting the first moving frame 21 can be moved smoothly in the first direction X or in the second direction Y. Furthermore, since the correcting lens 15 can be maintained in a certain posture, deterioration in optical performance caused by change in the posture of the correcting lens 15 can be prevented.

Further, as in this embodiment, in the case of the magnetic materials 63 (64), 63A (64A), and 63B (64B) being provided outside the coil 57 (58) on one side in the direction of the polar boundary MA1 (MA2), since large magnetic plates and magnets can be used, strong magnetic force can be generated. Therefore, in the case of this embodiment, the posture of the correcting lens 15 can be controlled surely with strong force.

FIGS. 10 to 11 show an image stabilizer 5B according to a third embodiment of the present invention, in which four magnetic materials being magnetic members are provided, and the posture of a correcting lens 15 is controlled by the four magnetic materials 65, 66 (65A, 66A) (65B, 66B). Two magnetic materials 65 (66), 65A (66A) or 65B (66B) are provided for one coil 57 (58). The magnetic materials 65 (66), 65A (66A), and 65B (66B) are roughly-quadrilateral thin boards. Further, the magnetic material 65 (66) formed by a magnetic member of iron, steel or the like has a center line (imaginary line) MB0 linearly extending to divide the volume roughly in two. Also, as shown in FIGS. 11B and 11C, the magnetic materials 65A (66A) and 65B (66B) formed of magnets are divided into the north and south poles by a polar boundary MB1 (MB2) linearly extending to divide the volume roughly in two.

The magnetic materials 65 (66), 65A (66A), and 65B (66B) are provided on both sides outside the coil 57 (58) in the lengthwise direction. The magnetic materials 65 (66), 65A (66A), and 65B (66B) are provided such that the center line MB0 or the polar boundary MB1 (MB2) roughly corresponds with a polar boundary MA1 (MA2) of the magnet 37A (37B), when seen from the plane direction. On this occasion, the magnet-based magnetic materials 65A (66A), 65B (66B) are disposed such that the reverse polarities are opposed as shown in FIG. 11B, or the same polarities are opposed as shown in FIG. 11C, to the magnet 37A (37B) vertically provided above.

Thus, by providing two magnetic materials 65 (66), 65A (66A), or 65B (66B) outside the coil 57 (58) on both sides with the coil 57 (58) in between, similar effectiveness to that of the aforementioned first and second embodiments can also be obtained. In the case of this embodiment in particular, since the two same magnetic materials 65 (66), 65A (66A), or 65B (66B) are provided on both sides of the coil 57 (58), attracting force (or repelling force) generated by magnets can be balanced at electric actuators 24 (25), and therefore the movement in the first direction and second direction can be carried out smoothly.

FIGS. 12 to 13 show an image stabilizer 5C according to a fourth embodiment of the present invention, including position detectors which detect the moving direction and transfer amount of a correcting lens 15 by means of a first moving frame 21. Further, magnetic materials 67 (68), 67A (68A), and 67B (68B) that are magnetic members for posture control are provided in the same positions as the position detectors. The magnetic materials 67 (68), 67A (68A), and 67B (68B) are provided in roughly similar positions to the magnetic materials 63 (64), 63A (64A), and 63B (64B) shown in FIGS. 8A to 8C, and the center line MB0 or a polar boundary MB1 (MB2) lies roughly on a polar boundary MA1 (MA2) of a magnet 37A (37B), when seen from the plane direction.

On this occasion, the magnet-based magnetic materials 67A (68A), 67B (68B) are disposed such that the reverse polarities are opposed as shown in FIG. 13B, or the same polarities are opposed as shown in FIG. 13C, to the magnet 37A (37B) vertically provided.

The magnetic materials 67 (68), 67A (68A), and 67B (68B) are fixed to the upper surface of a hall element 26 (27) mounted on the mounting portion 56*a* (56*b*) of a flexible printed circuit board 56 by a fastening mechanism such as adhesive, and are integrally formed. The hall element 26 (27), which represents a specific example of the position detector for detecting the position of the correcting lens 15 by means of first and second moving frames 21 and 22, detects the position of the correcting lens 15 by detecting the magnetic force of the magnet 37A (37B), or the magnetic force of the magnet 37A (37B) and that of the magnet 67A (68A) or 67B (68B) added thereto.

With the polar boundary MA1 (MA2) of the magnet 37A (37B) serving as a center line, the hall element 26 (27) in this embodiment detects magnetic force at points shifted toward the north pole side or toward the south pole side from the center. Accordingly, by identifying the points detected and conducting the point detection in two places, the position of the correcting lens 15 is detected by means of the first and second moving frames 21 and 22.

The first hall element 26 is mounted on the upper surface of the first mounting portion 56*a* of the flexible printed circuit board 56 mounted on a first reinforcing plate 55A fixed to a first coil supporting portion 23*b* of a fixed base board 23. The second hall element 27 is mounted on the upper surface of the second mounting portion 56*b* of the flexible printed circuit board 56 mounted on a second reinforcing plate 55B fixed to a second coil supporting portion 23*c* of the fixed base board 23. On this occasion, detecting units on the upper surfaces of the hall elements 26 and 27 are provided such that the center portion thereof approximately corresponds with the polar boundaries MA1 and MA2 of the magnets 37A and 37B.

By detecting the magnetic force of the north and south poles of the two magnets 37A and 37B with the two hall elements 26 and 27 thus provided, the position of the correcting lens 15 can be detected using the positions of the first moving frame 21 and second moving frame 22. Based on signals detected by the hall elements 26 and 27, a control unit calculates the position of the correcting lens 15 by operation, thereby enabling the correcting lens 15 to be driven and controlled accurately.

Further, although not shown in the drawings, it is preferable that a temperature detector be provided to detect the ambient temperature of electric actuators 24 and 25, and that when the ambient temperature has risen to a predetermined value or above, a temperature be corrected in addition to image stabilization caused by a hand shake, vibration or the like. By adding temperature control as described above, highly accurate position control can be performed regarding the correcting lens 15. As the temperature detector, a thermistor can be used, for example. The thermistor can be installed to be used on the flexible printed circuit board 56 in the vicinity of two coils 57 and 58, for example.

Effectiveness similar to that of the aforementioned embodiment can be obtained by means of the foregoing structure as well. In this embodiment, since hall elements and magnetic materials are used, the position of a correcting lens can be detected easily and surely with a simplified structure. In particular, the magnetic materials 67 (68), 67A (68A), and 67B (68B) being magnetic members are laid on a mold package surface parallel with a magnetic force-sensing element of the hall element 26 (27) and opposite to the surface facing the magnet 37A (37B); and the magnetic materials 67 (68), 67A (68A) and 67B (68B) lie between the hall element 26 (27) and opposed yoke. Therefore, detecting efficiency of the hall elements 26 and 27 can be improved greatly.

In the embodiment shown in FIGS. 13A to 13C, a magnetic field formed by the magnetic materials 67 (68), 67A (68A), or 67B (68B) can be added to the magnetic field formed by the magnet 37A (37B) and yoke 36A (36B), and so the output of the hall element 26 (27) increases and an amplifier magnification can be reduced. As a result, unnecessary amplification of noise can be minimized, and deterioration in position detection can be prevented.

FIGS. 14A to 14C show an image stabilizer 5D according to a fifth embodiment of the present invention, in which the reinforcing plates 55A and 55B in the aforementioned embodiments are made larger in volume and are formed as magnetic members 69A and 69B made of magnetic materials, and these magnetic members 69A and 69B are made to also function as opposed yokes. Formed of an upper piece 36a and a joint piece 36c, yoke 36C (36D) is L-shaped with ends of the both pieces being continuous. Magnets 37A and 37B with a similar shape and structure to those in the aforementioned embodiments are fixed to the lower surfaces of the upper pieces 36a of the yokes 36C and 36D. First and second coils 57 and 58 are provided below the magnets 37A and 37B to face the lower surfaces of these magnets 37A and 37B.

The two coils 57 and 58 are mounted on first and second mounting portions 56a and 56b of a flexible printed circuit board 56 respectively, and the first and second mounting portions 56a and 56b are mounted on the first and second magnetic members 69A and 69B respectively. The first and second magnetic members 69A and 69B are formed of magnetic materials of iron, KS steel or the like attracted by the magnetic force of magnets, and have a volume to also serve as opposed yokes forming part of the yokes 36C and 36D. The magnetic members 69A and 69B are provided in the horizontal direction between upper parts of first and second coil supporting portions 23b and 23c of a fixed base board 23 like bridges, and integrally formed with the fixed base board 23.

Further, each of the first and second magnetic members 69A and 69B has a size corresponding to thrust-generating portions 57a, 57b and 58a, 58b of the first and second coils 57 and 58. The first thrust-generating portions 57a and 58a of the coils 57 and 58 are opposed to one side of the magnetic members 69A and 69B in the widthwise direction along the long side, while the second thrust-generating portions 57b and 58b are opposed to the other side in the widthwise direction along the long side. Further, as shown in FIGS. 14B and 14C, each of the magnetic members 69A and 69B has a center line (imaginary line) MB3 extending linearly in the lengthwise direction to divide the volume roughly in two in the widthwise direction. The center line MB3 of each of the magnetic members 69A and 69B roughly lies on a polar boundary MA1 (MA2) of the magnet 37A (37B) when seen from the plane direction. The other structure is similar to those in the aforementioned embodiments.

A magnetic line GL1 of a magnetic circuit shown as the fifth embodiment generates thrust for moving a correcting lens 15 in the first and second directions X and Y by means of the action of the coils 57 and 58, and also generates power to force the correcting lens 15 by attracting the magnetic materials 69A and 69B. Emitted from the north pole of the magnet 37A (37B), the magnetic line GL1 penetrates through the first thrust-generating portion 57a (58a) of the coil 57 (58) and the flexible printed circuit board 56a (56b), and then reaches the magnetic member 69A (69B). Hence, the magnetic line GL1 is emitted from the magnetic member 69A (69B), penetrates through the flexible printed circuit board 56a (56b) and the second thrust-generating portion 57b (58b) of the coil 57 (58), and eventually returns to the south pole of the magnet 37A (37B), thereby forming a magnetic circuit.

Effectiveness similar to that of the aforementioned embodiments can also be obtained by means of the image stabilizer 5D according to the fifth embodiment, having such structure. In this embodiment in particular, since the magnetic members 69A and 69B also serve as opposed yokes, the structure of the image stabilizer can be simplified. It should be noted that each of the yokes 36C and 36D is formed by the upper piece 36a and the joint piece 36c, and the magnets 37A and 37B are fixed to the upper pieces 36a in this embodiment, however, each of the yokes 36C and 36D can be formed by the lower piece 36b and the joint piece 36c and the magnets 37A and 37B can be fixed to the lower pieces 36b.

FIGS. 15 to 21 show a sixth embodiment of an image stabilizer according to the present invention. The sixth embodiment is constructed as an image stabilizer 6 with drivers of a moving coil system. FIGS. 22 to 28 show image stabilizers 6A to 6D with drivers of a moving coil system, according to seventh to tenth embodiments. It should be noted that in FIGS. 15 to 28 showing the sixth to tenth embodiments of image stabilizers according to the present invention, the same reference numerals are given to the same portions as those in FIGS. 1 to 14 showing the aforementioned first to fifth embodiments of image stabilizers according to the present invention, and duplicate explanations thereof are omitted.

The image stabilizer 6 explained as the sixth embodiment of the present invention has a structure shown in FIGS. 15 to 21. In the image stabilizer 6, drivers are constructed as a moving coil system in which the two magnets 37A and 37B and the two coils 57 and 58 are replaced with each other in the image stabilizer 5 described in the aforementioned embodiments. Therefore, comparing components of the image stabilizers 5 and 6, only a first moving frame 21A and a fixed base board 23A are different while others are the same or approximately the same.

Specifically, the image stabilizer 6 includes: the aforementioned correcting lens 15, a first moving frame 21A, a second moving frame 22, a fixed base board 23A, a first electric actuator 24, a second electric actuator 25, two hall elements 26 and 27, and the like. The first moving frame 21A supports the correcting lens 15. The second moving frame 22 supports the first moving frame 21A in a movable manner in a first direction X perpendicular to an optical axis L of a lens system 2. The fixed base board 23A supports the second moving frame 22 in a movable manner in a second direction Y perpendicular to the optical axis L and perpendicular to the first direction X. The first electric actuator 24 moves the first moving frame 21A in the first direction X. The second electric actuator 25 moves the second moving frame 22 in the second direction Y. The two hall elements 26 and 27 detect the position of the correcting lens 15. Here, the first moving frame 21A and the fixed base board 23A will be explained in detail.

The first moving frame 21A has a ring-shaped lens-fixed portion 21a and two coil fixed portions 21d and 21e integrally provided therewith. The two coil fixed portions 21d and 21e are positioned on the outside of the lens fixed portion 21a in the radial direction, rotationally shifted from each other approximately by 90°. At the center of the lens fixed portion 21a is provided a fitting hole 28 in which a correcting lens 15 is fitted and fixed.

On the first coil fixed portion 21d is mounted a first coil mounting portion 56a of a flexible printed circuit board 56, with a first reinforcing plate 55A in between. Further, on the second coil fixed portion 21e is mounted a second coil mounting portion 56b of the flexible printed circuit board 56, with a second reinforcing plate 55B in between. Then, on the first and second coil mounting portions 56a and 56b are mounted first and second coils 57 and 58, which are electrically connected to wiring patterns of the coil mounting portions 56a and 56b. It should be noted that the structure of the second moving frame 22 is similar to that in the aforementioned embodiment.

The structure of the fixed base board 23A is approximately similar to that of the aforementioned fixed base board 23 in external shape; however, the shape of the supporting portion is slightly different in order to fix first and second yokes 36C and 36D. Specifically, the upper surfaces of two yoke supporting portions 23d and 23e of the fixed base board 23A are provided with fitting grooves 72 into which lower pieces 36b of the yokes 36C and 36D are fitted. With the lower pieces 36b fitted into the fitting grooves 72, the yokes 36C and 36D are fixed by a fastening mechanism such as adhesive. There is no modification in the basic form of the yokes 36C and 36D, however, joint portions 36c are provided with large opening holes 73 for weight reduction. The other structure is similar to that of the image stabilizer 5 shown in FIGS. 1 to 4.

In the image stabilizer 6 according to the sixth embodiment, also the axial direction of a first main guide shaft 33 and first sub guide shaft 35 is designated as a first direction X, and the axial direction of a second main guide shaft 47 and second sub guide shaft 49 extending perpendicularly thereto is designated as a second direction Y, similarly to the aforementioned first embodiment. It should be appreciated that a first direction and a second direction may be set in the opposite manner also in this embodiment.

Further, between the lower piece 36b of the first yoke 36C fixed to the fixed base board 23A and a first magnet 37A are arranged: the first reinforcing plate 55A, the first coil mounting portion 56a and the first coil 57, which are fixed to the first coil fixed portion 21d of the first moving frame 21A, in a noncontact state. Further, between the lower piece 36b of the second yoke 36D fixed to the fixed base board 23A and a second magnet 37B are arranged: the second reinforcing plate 55B, the second coil mounting portion 56b and the second coil 58, which are fixed to the second coil fixed portion 21e of the first moving frame 21A, in a noncontact state. Further, in space portions 59A and 59B of the coils 57 and 58, magnetic materials 61, 62 of iron, steel etc. or magnet-based materials 61A, 62A (61B, 62B), which are magnetic members, are stored.

Figure 19A:
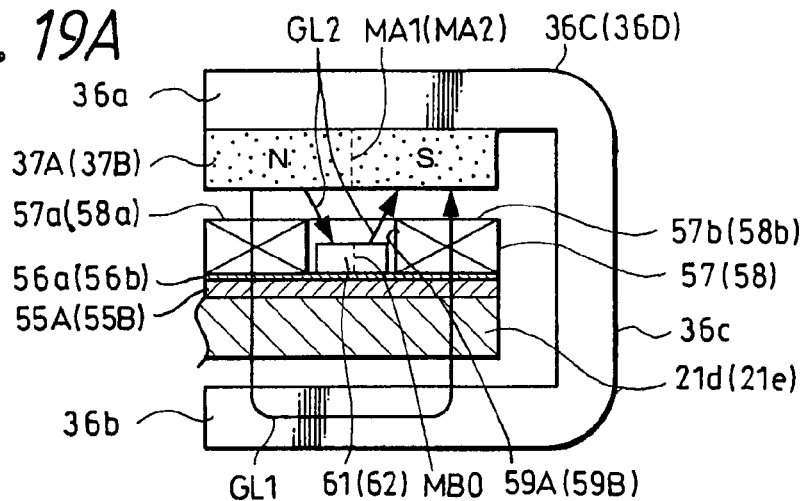

As shown in FIG. 19A, the magnetic material 61 (62) formed of a magnetic member of iron, steel or the like has a center line (imaginary line) MB0 linearly extending to divide the volume roughly in two, corresponding to the magnet 37A (37B). Also, as shown in FIGS. 19B and 19C, the magnetic materials 61A (62A) and 61B (62B) formed of magnets are divided into the north and south poles by a polar boundary MB1 (MB2) linearly extending to divide the volumes roughly in two.

As shown in FIG. 19A, the magnetic material 61 (62) is provided such that the center line (imaginary line) MB0 roughly lies on the polar boundary MA1 (MA2) of the magnet 37A (37B), when seen from the plane direction. Further, as shown in FIG. 19B, the magnetic material 61A (62A) is disposed such that the reverse polarities are opposed, or as shown in FIG. 19C, the magnetic material 61B (62B) is disposed such that the same polarities are opposed to the magnet 37A (37B) vertically provided above.

On this occasion, the polar boundary MB1 (MB2) of the magnet 61A (62A) or 61B (62B) is provided to roughly lie on the polar boundary MA1 (MA2) of the magnet 37A (37B), when seen from the plane direction. If the magnetic material 61 (62) is provided inside the space portion 59A (59B) of the coil 57 (58) in this manner, magnetic lines GL1 and GL2 forming two kinds of magnetic circuits are emitted from the magnet 37A (37B), as shown in FIGS. 19A to 19C.

Figure 19B:
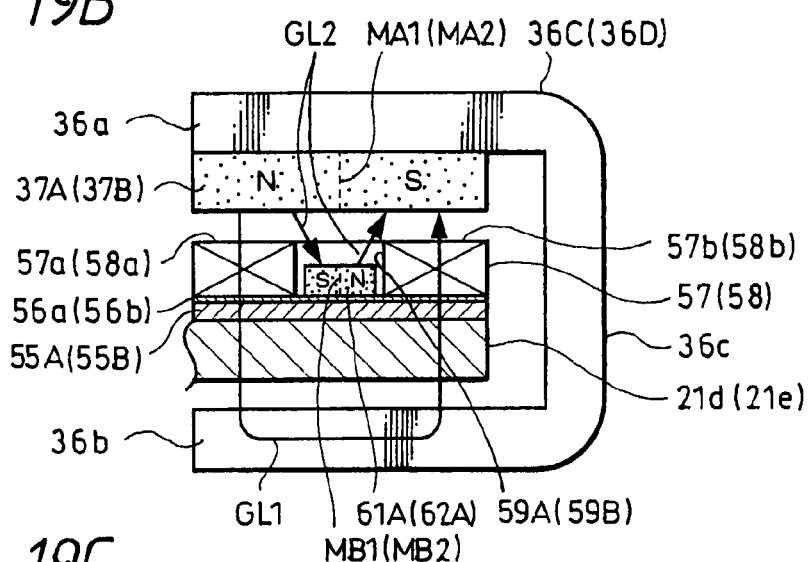
Figure 19C:
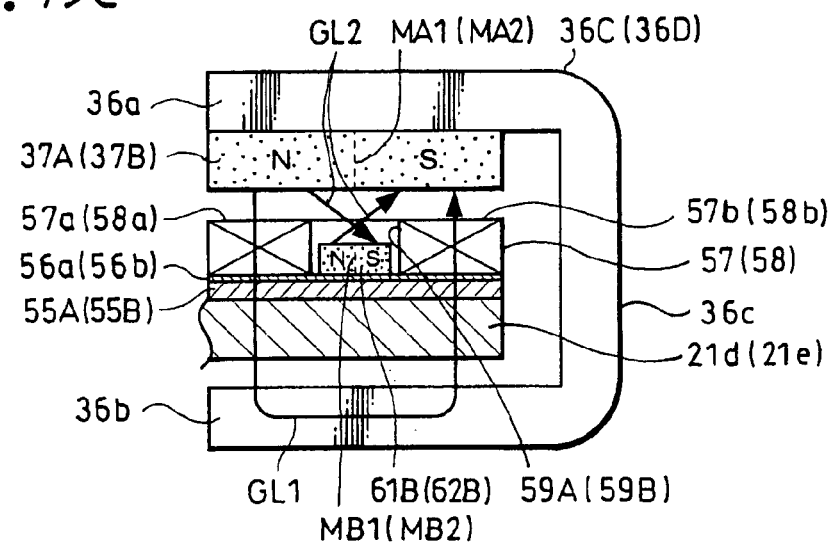
Figure 20A:
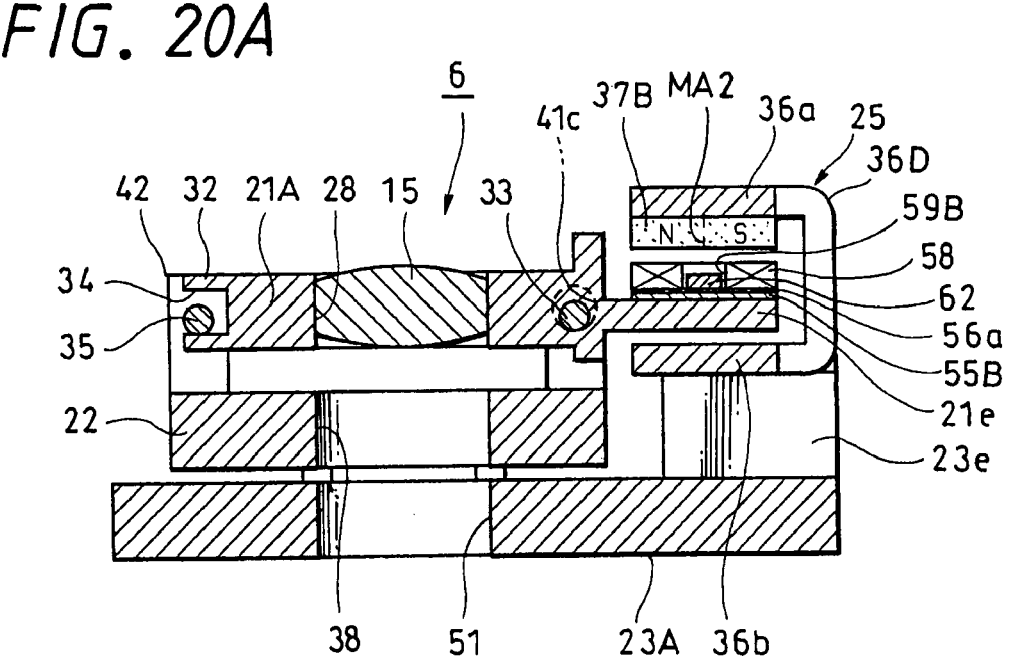
Figure 20B:
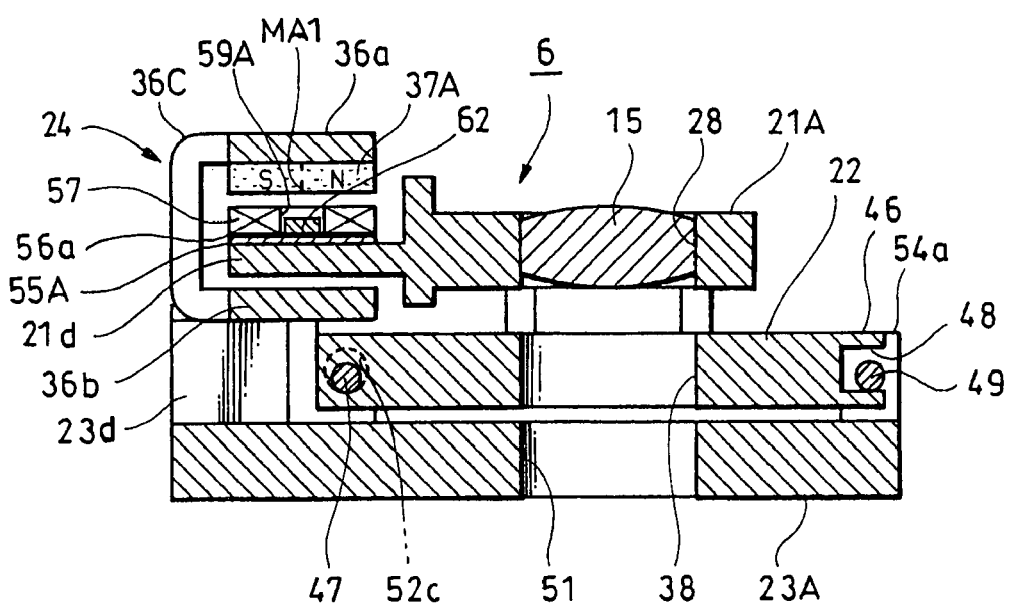

Similarly to the aforementioned embodiments, in any of FIGS. 19A to 19C, emitted from the north pole of the magnet 37A (37B), the magnetic line GL1 of a first magnetic circuit penetrates through a first thrust-generating portion 57a (58a) of the coil 57 (58), the flexible printed circuit board 56a (56b), the reinforcing plate 55A (55B) and the coil fixed portion 21d (21e) of the first moving frame 21A in this order, and then reaches the lower piece 36b of the yoke 36C (36D). Further, the first magnetic line GL1 is emitted from the lower piece 36b in a return direction, then penetrates through the coil fixed portions 21d (21e), the reinforcing plate 55A (55B), the flexible printed circuit board 56a (56b) and the second thrust-generating portion 57b (58b) of the coil 57 (58), and eventually returns to the south pole of the magnet 37A (37B), thereby forming a magnetic circuit.

Meanwhile, similarly to the aforementioned embodiments, in the case of the magnetic material 61 (62) of steel or the like in FIG. 19A, the magnetic line GL2 of a second magnetic circuit is emitted from the north pole of the magnet 37A (37B) toward the magnetic material 61 (62), is then emitted from the opposite side in a return direction after penetrating through the magnetic material, and eventually returns to the south pole of the magnet 37A (37B), thereby forming a magnetic circuit. Also, in the case of the magnet-based magnetic material 61A (62A) in FIG. 19B, the magnetic line GL2 is emitted from the north pole of the magnet 37A (37B) toward the south pole of the magnet 61A (62A), is then emitted from the adjacent north pole in a return direction, and eventually returns to the south pole of the magnet 37A (37B), thereby forming a magnetic circuit. Also, in the case of the magnetic material 61B (62B) in FIG. 19C, the magnetic line emitted from the north pole of the magnet 37A (37B) comes toward the south pole positioned on the opposite side of the magnetic material 61B (62B), is subsequently emitted from the adjacent north pole in a return direction, then goes in the direction crossing the coming direction, and eventually returns to the south pole of the magnet 37A (37B), thereby forming a magnetic circuit.

With the action of the magnetic materials 61 (62), 61A (62A), 61B (62B) and the magnet 37A (37B), in a similar manner to the aforementioned embodiment, backlash caused by gaps between guide shafts and bearing portions joining the first moving frame 21A and the second moving frame 22 and between guide shafts and bearing portions joining the second moving frame 22 and the fixed base board 23A can be removed. As a result, the first moving frame 21A holding the correcting lens 15 and the second moving frame 22 supporting the first moving frame 21A can be moved smoothly in the first direction X or second direction Y. Moreover, since the correcting lens 15 can be maintained in a certain posture, deterioration in optical performance caused by a change in the posture of the correcting lens 15 can be prevented.

The first coil 57, the first magnet 37A and the first yoke 36C, which have been mentioned above, constitute the first electric actuator 24 that is a first driver for moving the correcting lens 15 in the first direction X by means of the first moving frame 21A. Also, the second coil 58, the second magnet 37B and the second yoke 36D constitute the second electric actuator 25 that is a second driver for moving the correcting lens 15 in the second direction Y by means of the second moving frame 22.

The action of each of the electric actuators 24 and 25 is similar to that in the aforementioned embodiments. When an electric current is applied to the first coil 57 (second coil 58), magnetic force generated by the first magnet 37A (second magnet 37B) acts in a direction perpendicular to the thrust-generating portions 57a and 57b (58a and 58b), so that thrust which advances in the first direction X (second direction Y) is generated in the first electric actuator 24 (second electric actuator 25) according to Fleming's left-hand rule.

In this embodiment, the yokes 36C and 36D are fixed to the yoke supporting portions 23d and 23e of the fixed base board 23A, while the first and second coils 57 and 58 and the first and second magnets 61 and 62 are fixed to the coil fixed portions 21d and 21e of the first moving frame 21A. Then, the first moving frame 21A is attracted or pressed by the magnetic force of the two magnets 37A and 37B and the magnetic materials 61 and 62, through the reinforcing plates 55A and 55B and the coil fixed portions 21d and 21e, to force the correcting lens 15 in an optical axis direction. Therefore, backlash caused by gaps between guide shafts and bearing portions in a first guide and second guide can be removed. Accordingly, backlash caused between the first moving frame 21A and the second moving frame 22 and backlash caused between the second moving frame 22 and the fixed base board 23A can be removed. Thus, since the first moving frame 21A holding the correcting lens 15 and the second moving frame 22 can be moved smoothly and accurately with the correcting lens 15 being maintained in a certain posture, deterioration in optical performance caused by a change in the posture of the correcting lens 15 can be prevented. FIGS. 20 and 21 show the state in which backlash between guide shafts and bearing portions have been removed as described above.

The image stabilizer 6 with the above-mentioned structure can be assembled as follows, for example. First, as shown in FIGS. 15 and 16, the first and second yokes 36C and 36D are fixed to the upper surfaces of the first and second yoke supporting portions 23d and 23e of the fixed base board 23A respectively. On this occasion, the lower pieces 36b of the yokes 36C and 36D are fitted into the fitting grooves 72 provided in the upper surfaces of the yoke supporting portions 23d and 23e, and the magnets 37A and 37B fixed to upper pieces 36a are provided above, then those are integrally fixed using a fastening mechanism such as adhesive.

Next, the second moving frame 22 is placed facing a base portion 23a of the fixed base board 23A from above, and a second bearing groove 48 provided in a third sub bearing portion 46 of the second moving frame 22 is engaged in a freely slidable manner with the second sub guide shaft 49 supported in a fixed manner between two bearing pieces 54a and 54b of a fourth sub bearing portion 54. In addition, a third main bearing portion 45 of the second moving frame 22 is positioned between two supporting pieces 52a and 52b of a fourth main bearing portion 52. Then the second main guide shaft 47 penetrates through bearing holes 52c provided in the two supporting pieces 52a and 52b and through a through-hole of the third main bearing portion 45, and the protruding parts at both ends thereof are supported by the two supporting pieces 52a and 52b in a freely turnable manner and in a movable manner in the axial direction. Thus, the second moving frame 22 is supported, with respect to the fixed base board 23A, in a movable manner in the second direction Y that is a specified direction by a predetermined distance, namely by an amount obtained by subtracting the length of the third main bearing portion 45 from the distance between the inner surfaces of the two supporting pieces 52a and 52b of the fourth main bearing portion 52.

Next, the first and second reinforcing plates 55A and 55B are mounted on the coil fixed portions 21d and 21e of the first moving frame 21A, and are fixed using a fastening mechanism such as adhesive. Further, the first and second coil mounting portions 56a and 56b of the flexible printed circuit board 56 on which the first and second coils 57 and 58 have been mounted beforehand are mounted on the first and second reinforcing plates 55A and 55B, and are fixed using a fastening mechanism such as adhesive. The fixing of the coils 57 and 58 to the coil fixed portions 21d and 21e may be conducted after the flexible printed circuit board 56 has been fixed to the first moving frame 21A.

Subsequently, the first moving frame 21A is placed facing the second moving frame 22 from above, and a first bearing groove 34 provided in a first sub bearing portion 32 of the first moving frame 21A is engaged in a freely slidable manner with the first sub guide shaft 35 supported in a fixed manner between two bearing pieces 42a and 42b of a second sub bearing portion 42. Next, a first main bearing portion 31 of the first moving frame 21A is positioned between two bearing pieces 41a and 41b of a second main bearing portion 41. Then, the first main guide shaft 33 penetrates through bearing holes 41c provided in the two bearing pieces 41a and 41b and through a through-hole of the first main bearing portion 31, and the protruding parts at both ends thereof are supported by the two bearing pieces 41a and 41b in a freely turnable manner and in a movable manner in the axial direction. Thus, the first moving frame 21A is supported, with respect to the second moving frame 22, in a movable manner in the first direction X perpendicular to the second direction Y, by a predetermined distance, namely by an amount obtained by subtracting the length of the first main bearing portion 31 from the distance between the inner surfaces of the two bearing pieces 41a and 41b of the second main bearing portion 41.

In this case, the first main guide shaft 33 protrudes from both ends of the first main bearing portion 31 by approximately the same length. And approximately the center of the first main guide shaft 33 is fixed and supported by the first main bearing portion 31 by means of press fit or the like. Similarly, the second main guide shaft 47 protrudes from both ends of the third main bearing portion 45 by approximately the same length. And approximately the center of the second main guide shaft 47 is fixed and supported by the third main bearing portion 45 by means of press fit or the like. Thus, the assembly of the image stabilizer 6 is completed, and the image stabilizer 6 with a structure as shown in FIGS. 16 to 18 is obtained.

Note that the positions of the first moving frame 21A, the second moving frame 22 and the fixed base board 23A are determined similarly to the aforementioned embodiment. For example, each member is provided with a predetermined positioning hole and a reference pin is inserted into the positioning holes so as to decide the positions. Accordingly, the relation between the first moving frame 21A and the second moving frame 22 and the relation between the second moving frame 22 and the fixed base board 23A are temporarily fixed in a relative manner to easily and surely determine the positions.

The functions of the image stabilizer 6 with the foregoing structure are similar to those in the aforementioned embodiment. Specifically, the correcting lens 15 of the image stabilizer 6 is moved by selectively or simultaneously providing driving currents of an appropriate value to the first coil 57 of the first electric actuator 24 and to the second coil 58 of the second electric actuator 25 via the flexible printed circuit board 56.

Figure 21A:
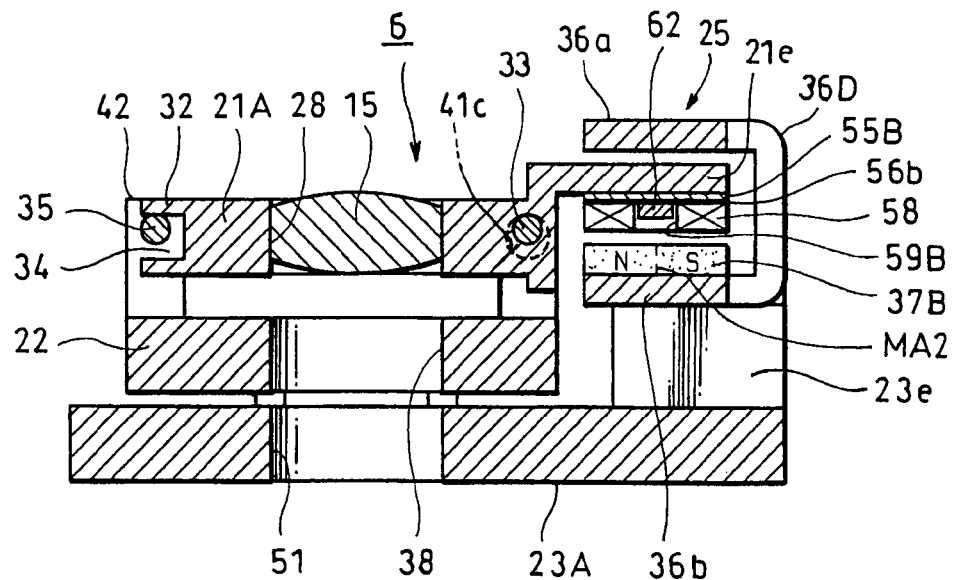
Figure 21B:
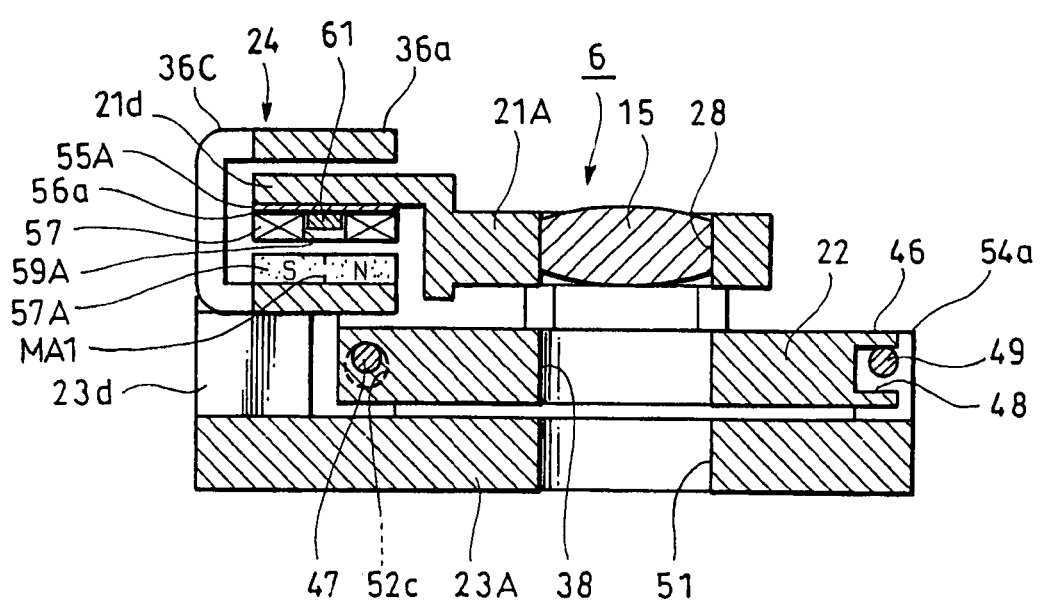

FIGS. 21A and 21B show a modified example of the embodiment shown in FIGS. 15 to 20, in which the positions of the magnets 37A and 37B and the positions of the coils 57 and 58 in the aforementioned embodiment are vertically replaced with each other. Specifically, first and second coils 57 and 58 are fixed to the lower surfaces of first and second coil fixed portions 21d and 21e of a first moving frame 21A respectively, with reinforcing plates 55A and 55B and a flexible printed circuit board 56 in between. Correspondingly, first and second magnets 37A and 37B fixed to the upper surfaces of lower pieces 36b of yokes 36A and 36B are provided facing the coils 57 and 58. Magnets 61 and 62 are stored in space portions 59A and 59B of the coils 57 and 58 respectively. The other structure is similar to that in the aforementioned embodiment. Effectiveness similar to that of the aforementioned embodiment can also be obtained with the foregoing structure.

FIGS. 22 to 23 show an image stabilizer 6A according to a seventh embodiment of the present invention, corresponding to the aforementioned image stabilizer 5A according to the second embodiment of the present invention, in which magnetic materials 63 (64), 63A (64A), and 63B (64B) which control the posture of a correcting lens 15 are placed outside a first coil 57 and second coil 58. Also, the magnetic materials 63 (64), 63A (64A), and 63B (64B) are similar. Specifically, each of the magnetic materials 63 (64), 63A (64A), and 63B (64B) is shaped like a circular coin, and has a center line MB0 extending in a diameter direction to divide the volume roughly in two, or has a polar boundary MB1 (MB2) to divide the material into the north pole and south pole. The other structure and functions are similar to the image stabilizer 6 according to the sixth embodiment of the present invention.

FIGS. 24 to 25 show an image stabilizer 6B according to an eighth embodiment of the present invention, corresponding to the aforementioned image stabilizer 5B according to the third embodiment of the present invention, in which the posture of a correcting lens 15 is controlled by magnetic materials 65 (66), 65A (66A), and 65B (66B) that are magnetic members. Also, the magnetic materials 65 (66), 65A (66A), and 65B (66B) are similar. Each of the materials is a roughly-quadrilateral thin board, and has a center line MB0 extending linearly to divide the volume roughly in two, or has a polar boundary MB1 (MB2) to divide the material into the north pole and south pole. The other structure and functions are similar to those in the aforementioned embodiment.

FIGS. 26 to 27 show an image stabilizer 6C according to a ninth embodiment of the present invention, corresponding to the aforementioned image stabilizer 5C according to the fourth embodiment of the present invention, and including position detectors detecting the moving direction and transfer amount of a correcting lens 15 by means of a first moving frame 21A, and magnetic materials 67 (68), 67A (68A), and 67B (68B) that are magnetic members for posture control in the same positions as the position detectors. Each of the magnetic materials 67 (68), 67A (68A), and 67B (68B) is provided in a roughly similar position to the magnet 64A (64B) shown in FIGS. 8A to 8C, and the center line MB0 or a polar boundary MB1 (MB2) roughly corresponds with a polar boundary MA1 (MA2) of a magnet 37A (37B) when seen from the plane direction. The other structure and functions are similar to those in the aforementioned embodiment.

FIG. 28 shows an image stabilizer 6D according to a tenth embodiment of the present invention, corresponding to the aforementioned image stabilizer 5D according to the fifth embodiment of the present invention, in which the reinforcing plates 55A and 55B in the aforementioned embodiment are made large in volume to be constructed as magnetic members 69A and 69B, and the magnetic members 69A and 69B also function as opposed yokes. Formed of flat boards having a roughly similar size to magnets 37A and 37B, yokes 36C and 36D are fixed to first and second yoke supporting portions 23d and 23e of a fixed base board 23A. The yokes 36C and 36D are provided in the horizontal direction, and the magnets 37A and 37B are mounted on the upper surfaces thereof to be fixed by a fastening mechanism such as adhesive.

First and second coils 57 and 58 are fixed to the lower surfaces of first and second coil fixed portions 21d and 21e of a first moving frame 21A, with a flexible printed circuit board 56 in between. The flexible printed circuit board 56 is attached to cover concave portions provided in the lower surfaces of the coil fixed portions 21d and 21e, and the first and second magnetic members 69A and 69B which also function as opposed yokes are stored in the concave portions. The first and second magnets 37A and 37B are provided facing the first and second magnetic members 69A and 69B respectively from below with a predetermined amount of space in between. The other structure is similar to that in the aforementioned embodiment, and similar effectiveness can be obtained in this embodiment as well. It should be appreciated that regarding the magnetic members 69A and 69B, magnets with the aforementioned structure can be used in place of magnetic materials of iron, steel or the like.

FIGS. 30A and 30B show a lens device 1 including any of the image stabilizers 5, 5A to 5D, 6, and 6A to 6D with the aforementioned structures and functions installed in a lens barrel 3. The lens device 1 includes a first-group lens 7 with a prism 7B with which a light path is bent by 90°. An imaging apparatus with external appearance shown in FIGS. 31 and 32 is constructed using the lens device 1, for example.

Next, referring to FIG. 29, operation of the lens system 2 of the lens device 1 in which the image stabilizer 5 (6) has been installed is explained. When the objective lens 7A of the lens system 2 is aimed at a subject, light from the subject is input from the objective lens 7A to the inside of the lens system 2. Then, light passing through the objective lens 7A is refracted by 90° by the prism 7B, and then advances toward the CCD 4 along the optical axis L of the lens system 2. Specifically, light reflected from the prism 7B and emitted from the second lens 7C of the first-group lens 7 passes through the second-group lens 8, the third-group lens 9 and the fourth-group lens 10, further passes through the seventh lens 11A and the correcting lens 15 of the fifth-group lens 11, and passes through the optical filter 14, thereby forming an image corresponding to the subject on the focusing screen of the CCD 4.

In this case, at the time of shooting, when camera shake and vibration are not applied to the lens device 1, light from the subject moves through each center portion of the first-group lenses 7 to fifth-group lenses 11 along the optical axis L as shown by the solid line of light 6A. Therefore, an image is formed at a predetermined position on the focal plane of the CCD 4, and an excellent image can be obtained without an image blur being caused.

On the other hand, at the time of shooting, when camera shake or vibration is applied to the lens device 1, light from the subject is input to the first-group lenses 7 in an inclined state as shown by the chain line of light 6B or shown by the broken line of light 6C. At each of the first-group to fifth-group lenses, the incident light 6B, 6C passes through the lenses, deviating from the optical axis L; however, it is possible to correct the camera shake or the like by moving the correcting lens 15 by a predetermined amount in accordance with the camera shake or the like. Accordingly, an image is formed at a predetermined position on the focal plane of the CCD 4, and an excellent image can be obtained by eliminating an image blur.

Camera shake, vibration or the like regarding the lens device 1 is detected by means of a blur detector. As this blur detector, a gyro sensor can be used, for example. This gyro sensor is installed in a camera along with the lens device 1, and acceleration, angular velocity, angular acceleration and the like which act on the lens device 1 caused by a vibration, camera shake and the like of a photographer's hands are detected. Information detected by the gyro sensor, such as acceleration and angular velocity, is supplied to a control device, and the first and second electric actuators 24 and 25 are driven and controlled such that the first moving frame 21 (21A) is moved in the first direction X in response to a shake in the first direction X, and the second moving frame 22 is moved in the second direction Y in response to a shake in the second direction Y, thus allowing an image to be formed at a predetermined position on the focal plane of the CCD 4.

FIGS. 31 and 32 show a digital still camera 100 that is a first embodiment of an imaging apparatus according to the present invention. This digital still camera 100 uses a semiconductor recording medium as an information recording medium, and an optical image from a subject is converted to electric signals in a CCD (solid-state imaging device) to be recorded in the semiconductor recording medium and to be displayed on a display apparatus formed of a flat display panel, such as a liquid crystal display.

As shown in FIG. 31 and other figures, the digital still camera 100 includes a camera body 101 formed of a horizontally long casing, and a camera portion 102 supported in a turnable manner by this camera body 101. The camera portion 102 is provided with a lens device 1 which captures an image of a subject as light and leads it to a CCD 4 serving as an imager. Further, the camera body 101 is provided with: a display apparatus 103 such as a liquid crystal display which displays an image based upon an image signal output from the CCD 4; a control unit 140 (see FIG. 34) which controls the action of the lens device 1, the display of the display apparatus 103 and the like; a battery power source and the like not shown in the drawings.

First and second prop portions 105 and 106 protruding upward are provided at both ends of the camera body 101 with respect to a lateral direction that is a lengthwise direction, and a lens system storage portion 107 for storing the camera portion 102 is formed inside the prop portions 105 and 106. Further, in the lower part of the camera body 101 on the side of the first prop portion 105, a battery storage portion and a memory storage portion are provided to be opened laterally. The battery storage portion and the like are freely opened and closed by an opening and closing lid 108 supported in a freely turnable manner by the camera body 101. In the battery storage portion, a battery power source such as a lithium secondary battery is stored in a detachable manner. Further, in the memory storage portion, an external storage apparatus of a semiconductor memory (a memory card or the like, for example) is stored in a detachable manner.

A shutter button 110 for shooting is provided on the upper surface of the first prop portion 105 of the camera body 101. A mode selection dial 111 and a power switch 112 are arranged at the upper part on the side surface of the first prop portion 105. The mode selection dial 111 is ring-shaped, and the power switch 112 is stored in a hole thereof to be pushed and operated. The mode selection dial 111 is a rotary switch capable of selectively switching a mode among a still image shooting mode, a moving image shooting mode, a shot image reproducing/recording mode and the like, for example. Also, the power switch 112 is provided to switch on/off power supplied from the battery power source or the like.

As shown in FIG. 32, on the rear surface of the camera body 101 are arranged: a flat display panel (LCD) 103 that is a display apparatus; a control button 114; a zoom button 115; an operation stick 116 that is a direction selector; an auto horizontal button 117; and the like. On the side of the second prop portion 106 on the rear surface of the camera body 101, the flat display panel 103 is arranged for displaying a subject image corresponding to a subject, based upon an image signal supplied from the camera portion 102.

The control button 114 is provided for selecting items from a menu stored in a storage apparatus or the like incorporated in the camera body 101, and is arranged near the flat display panel 103. In relation thereto, a display switching button 118 for switching on/off the display of the flat display panel 103, and a menu switching button 119 for switching one display item to another on the menu are arranged in the lower part of the control button 114. The zoom button 115 is provided for continuously enlarging and reducing an image corresponding to a subject at the time of shooting and reproducing, and is arranged at the base part of the first prop portion 105. The operation stick 116 and the auto horizontal button 117 are arranged side by side above this zoom button 115.

The camera portion 102 is stored in the lens system storage portion 107 of the camera body 101 and is supported between the first and second prop portions 105 and 106 at both ends thereof in that state. Specifically, a lens barrel 3 is provided with cylindrical shaft portions which protrude to the outside from both ends in a cylindrical axis direction. With these cylindrical shaft portions being supported by bearings of the first and second prop portions 105 and 106 in a freely turnable manner, the camera portion 102 is supported by the camera body 101 in a freely turnable manner. The camera portion 102 includes: the lens barrel 3 formed of a casing having size and shape corresponding to the size and shape of the lens system storage portion 107, a lens system 2 stored in the lens barrel 3, and the like.

Further, regarding the lens barrel 3, the front surface side where an objective lens 7A of the lens device 1 is arranged bulges, and the opposite side surface is arc-shaped. The thickness of the lens barrel 3 is approximately the same as that of the camera body 101, and the lens barrel 3 is formed to have an approximately flat surface as a whole, when the lens barrel 3 is attached to the camera body 101. Hereupon, the shape of the front surface, which is the bulged side of the lens barrel 3, corresponds to that of the lens system storage portion 107 of the camera body 101. Thus, if the camera portion 102 is turned, the front surface thereof protrudes from the surface of the camera body 101, and in that protruding state, the camera portion 102 can be turned by a predetermined angle (for example 300°). On the front surface of the lens barrel 3 is arranged the objective lens 7A of the lens device 1, and on the rear surface thereof is provided a finder 121. Further, on the front surface of the lens barrel 3 are provided a light-emitting portion 122 of a flash apparatus, and the like.

This camera portion 102 can be electrically turned by a barrel turner incorporated in the camera body 101. An electric motor, a gear row which transmits the power of the electric motor, and the like can be used to prepare a barrel turner, for example. In addition, it is preferable that a gravity sensor which senses the direction of gravity be incorporated in the camera body 101. An acceleration sensor, a gyro sensor and other devices capable of detecting the direction of gravity in a mechanical manner are applicable to this gravity sensor, for example. By detecting the direction of gravity with the gravity sensor, and controlling the posture of the camera portion 102 based on detected signals thereof, the camera portion 102 can be faced constantly in a predetermined direction with respect to the gravitational direction.

FIG. 33 is a block diagram explaining the control concept of the above-described image stabilizer 5 (6). A control unit 130 includes: an image stabilization calculating unit 131; an analog servo unit 132; a driving circuit unit 133; four amplifiers (AMP) 134A, 134B, 135A and 135B; and the like. To the image stabilization calculating unit 131 are connected a first gyro sensor 136 via the first amplifier (AMP) 134A, and a second gyro sensor 137 via the second amplifier (AMP) 134B.

The first gyro sensor 136 detects the amount of displacement in the first direction X caused by a camera shake or the like applied to the camera body 101, and the second gyro sensor 137 detects the amount of displacement in the second direction Y caused by camera shake or the like applied to the camera body 101. Although an example in which the amount of displacement in the first direction X and the amount of displacement in the second direction Y are separately detected by providing two gyro sensors has been explained in this embodiment, needless to say, the amount of displacement in the two directions, the first direction X and second direction Y, may be detected by one gyro sensor.

The analog servo unit 132 is connected to the image stabilization calculating unit 131. The analog servo unit 132 converts a value calculated by the image stabilization calculating unit 131 from a digital value to an analog value, and outputs a control signal corresponding to the analog value. The driving circuit unit 133 is connected to the analog servo unit 132. To the driving circuit unit 133 are connected: the first hall element 26, which is a first position-detecting element, via the third amplifier (AMP) 135A; and the second hall element 27, which is a second position-detecting element, via the fourth amplifier (AMP) 135B. Further, to the driving circuit unit 133 are connected: the first coil 57, which is a first-direction driving coil; and the second coil 58, which is a second-direction driving drive coil.

The amount of displacement of the first moving frame 21 (21A) in the first direction X, detected by the first hall element 26, is input to the driving circuit unit 133 via the third amplifier 135A. Also, the amount of displacement of the second moving frame 22 in the second direction Y, detected by the second hall element 27, is input to the driving circuit unit 133 via the fourth amplifier 135B. Based upon the input signals and the control signal from the analog servo unit 132, the driving circuit unit 133 outputs a predetermined control signal to either the first coil 57 or the second coil 58 or to both of them, in order to move the correcting lens 15 for stabilizing images.

FIG. 34 is a block diagram showing a first embodiment of a schematic configuration of a digital still camera 100 provided with an image stabilizer 5 (6) having the above-described structure and functions. This digital still camera 100 includes a lens device 1, a control unit 140, a storage apparatus 141, an operation unit 142, a display apparatus 103, an external memory 143 and the like. The lens device 1 has an image stabilizer 5 (6). The control unit 140 plays a central role in a control device. The storage apparatus 141 has a program memory, data memory, other RAM/ROM or the like for driving the control unit 140. The operation unit 142 inputs various instruction signals or the like for turning the power on/off, selecting a shooting mode, performing shooting or the like. The display apparatus 103 displays a captured image or the like. The external memory 143 enlarges storage capacity.

The control unit 140 includes an operational circuit having a microcomputer (CPU); and the like, for example. The storage apparatus 141, the operation unit 142, an analog signal processing unit 144, a digital signal processing unit 145, two A/D converters 146 and 147, a D/A converter 148, and a timing generator (TG) 149 are connected to this control unit 140. The analog signal processing unit 144 is connected to a CCD 4 attached to the lens device 1, and performs predetermined signal processing by means of an analog signal corresponding to a captured image output from the CCD 4. This analog signal processing unit 144 is connected to the first A/D converter 146, and an output thereof is converted to a digital signal by this A/D converter 146.

To the first A/D converter 146 is connected the digital signal processing unit 145 which performs predetermined signal processing by means of a digital signal supplied from the first A/D converter 146. To this digital signal processing unit 145 are connected the display apparatus 103 and the external memory 143, and an image corresponding to a subject is displayed on the display apparatus 103 or stored in the external memory 143, based upon a digital signal that is an output signal thereof. Also, to the second A/D converter 147 is connected a gyro sensor 151 showing a specific example of a blur-detecting unit. A vibration, shake or the like of the digital still camera 100 is detected by this gyro sensor 151, and image stabilization is performed according to the detected result.

To the D/A converter 148 is connected a driving control unit 152 which is a servo calculating unit for image stabilization. The driving control unit 152 stabilizes images by driving and controlling the image stabilizer 5 (6) in accordance with the position of a correcting lens 15. To the driving control unit 152 are connected the image stabilizer 5 (6), and a first position detector 26 and second position detector 27 which are position-detecting units that detect the position of the correcting lens 15 by detecting the positions of two moving frames 21 and 22. In addition, the timing generator (TG) 149 is connected to the CCD 4.

Thus, when an image of a subject has been input to a lens system 2 of the lens device 1 and then an image has been formed on the focal plane of the CCD 4, an image signal thereof is output as an analog signal to which predetermined processing is carried out at the analog signal processing unit 144 and after that which is converted to a digital signal by the first A/D converter 146. After predetermined processing is carried out at the digital signal processing unit 145, an output from the first A/D converter 146 is displayed on the display apparatus 103 as an image corresponding to the subject, or is stored in an external memory as memory information.

In the above-described shooting state, when a vibration, shake or the like is applied to the digital still camera 100 with the image stabilizer 5 (6) in the operational state, the gyro sensor 151 detects the vibration, shake or the like and then outputs a detection signal thereof to the control unit 140. On receipt of this, the control unit 140 performs predetermined calculation processing, and outputs a control signal which controls the action of the image stabilizer 5 (6) to the driving control unit 152. The driving control unit 152 outputs a predetermined driving signal to the image stabilizer 5 (6) based upon the control signal from the control unit 140, thereby moving the first moving frame 21 in the first direction X by a predetermined amount and moving the second moving frame 22 in the second direction Y by a predetermined amount. This makes it possible to stabilize images by means of the movement of the correcting lens 15 and thus to obtain an excellent image.

FIG. 35 is a block diagram showing a second embodiment of the schematic configuration of a digital still camera provided with an image stabilizer 5 (6) having the above-described structure and functions. This digital still camera 100A includes a lens device 1, a video recording/reproducing circuit unit 160, an internal memory 161, a video signal processing unit 162, a display apparatus 103A, an external memory 164, a correcting lens control unit 165 and the like. The lens device 1 has an image stabilizer 5 (6). The video recording/reproducing circuit unit 160 plays a central role in a control device. The internal memory 161 has a program memory, data memory, other RAM/ROM or the like for driving the video recording/reproducing circuit unit 160. The video signal processing unit 162 processes a captured image or the like into predetermined signals. The display apparatus 103A displays a captured image or the like. The external memory 164 enlarges storage capacity. The correcting lens control unit 165 drives and controls the image stabilizer 5 (6).

The video recording/reproducing circuit unit 160 includes: an operational circuit having a microcomputer (CPU); and the like, for example. The internal memory 161, the video signal processing unit 162, the correcting lens control unit 165, a monitor driving unit 166, an amplifier 167 and three interfaces (I/F) 171, 172 and 173 are connected to this video recording/reproducing circuit unit 160. The video signal processing unit 162 is connected to a CCD 4 attached to the lens device 1, via the amplifier 167, and a signal which has been processed into a predetermined video signal is input to the video recording/reproducing circuit unit 160.

The display apparatus 103A is connected to the video recording/reproducing circuit unit 160 via the monitor driving unit 166. Also, a connector 168 is connected to the first interface (I/F) 171, and the external memory 164 can be connected to this connector 168 in a freely detachable manner. A connecting terminal 174 provided in a camera body 101A is connected to the second interface (I/F) 172.

An acceleration sensor 175, which is a blur-detecting unit, is connected to the correcting lens control unit 165 via the third interface (I/F) 173. This acceleration sensor 175 detects displacement applied to the camera body 101A due to vibration, shake or the like, as acceleration, and a gyro sensor can be used as this acceleration sensor 175. To the correcting lens control unit 165 are connected: a lens driving unit 200 of the image stabilizer 5 (6), which drives and controls a correcting lens 15; and two position-detecting sensors 26 and 27 which detect the position of the correcting lens 15.

Thus, when an image of a subject has been input to a lens system 2 of the lens device 1 and then an image has been formed on the focal plane of the CCD 4, an image signal thereof is input to the video signal processing unit 162 via the amplifier 167. A signal which has been processed into a predetermined video signal at this video signal processing unit 162 is input to the video recording/reproducing circuit unit 160. Thus, a signal corresponding to the image of the subject is output from the video recording/reproducing circuit unit 160 to the monitor driving unit 166, and the internal memory 161 or the external memory 164. As a result, an image corresponding to the image of the subject is displayed on the display apparatus 103A via the monitor driving unit 166, or is recorded in the internal memory 161 or in the external memory 164 as an information signal, according to need.

In the above shooting state, when a vibration, shake or the like is applied to a camera body 101A with the image stabilizer 5 (6) in the operational state, the acceleration sensor 175 detects the vibration, shake or the like and then outputs a detection signal thereof to the video recording/reproducing circuit unit 160 via the correcting lens control unit 165. On receipt of this, the video recording/reproducing circuit unit 160 performs predetermined calculation processing, and outputs a control signal, which controls the action of the image stabilizer 5 (6), to the correcting lens control unit 165. This correcting lens control unit 165 outputs a predetermined driving signal to the image stabilizer 5 (6) based upon the control signal from the video recording/reproducing circuit unit 160, thereby moving a first moving frame 21 in the first direction X by a predetermined amount and moving a second moving frame 22 in the second direction Y by a predetermined amount. This makes it possible to stabilize images by means of the movement of the correcting lens 15 and thus to obtain an excellent image.

As explained above, with an image stabilizer, a lens device and an imaging apparatus according to an embodiment of the present invention, a driver has first and second coils and a magnet, and the first and second coils are fixed to a moving frame or a supporting frame, as thrust generated by first and second thrust-generating portions is directed in first and second directions, also, magnetic members attracted by the magnetic force of the magnet are provided in the vicinity of the first and second coils. Therefore, backlash caused by gaps between guide shafts and bearing portions can be removed, thus, the moving frame holding a correcting lens can be moved smoothly and the correcting lens can be maintained in a certain posture, thereby preventing deterioration in optical performance caused by change in the posture of the correcting lens.

Also, with the moving frame remaining at an optical axis center, the magnetic members are faced to the magnet, and the directions of the thrust-generating portions of the first and second coils are set in the first and second directions. Thus, in the case of using the image stabilizer in a posture of the moving frame dropping in the gravitational direction due to gravity, the movement of the moving frame can be prevented by means of the magnetic force of the magnet and the moving frame can be maintained in a predetermined position. Therefore, since there may be no need to maintain the moving frame in a predetermined position by supplying power to the coils all the time, the power consumption of a battery related to unnecessary power consumption can be reduced, and also a rise in the temperature inside an apparatus can be controlled by reducing heat generation caused when supplying power.

Further, in the case of detecting a position of the moving frame by a hall element, a magnetic field formed by a magnetic member and a magnet can be added to a magnetic field formed by the magnet and an opposed yoke by providing the magnetic member to lie on the side of the opposed yoke of the hall element. Therefore, the output of the hall element can be large, and thus, an amplifier magnification can be reduced, unnecessary amplification of noise can be minimized, and prevent deterioration in accuracy of position detection can be prevented.

The present invention is not limited to the embodiments described earlier and shown in the drawings, but various modifications are possible without deviating from the gist of the present invention. For example, although embodiments in which a digital still camera is used as an imaging apparatus have been explained in the above-described embodiments, the present invention can be applied to digital video cameras, camera-equipped personal computers, mobile phone with a built-in camera and other imaging apparatuses as well. Further, although examples in which five group lenses are used as a lens device 1 have been explained, it should be appreciated that the present invention can be applied to four group lenses or fewer and also can be applied to six group lenses or more as well.

It should be understood by those skilled in the art that various modifications, combinations, sub-combinations and alterations may occur depending on design requirements and other factors insofar as they are within the scope of the appended claims or the equivalents thereof.

What is claimed is:

1. An image stabilizer comprising:
   a first movable frame to move in a first linear direction perpendicular to an optical axis of a lens system;

a second movable frame to move in a second linear direction perpendicular to both the first direction and said optical axis, said second movable frame including first and second bearing portions fixed to said second movable frame, said first movable frame being supported by said first bearing portion and being guided by said second bearing portion so as to be movable with respect to said second movable frame;

a fixed supporting frame for supporting said second movable frame;

a correcting lens having an optical axis and mounted on said first movable frame;

a driver for controlling said first and second movable frames, wherein said driver includes coils and magnets, respectively mounted on at least said first movable frame and said supporting frame, said coils including a first coil magnetically cooperating with said magnets for moving said first movable frame in said first direction and a second coil magnetically cooperating with said magnets for moving said second movable frame in said second direction; and magnetic members provided in the vicinity of said first and second coils on said movable frames or said supporting frame and attracted to or repelled by said magnets.

2. An image stabilizer according to claim 1 wherein:

said magnets comprise first and second magnets, each polarized to have its north and south poles divided in a plane direction with a polar boundary extending approximately linearly between said north and south poles;

said magnetic members are made of magnetic material; and each of said magnetic members is provided approximately symmetrically on said polar boundary of said magnet.

3. An image stabilizer according to claim 1 wherein:

said magnets comprise first and second magnets, each formed of a driving magnet polarized to have its north and south poles divided in a plane direction with a polar boundary extending approximately linearly between said north and south poles;

each of said magnetic members is formed as a posture control magnet polarized to have its north and south poles divided in a plane direction with a polar boundary extending approximately linearly between its north and south poles; and said polar boundary of each posture control magnet is disposed in correspondence with said polar boundary of a respective driving magnet.

4. An image stabilizer comprising:

a driver including a coil and a magnet capable of moving relatively, said driver controlling a correcting lens held on a first movable frame to move in a first direction perpendicular to an optical axis of a lens system and in a second direction perpendicular to the first direction and said optical axis, and controlling an optical axis of said correcting lens to correspond with the optical axis of said lens system to stabilize images, wherein one of said coil and said magnet is fixed to said moving frame and the other is fixed to a supporting frame supporting said moving frame in a movable manner;

said driver includes a first coil for moving said correcting lens in said first direction, a second coil for moving said correcting lens in said second direction, and a magnet for applying magnetic force to said first coil and said second coil;

said first coil and said second coil are disposed such that thrust generated from a thrust-generating portion of the first coil and thrust generated from a thrust-generating portion of the second coil are directed in said first direction and in said second direction respectively by the magnetic force of said magnet; and a magnetic member attracted to or repelled by said magnet is provided in the vicinity of said first coil and said second coil on said moving frame or said supporting frame to which the first coil and the second coil are fixed; wherein said first coil and said second coil are formed of flat coils being levelly wound and approximately formed in elliptical or rectangular shape including a first linear portion and a second linear portion generating thrust;

the direction of an extension of said first and second linear portions of said first coil is perpendicular to said first direction, and the direction of an extension of said first and second linear portions of said second coil is perpendicular to said second direction; and said first and second coils and said magnet face each other with one of the north and south poles of said magnet facing said first linear portions of said first and second coils and with the other pole of said magnet facing said second linear portions of said first and second coils.

5. An image stabilizer according to claim 3 further comprising:

hall elements for detecting the position of said correcting lens by detecting the magnetic force of said magnets, said hall elements being provided in the vicinity of respective ones of said first and second coils on the frame on which said respective coil is mounted, said hall elements having detecting portions that approximately correspond with said polar boundaries of a respective magnet; and said magnetic members are provided above said hall elements.

6. A lens device comprising:

an image stabilizer including a driver having first and second coils and a magnet, said magnet and said coils being movable relative to each other, said driver controlling a correcting lens held on a first movable frame to move in a first linear direction perpendicular to an optical axis of a lens system, a second movable frame movable in a second linear direction perpendicular to both the first direction and said optical axis and including first and second bearing portions fixed to said second movable frame, said first movable frame being supported by said first bearing portion and being guided by said second bearing portion so as to move in said first linear direction, said second movable frame being supported on a fixed frame, said driver controlling an optical axis of said correcting lens to stabilize images, wherein said coils or said magnet is fixed to one of said movable frames and the other is fixed to said fixed frame;

said first coil being operable for moving said correcting lens in said first linear direction, said second coil being operable for moving said correcting lens in said second linear direction, and said magnet being operable for applying magnetic force to said first coil and said second coil;

said first and said second coils being disposed such that thrust generated from a thrust-generating portion of the first coil and thrust generated from a thrust-generating portion of the second coil are directed in said first linear direction and in said second linear direction respectively by the magnetic force of said magnet; and magnetic members provided in the vicinity of said first and second coils on said movable frame or said supporting frame and attracted to or repelled by said magnets.

7. An imaging apparatus comprising:

a lens device including an image stabilizer having a driver including first and second coils and a magnet said magnet and said coils being movable relative to each other, said driver controlling a correcting lens held on a first movable frame to move in a first linear direction perpendicular to an optical axis of a lens system, a second movable frame moveable in a second and linear direction perpendicular to both the first direction and said optical axis and including first and second bearing portions fixed to said second movable frame, said first movable frame being supported by said first bearing portion and being guided by said second bearing portion so as to move in said first linear direction, said second movable frame being supported on a fixed frame, said driver controlling an optical axis of said correcting lens to to stabilize images, wherein said coils or said magnet is fixed to one of said movable frames and the other is fixed to said fixed frame;

said first coil being operable for moving said correcting lens in said first linear direction, said second coil being operable for moving said correcting lens in said second linear direction, and said magnet being operable for applying magnetic force to said first coil and said second coil;

said first and second, coils being disposed such that thrust generated from a thrust-generating portion of the first coil and thrust generated from a thrust-generating portion of the second coil are directed in said first linear direction and in said second linear direction respectively by the magnetic force of said magnet; and magnetic members provided in the vicinity of said first and second coils on said movable frame or said supporting frame and attracted to or repelled by said magnets.

8. An image stabilizer for use in an imaging device having an optical axis, said image stabilizer comprising:

first and second movable frames, both movable with respect to a fixed supporting frame, said first movable frame being movable in a first linear direction perpendicular to said optical axis, said second movable frame movable in a second linear direction perpendicular to both the first direction and said optical axis and including first and second bearing portions fixed to said second movable frame, said first movable frame being supported by said first bearing portion and being guided by said second bearing portion so as to move in said first linear direction, and said fixed supporting frame supporting said second movable frame;

a driver for controlling said first and second movable frames, including first and second coils and first and second magnets, said coils being mounted on respective ones of said movable frames or on said supporting frame and said magnets being mounted on said supporting frame or on respective ones of said movable frames, said first coil cooperating with said first magnet for moving said first movable frame in said first direction and said second coil cooperating with said second magnet for moving said second movable frame in said second direction; and first and second magnetic members provided in the vicinity of said first and second coils, respectively, and attracted to or repelled by said magnets.

* * * * *